US012465595B2

(12) United States Patent
Sorscher et al.

(10) Patent No.: US 12,465,595 B2
(45) Date of Patent: Nov. 11, 2025

(54) CYSTIC FIBROSIS TRANSMEMBRANE CONDUCTANCE REGULATOR (CFTR) MODULATORS, PHARMACEUTICAL COMPOSITIONS, AND USES THEREOF

(71) Applicants: Emory University, Atlanta, GA (US); Children's Healthcare of Atlanta, Inc., Atlanta, GA (US)

(72) Inventors: Eric Sorscher, Atlanta, GA (US); Haian Fu, Decatur, GA (US); Huw Davies, Suwanee, GA (US); Jeong Hong, Decatur, GA (US); Yuhong Du, Atlanta, GA (US); Andras Rab, Atlanta, GA (US); Candela Manfredi, Atlanta, GA (US); Xun Yang, Atlanta, GA (US); Zhi Ren, Atlanta, GA (US)

(73) Assignees: Emory University, Atlanta, GA (US); Children's Healthcare of Atlanta, Inc., Atlanta, GA (US)

( * ) Notice: Subject to any disclaimer, the term of this patent is extended or adjusted under 35 U.S.C. 154(b) by 266 days.

(21) Appl. No.: 18/018,997

(22) PCT Filed: Jul. 30, 2021

(86) PCT No.: PCT/US2021/043956
§ 371 (c)(1),
(2) Date: Jan. 31, 2023

(87) PCT Pub. No.: WO2022/026863
PCT Pub. Date: Feb. 3, 2022

(65) Prior Publication Data
US 2023/0293498 A1  Sep. 21, 2023

Related U.S. Application Data

(60) Provisional application No. 63/059,796, filed on Jul. 31, 2020.

(51) Int. Cl.
*A61K 31/427* (2006.01)
*A61K 31/4155* (2006.01)
*A61K 31/433* (2006.01)

(52) U.S. Cl.
CPC ........ *A61K 31/427* (2013.01); *A61K 31/4155* (2013.01); *A61K 31/433* (2013.01)

(58) Field of Classification Search
CPC .. C07D 497/04; A61K 31/542; A61K 31/549; A61K 31/4155; A61K 31/427; A61K 31/433; A61P 11/00
See application file for complete search history.

(56) References Cited

U.S. PATENT DOCUMENTS 3,954,983 A    5/1976  Albrecht
2009/0163545 A1  6/2009  Goldfarb
2015/0011528 A1  1/2015  Hur
2015/0284348 A1  10/2015 Fader
2018/0185364 A1  7/2018  Miller
2020/0071316 A1  3/2020  Goldberg

FOREIGN PATENT DOCUMENTS

WO   WO-2008011045 A2 *  1/2008  .......... C07D 487/04
WO   2009089027          7/2009

OTHER PUBLICATIONS

Sasaki et al., (J. Org. Chem. vol. 47 pp. 2757-2760. Published 1982). (Year: 1982).*
Chang (Int. Forum Allergy Rhinol. vol. 5 pp. 178-181 published 2015 (Year: 2015).*
Sasaki (J. Org. Chem vol. 47 pp. 2757-2760 published 1982) (Year: 1982).*
CAS Registry compound RN 1313833-25-8 indexed in the CAS Registry Database in Jul. 27, 2011 (Year: 2011).*
Bobadilla et al. Cystic Fibrosis: A Worldwide Analysis of CFTR Mutation-Correlation With Incidence Data and Application to Screening, Human Mutation 19:57-606 (2002).
Chemical Abstract Services (CAS), Reg. No. 351226-82-9, 1H-Pyrazole-5-carboxamide, 4-chloro-N-[2- ((cyclohexylcarbonyl) amino]-6-benzothiazolyl]-1-methyl-(9CI, ACI).
Chemical Abstract Services (CAS), Reg. No. 1015680-75-7, 1H-Imidazole-5-carboxamide, N-[6-(acetylamino)-2-benzothiazolyl]-1-phenyl-(ACI).
Chemical Abstract Services (CAS), Reg. No. 1313833-25-8, 7H-1,2,4-Triazolo[3,4-b ][1,3,4]thiadiazine, 6-(3-bromo-4-methoxyphenyl)-3-(1-methylethyl)-(ACI).
Chemical Abstract Services (CAS), Reg. No. 1593068-50-8, 1H-Pyrrole-2-carboxamide, N-[2-(acetylamino)-6-benzothiazolyl]-1-(4-piperidinyl)-, hydrochloride (1:2) (ACI).
Chemical Abstract Services (CAS), Reg. No. 1593285-22-3, 1H-Pyrrole-2-carboxamide, N-[2-(acetylamino)-6-benzothiazolyl]-1-(4-piperidinyl)-(ACI).
Chidananda et al. Facile synthesis, characterization and pharmacological activities of 3,6-disubstituted 1,2,4-triazolo [3,4-b][1,3,4]thiadiazoles and 5,6-dihydro-3,6-disubstituted-1,2,4-triazolo[3,4-b][1,3,4]thiadiazoles, European Journal of Medicinal Chemistry 51 (2012) 124-136.
Chidananda et al.Condensed Bridge Head Nitrogen Heterocyclic Compounds: Facile Synthesis, Characterization and Bioactivity Studies of Some Substituted-7H-[1,2,4]triazolo[3,4-b][1,3,4]thiadiazines, Journal of Applicable Chemistry, 2013, 2 (5):1080-1101.

(Continued)

*Primary Examiner* — George W Kosturko
(74) *Attorney, Agent, or Firm* — Meunier Carlin & Curfman LLC

(57) ABSTRACT

This disclosure relates to compounds that are cystic fibrosis transmembrane conductance regulator (CFTR) modulators and pharmaceutical compositions containing the same. In certain embodiments, this disclosure relates to methods of managing a CFTR related disease or condition or respiratory distress comprising administering an effective amount of a CFTR modulator disclosed herein to a subject in need thereof.

7 Claims, 23 Drawing Sheets

(56) References Cited

OTHER PUBLICATIONS

Demchenko et al. Synthesis of 3-Alkyl-6-aryl(arylamino)-7H-[1,2,4]triazolo-[3,4-b][1,3,4]thiadiazines, Russian Journal of Organic Chemistry, vol. 39, No. 7, 2003, pp. 1025-1028.

George et al. Synthesis of Some s-Triazoles with Potential Analgetic and Antiinflammatory Activities, Journal of Medicinal Chemistry, 1971, vol. 14, No. 4, 335-338.

Liang et al. High-Throughput Screening for Readthrough Modulators of CFTR PTC Mutations, SLAS Technology 2017, vol. 22(3):315-324.

Pranke et al. Factors influencing readthrough therapy for frequent cystic fibrosis premature termination codons, ERJ Open Res 2018, 4, 00080-2017.

Pubchem, Cid 11834491, 3-propyl-7H-[1,2,4]triazolo[3,4-b][1,3,4]thiadiazine, available at https://pubchem.ncbi.nlm.nih.gov/compound/11834491.

Trikafta, FDA Product Label, 2019.

Tsou et al. Comparative study between deep learning and QSAR classifications for TNBC inhibitors and novel GPCR agonist discovery, Scientific Reports (2020) 10:16771.

Yoshida et al. Synthesis and biological evaluation of benzothiazole derivatives as potent antitumor agents, Bioorganic & Medicinal Chemistry Letters 15 (2005) 3328-3332.

Extended European Search Report mailed Oct. 4, 2024, in European Application No. 21850804.2.

Kym et al. "Chapter Four: Recent Progress in the Discovery and Development of Small-Molecule Modulators of CFTR", Progress in Medicinal Chemistry, 57, 235-276 (2018).

Lopes-Pacheco "CFTR Modulators: The Changing Face of Cystic Fibrosis in the Era of Precision Medicine", Frontiers in Pharmacology, 10, 1662 (2020).

Spano et al. "Current development of CFTR potentiators in the last decide", European Journal of Medicinal Chemistry, 204, 112631 (2020).

* cited by examiner

CYSTIC FIBROSIS TRANSMEMBRANE CONDUCTANCE REGULATOR (CFTR) MODULATORS, PHARMACEUTICAL COMPOSITIONS, AND USES THEREOF

CROSS-REFERENCE TO RELATED APPLICATIONS

This application is the National Stage of International Application No. PCT/US2021/043956 filed Jul. 30, 2021, which claims the benefit of U.S. Provisional Application No. 63/059,796 filed Jul. 31, 2020. The entirety of each of these applications is hereby incorporated by reference for all purposes.

BACKGROUND

Cystic fibrosis (CF) is a lethal, recessive, genetic disease caused by mutations in the cystic fibrosis transmembrane conductance regulator (CFTR) protein, which functions as a cell surface ion channel. Mutations of CFTR may affect folding or reduce cell surface expression. This causes decreased water secretion by cells and ultimately thicker mucus layers lining the membranes in the lungs and other parts of the body such as the pancreas.

Modulators of channel function are reported to be an effective cystic fibrosis treatment for individuals carrying mutations. The drugs lumacaftor and tezacaftor overcome processing abnormalities associated with the F508 deletion mutation (F508del). Triple combination therapies (TCTs) (e.g., ivacaftor, tezacaftor, and elexacaftor) have shown benefits in clinical testing. However, some individuals do not respond to these therapies or may experience side effects that limit the ability to tolerate long term treatment. Thus, additional therapeutic strategies are needed.

Liang et al. report high-throughput screening for read-through modulators of CFTR premature termination codon (PTC) mutations. SLAS Technology, 2017, 22(3) 315-324.

Yoshida et al. report benzothiazole derivatives as potent antitumor agents. Bioorganic & Medicinal Chemistry Letters, 2005, 15:3328-3332.

Chidananda et al. report bioactivity studies of substituted-7H-[1,2,4]triazolo[3,4-b][1,3,4]thiadiazines. Journal of Applicable Chemistry, 2013, 2(5):1080-1101.

See also U.S. Published Patent No. 20090163545 and 20180185364.

References cited herein are not an admission of prior art.

SUMMARY

This disclosure relates to compounds that are cystic fibrosis transmembrane conductance regulator (CFTR) modulators and pharmaceutical compositions containing the same. In certain embodiments, this disclosure relates to methods of managing a CFTR related disease or condition or respiratory distress comprising administering an effective amount of a CFTR modulator disclosed herein to a subject in need thereof.

In certain embodiments, the CFTR modulators are compounds described in formulas I, IA, II, III, or IV, derivatives, prodrugs, and salts thereof. In certain embodiments, the CFTR modulator is selected from compounds disclosed herein, such as: 3-(2,3-dichlorophenyl)-6-(tert-pentyl)-7H-[1,2,4]triazolo[3,4-b][1,3,4]thiadiazine (HDCF 83), 6-(tert-butyl)-3-(2,4-dichlorophenyl)-7H-[1,2,4]triazolo[3,4-b][1,3,4]thiadiazine (HDCF 89), 3-(2-bromo-5-methoxyphenyl)-6-isopropyl-7H-[1,2,4]triazolo[3,4-b][1,3,4]thiadiazine (HDCF 104), 3-(2-bromo-5-chlorophenyl)-6-(tert-butyl)-7H-[1,2,4]triazolo[3,4-b][1,3,4]thiadiazine (HDCF 95), N-(2-(cyclobutanecarboxamido)benzo[d]thiazol-6-yl)-1,3-dimethyl-1H-pyrazole-4-carboxamide (HDCF 107), 2-((6-bromo-4H-benzo[d][1,3]dioxin-8-yl)methylene)-6-methoxybenzofuran-3(2H)-one (Nluc uHTS_52), N-(4-(4-(1-(2,2-difluorobenzo[d][1,3]dioxol-5-yl)cyclopropane-1-carboxamido)phenyl)thiazol-2-yl)cyclopentanecarboxamide (HDCF 159), N-(3-(4-(1-(2,2-difluorobenzo[d][1,3]dioxol-5-yl)cyclopropane-1-carboxamido)phenyl)-1,2,4-thiadiazol-5-yl)cyclopentanecarboxamide (HDCF166), derivative, prodrug, or salt thereof.

In certain embodiments, this disclosure relates to pharmaceutical compositions comprising a compound as disclosed herein or salt thereof and a pharmaceutically acceptable excipient. In certain embodiments, the pharmaceutical composition is in the form of a tablet, capsule, gel, gel capsule, or cream.

In certain embodiments, this disclosure relates to methods of treating or preventing respiratory distress comprising administering to a subject in need thereof an effective amount of a compound disclosed herein.

In certain embodiments, the subject is diagnosed with a CFTR mutation. In some embodiments, the subject is human and diagnosed with a CFTR mutation selected from W1282X, N1303K, F508del, G551D, G542X, R117H, and R553X. In certain embodiments, the CFTR mutation is a genetic mutation on at least one allele.

In certain embodiments, the subject is diagnosed with cystic fibrosis, chronic obstructive pulmonary disease, bronchitis, asthma, atelectasis, pneumonia, lung fluid, lung mucus, acute respiratory distress syndrome, ventilator induced lung injury, bronchopulmonary dysplasia, airways hyperresponsiveness, allergic rhinitis, bronchitis, emphysema, or a viral or bacterial infection that causes respiratory distress.

In certain embodiments, treatment methods disclosed herein are contemplated to be done in combination with administering other agents, such as other respiratory agents or other CFTR modulators. In certain embodiments, the other CFTR modulator is ivacaftor, lumacaftor, tezacaftor, elexacaftor, or combinations thereof.

In certain embodiments, this disclosure relates to methods of making compounds disclosed herein by mixing starting materials with reagents under conditions such that the products are formed.

BRIEF DESCRIPTION OF THE SEVERAL VIEWS OF THE DRAWING(S)

Figure 1A:
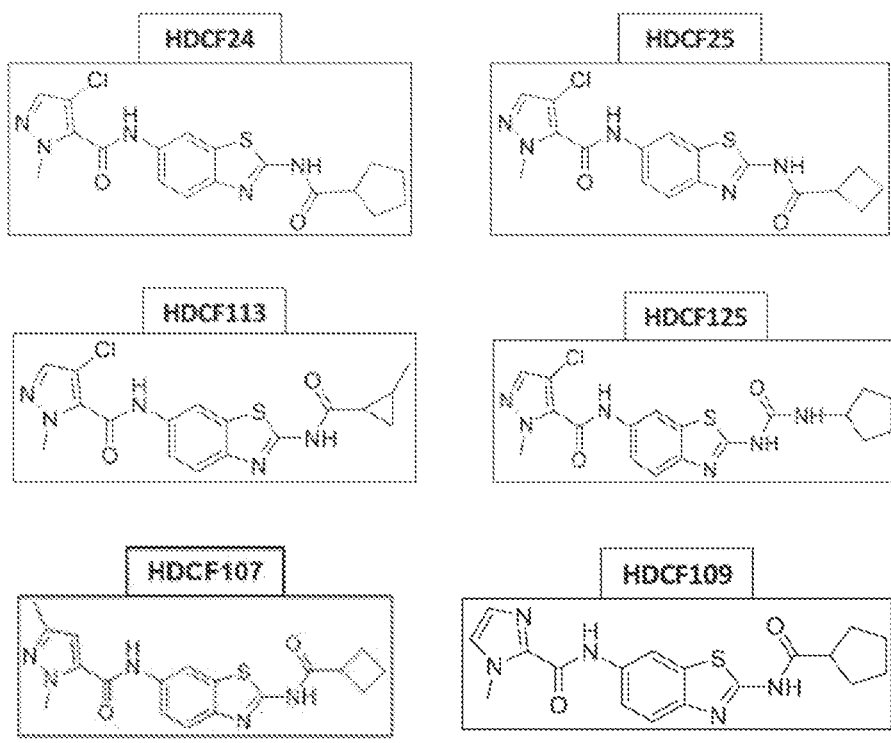
FIG. 1A illustrates CFTR modulators of this disclosure.
Figure 1B:
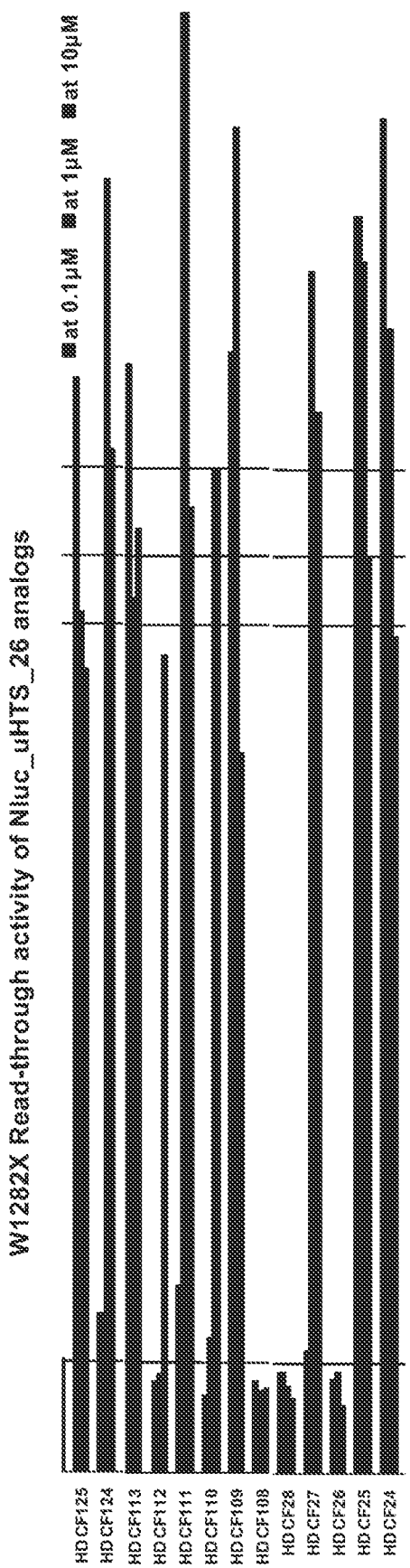
FIG. 1B shows data on the activity of compounds tested in a CFTR mutation W1282X read-through screening assay.
Figure 1C:
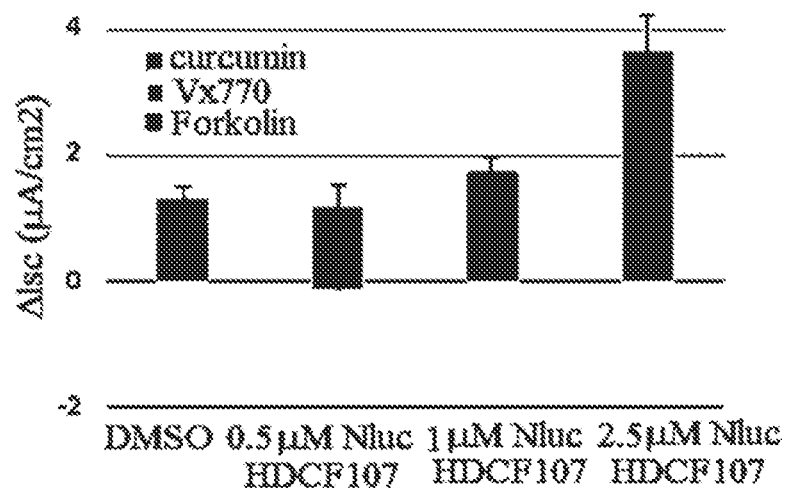
FIG. 1C shows data on the activity of compound HDCF107, N-(2-(cyclobutene carboxamido)benzo[d]thiazol-6-yl)-1,3-dimethyl-1H-pyrazole-4-carboxamide, tested in human nasal epithelial cells (hNEC) expressing CFTR with a W1282X mutation at different concentrations when in combination with different agents.
Figure 2A:
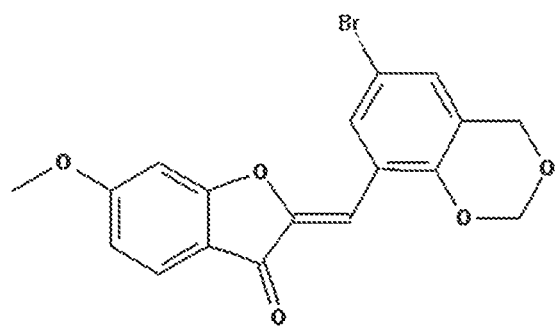
FIG. 2A illustrates the CFTR modulator Nluc uHTS_52, 2-((6-bromo-4H-benzo[d][1,3]dioxin-8-yl)methylene)-6-methoxybenzofuran-3(2H)-one of this disclosure.
Figure 2B:
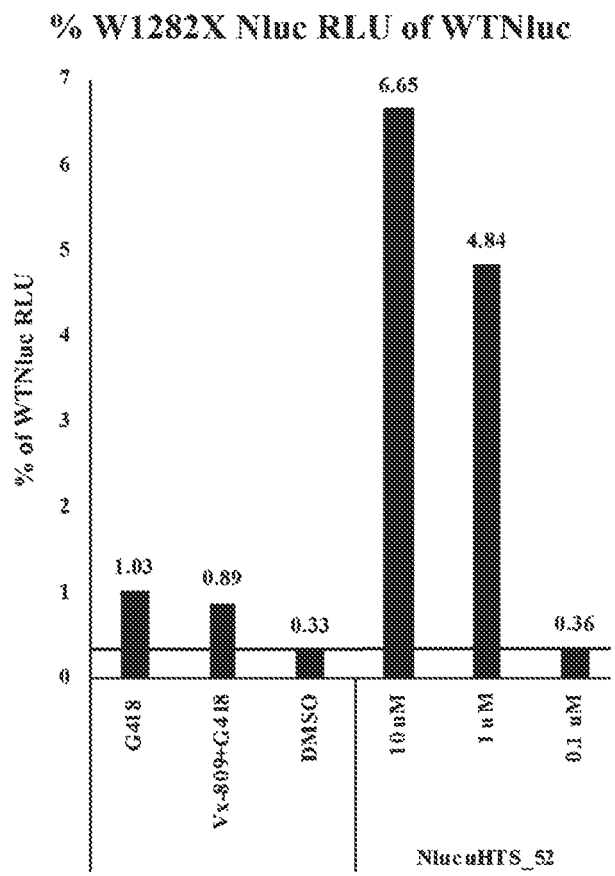
FIG. 2B shows data on the activity of Nluc uHTS_52 in a CFTR mutation W1282X assay.
Figure 3A:
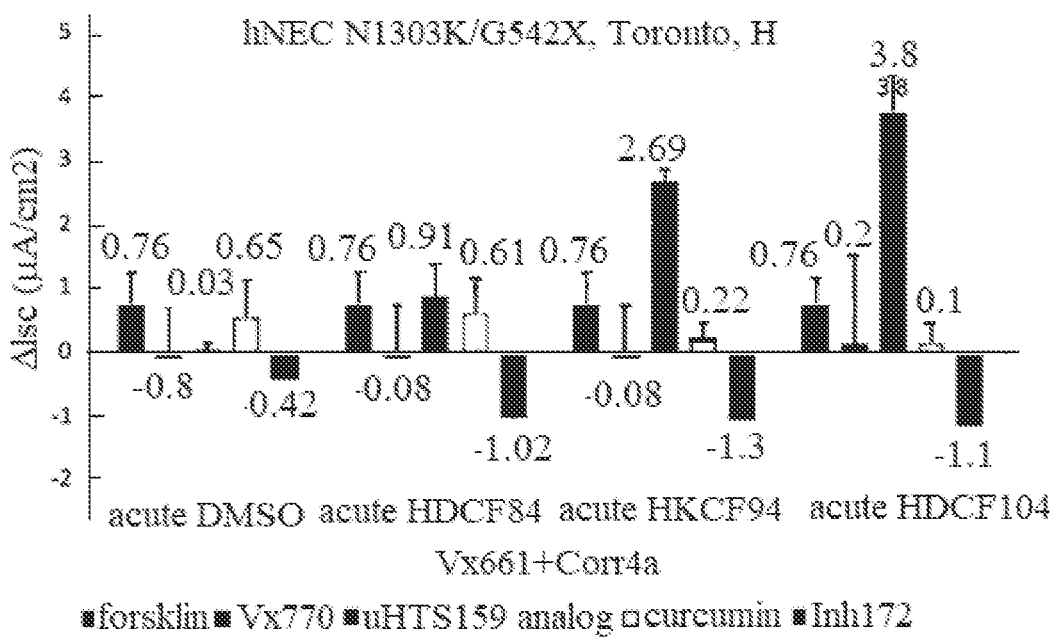
FIG. 3A shows data on the activity of the compounds HDCF84, HDCF94 and HDCF104 tested in human nasal epithelial cells (hNEC) expressing CFTR with N1303K/G542X mutations at different concentrations when in combination with different agents. Compounds HDCF84, HDCF94 and HDCF104 activate CFTR in primary epithelial cells hNEC with N1303K/G542X mutations.
Figure 3B:
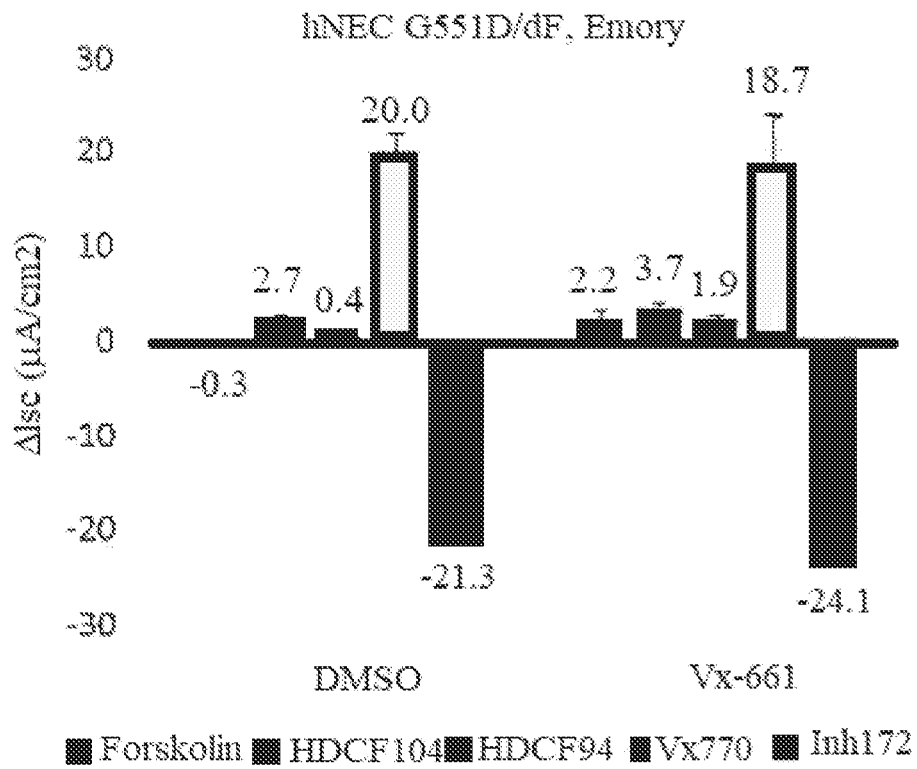
FIG. 3B shows data indicating compound HDCF104, 3-(2-bromo-5-methoxyphenyl)-6-isopropyl-7H-[1,2,4]triazolo[3,4-b][1,3,4]thiadiazine, acutely activate CFTR in primary epithelial cells with CFTR G551D/F508del mutations.
Figure 4A:
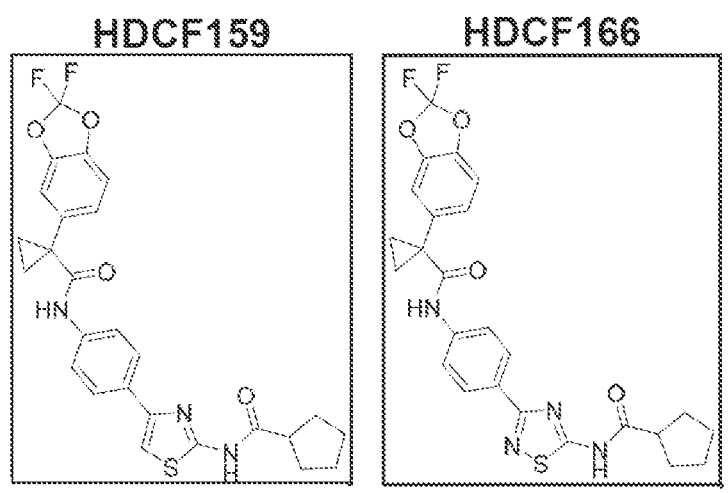
FIG. 4A illustrates the CFTR modulators HDCF159 and HDCF166.
Figure 4B:
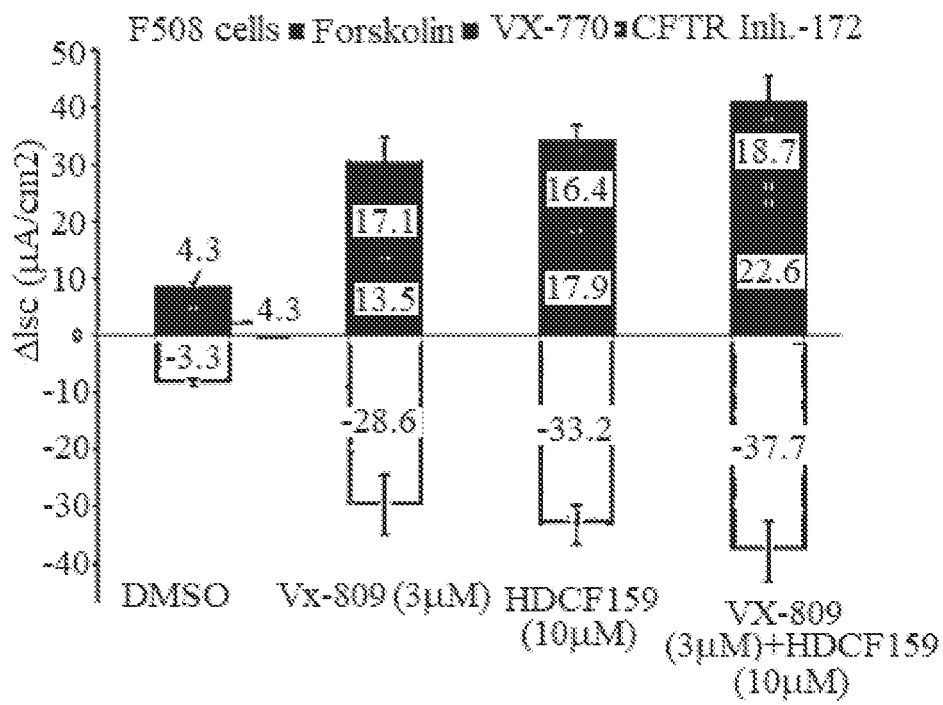
FIG. 4B shows data on HDCF159, N-(4-(4-(1-(2,2-difluorobenzo[d][1,3]dioxol-5-yl)cyclopropane-1-carboxamido)phenyl)thiazol-2-yl)cyclopentanecarboxamide, in combination with other agents tested in cells with CFTR F508del.
Figure 4C:
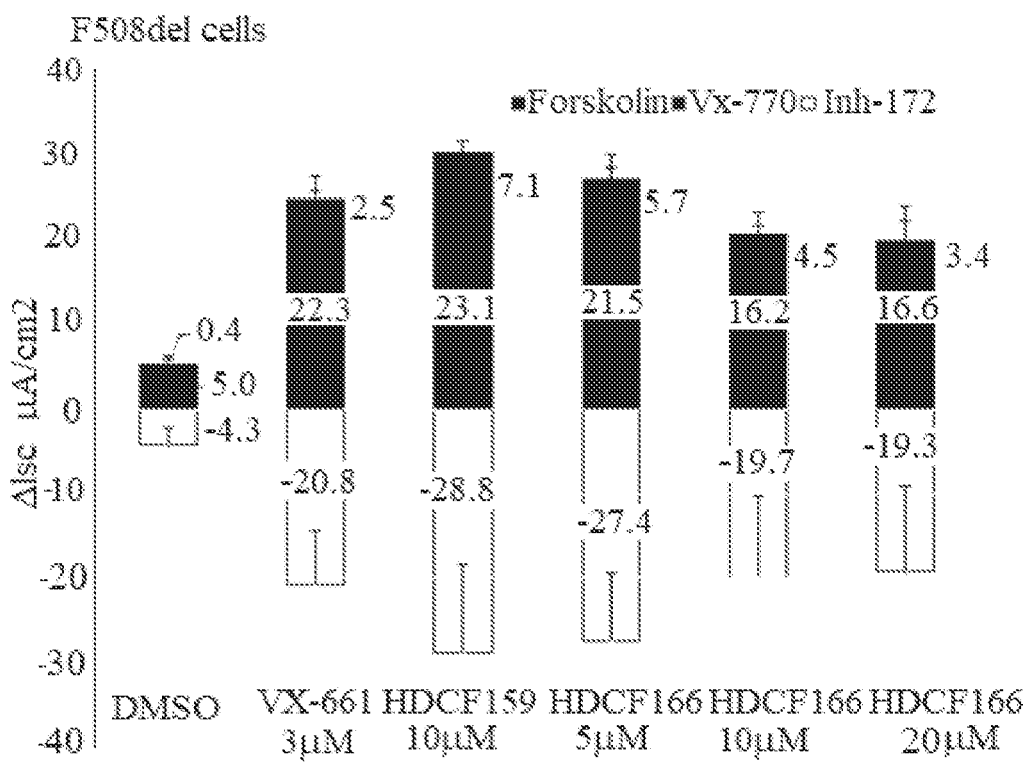
FIG. 4C shows data on HDCF166, N-(3-(4-(1-(2,2-difluorobenzo[d][1,3]dioxol-5-5 yl)cyclopropane-1-carboxamido)phenyl)-1,2,4-thiadiazol-5-yl)cyclopentanecarboxamide, in combination with other agents tested in cells with CFTR F508del.
Figure 5:
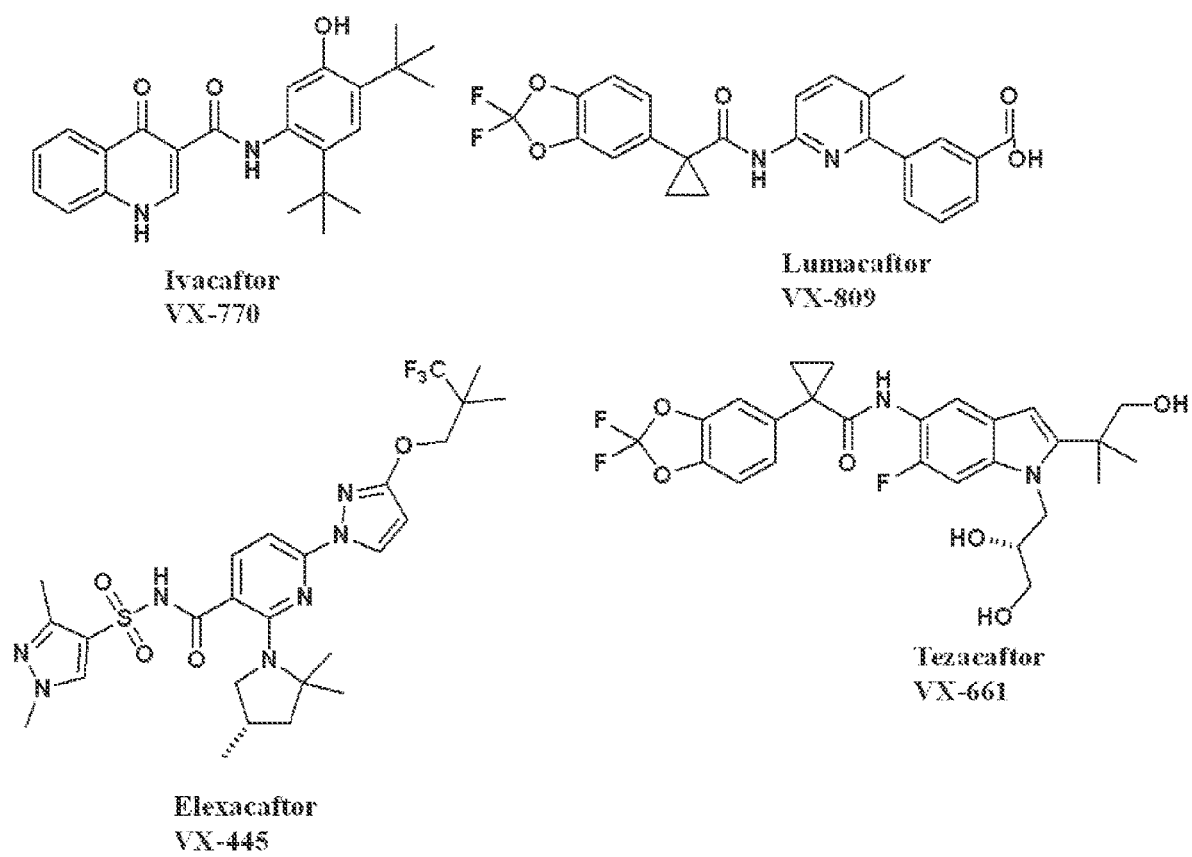
FIG. 5 shows the chemical structure of therapeutic agents.
Figure 6A:
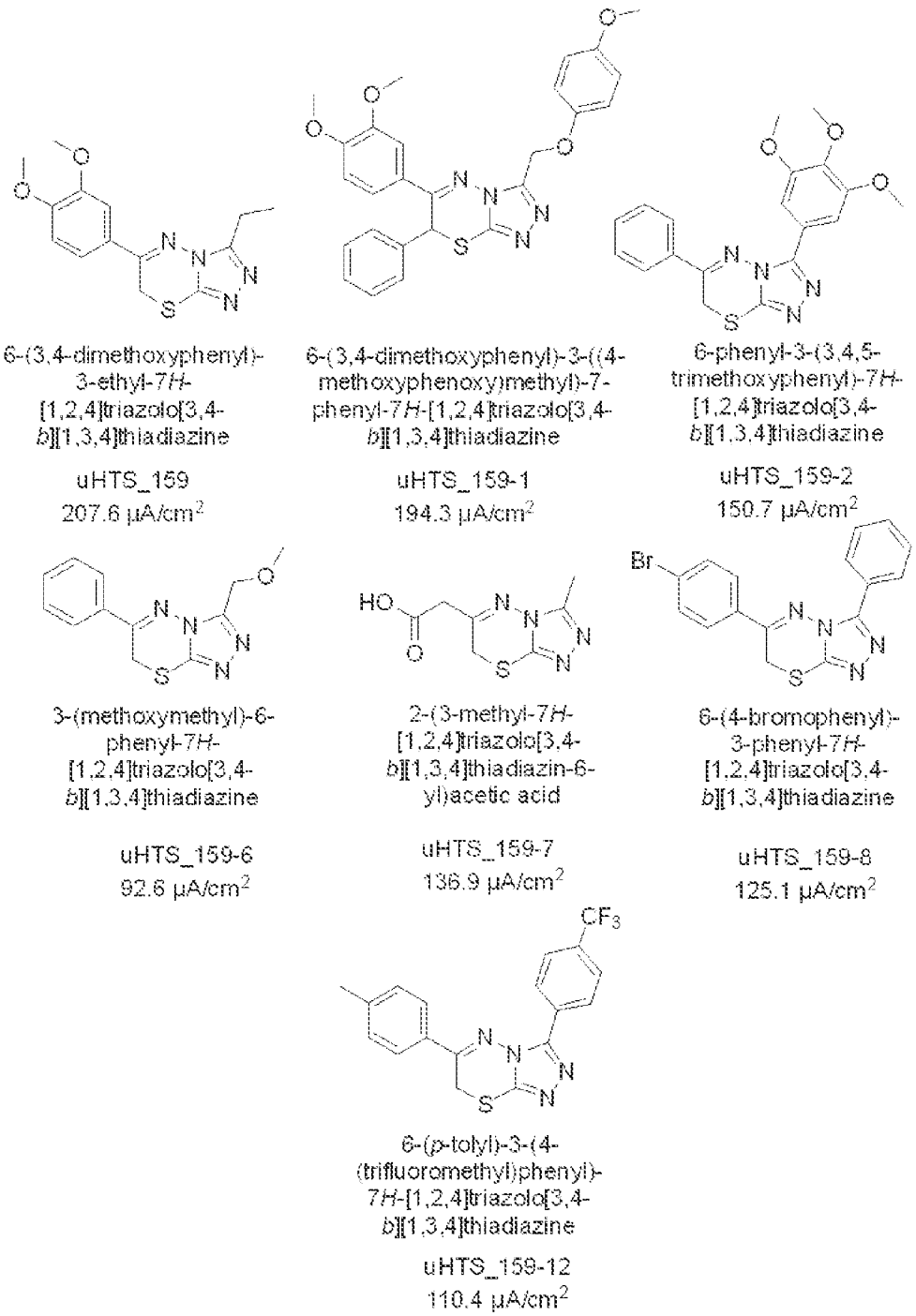
Figure 6B:
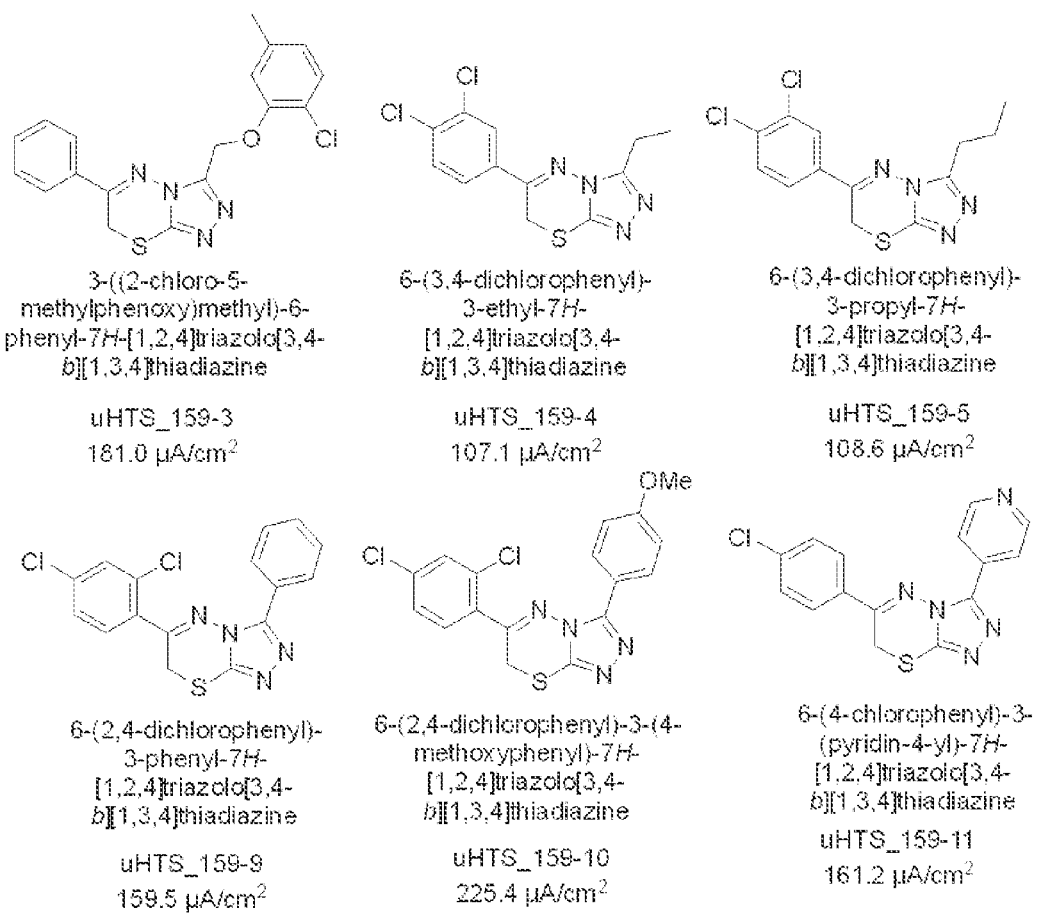
Figure 6C:
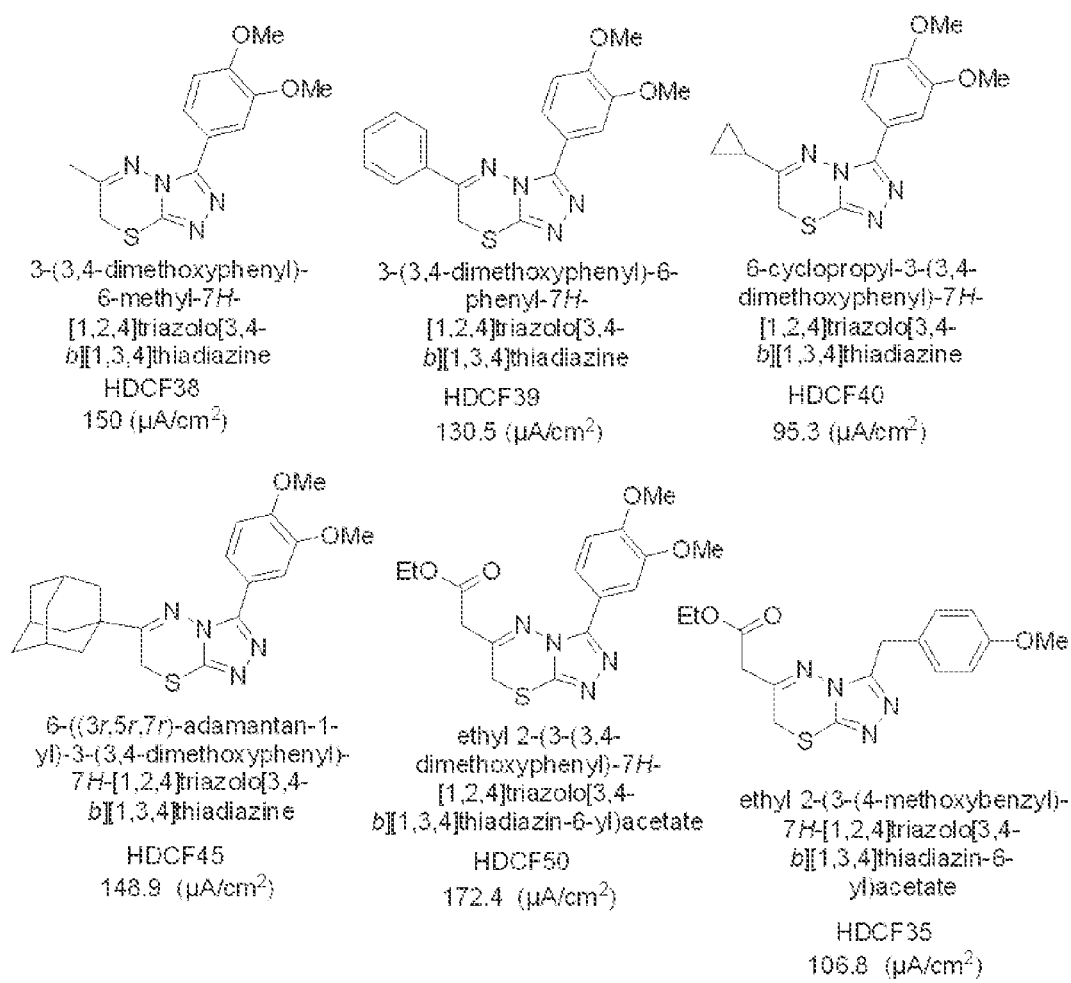
Figure 6D:
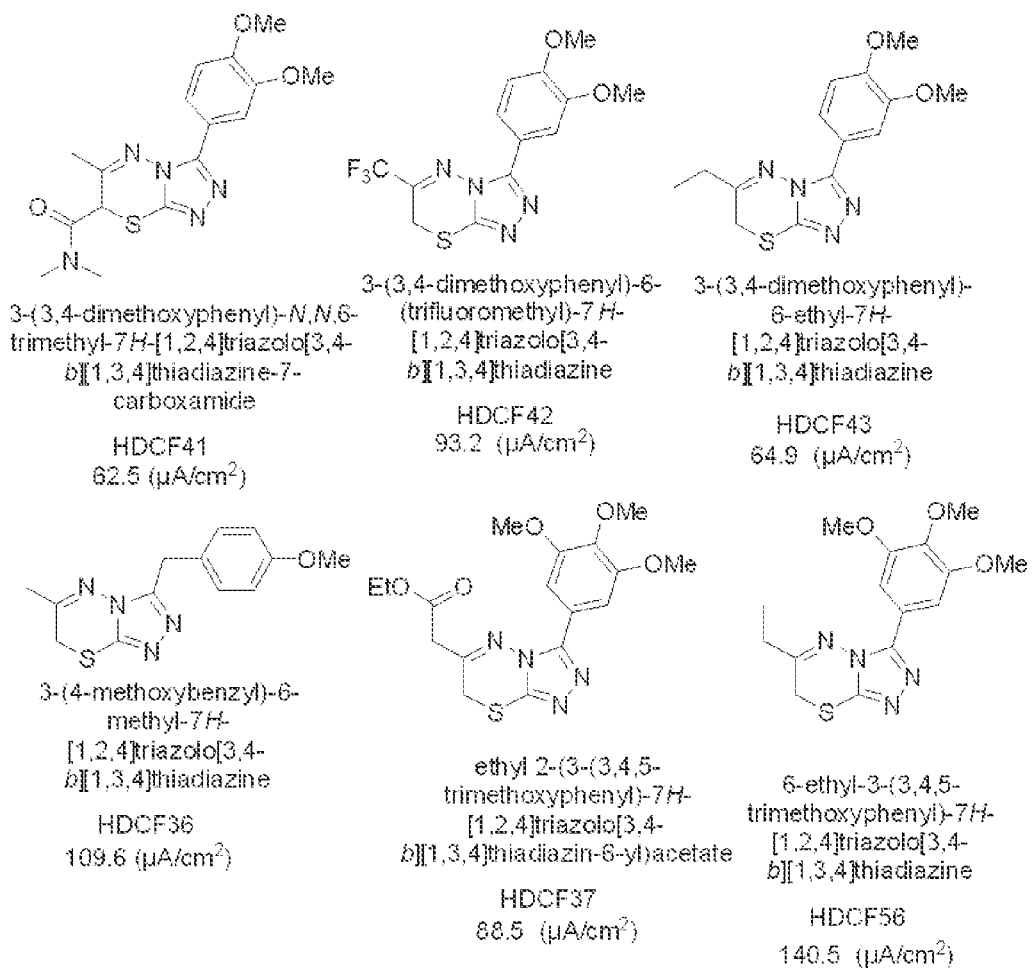
Figure 6E:
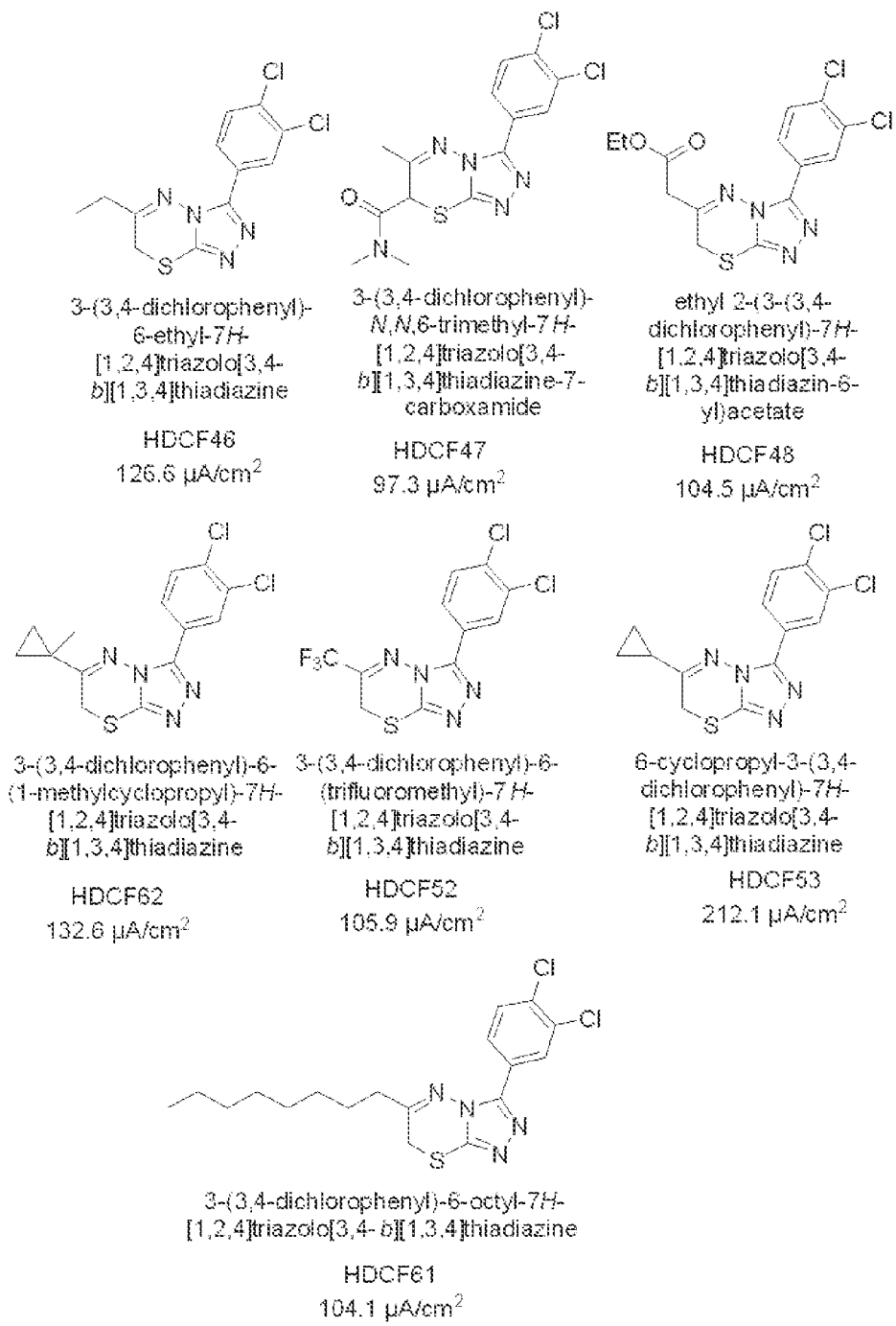
Figure 6F:
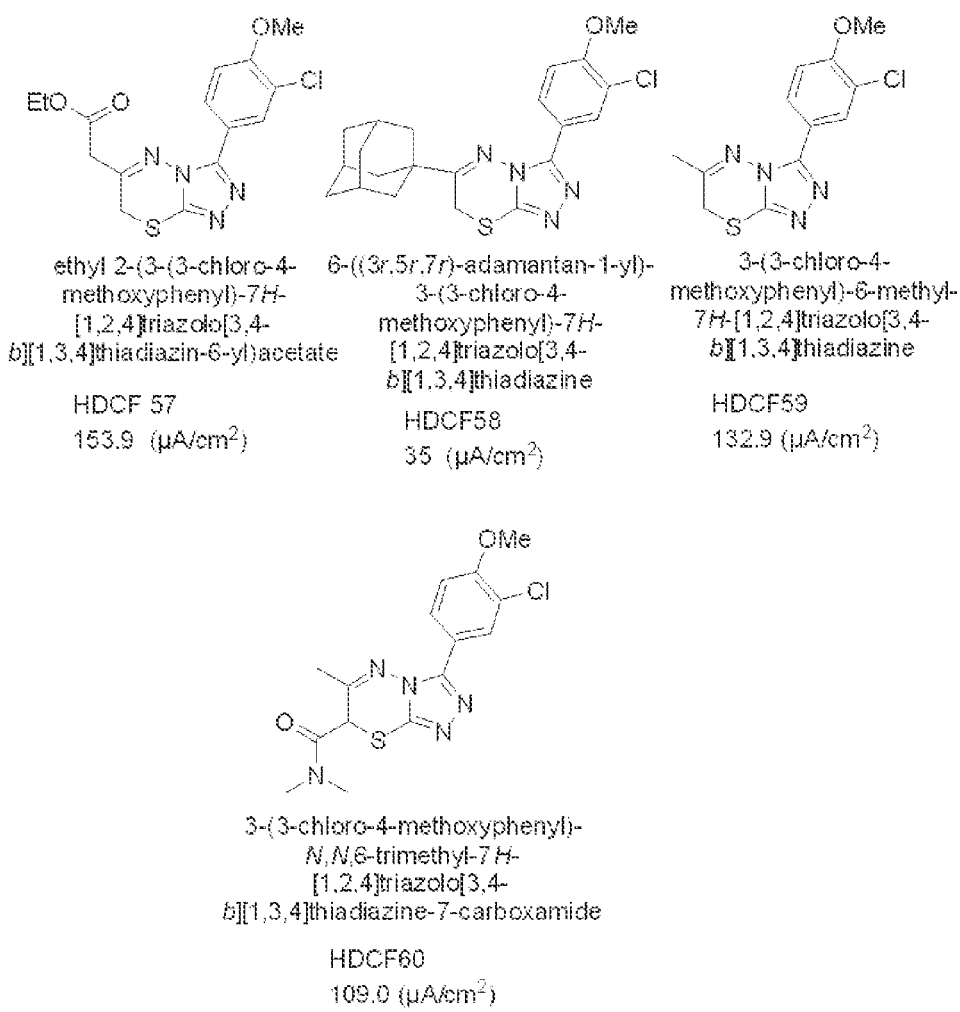
Figure 6G:
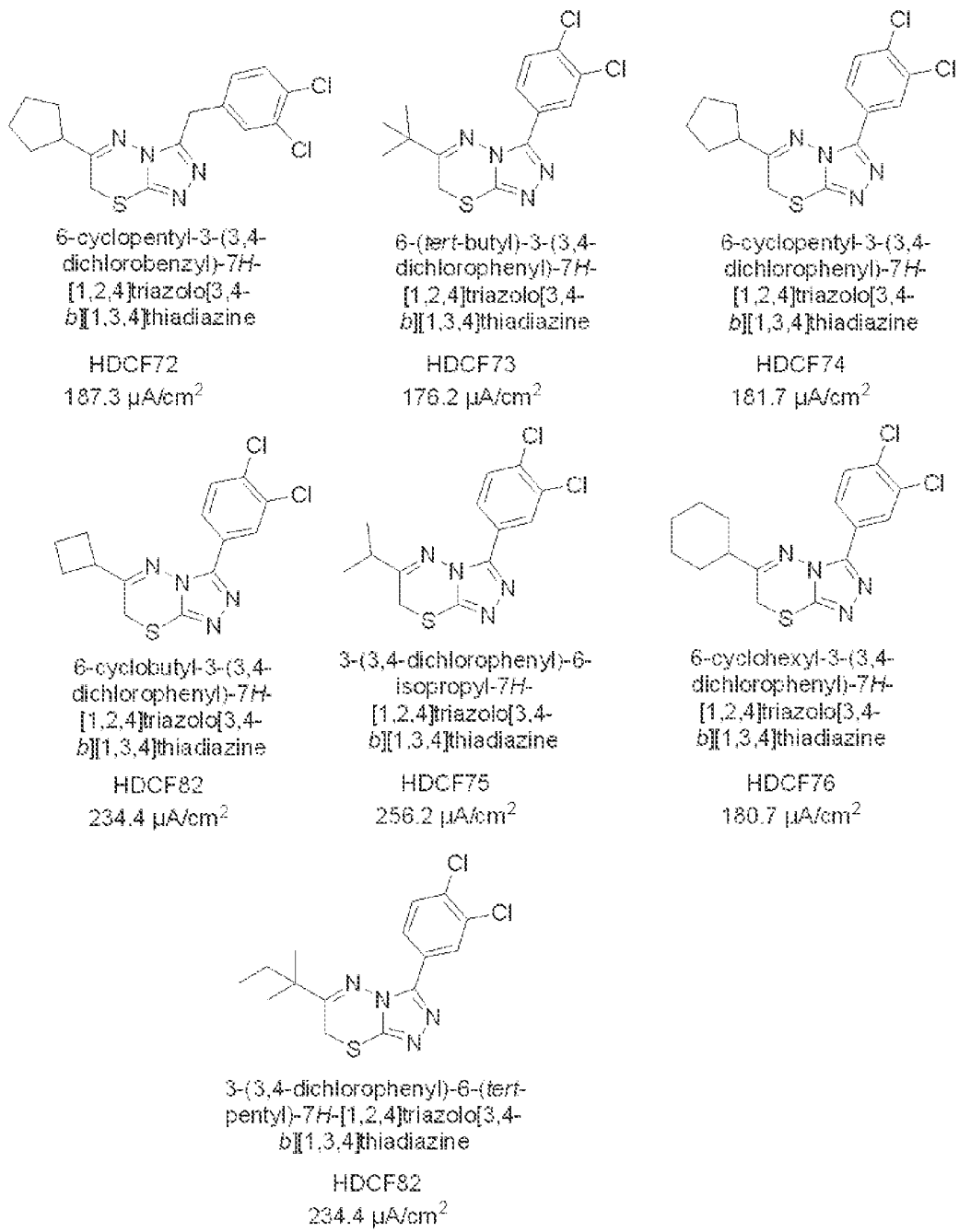
Figure 6H:
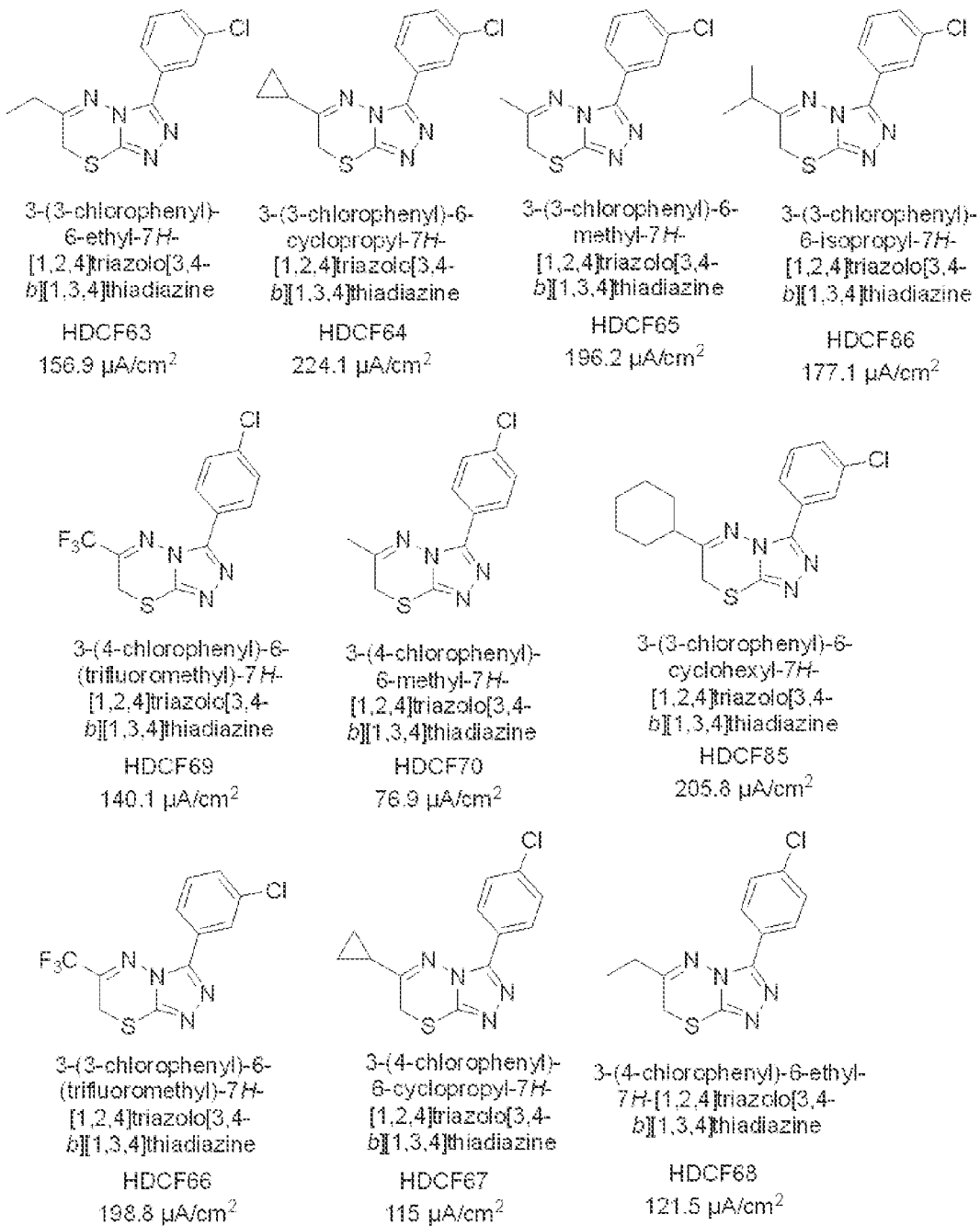
Figure 6I:
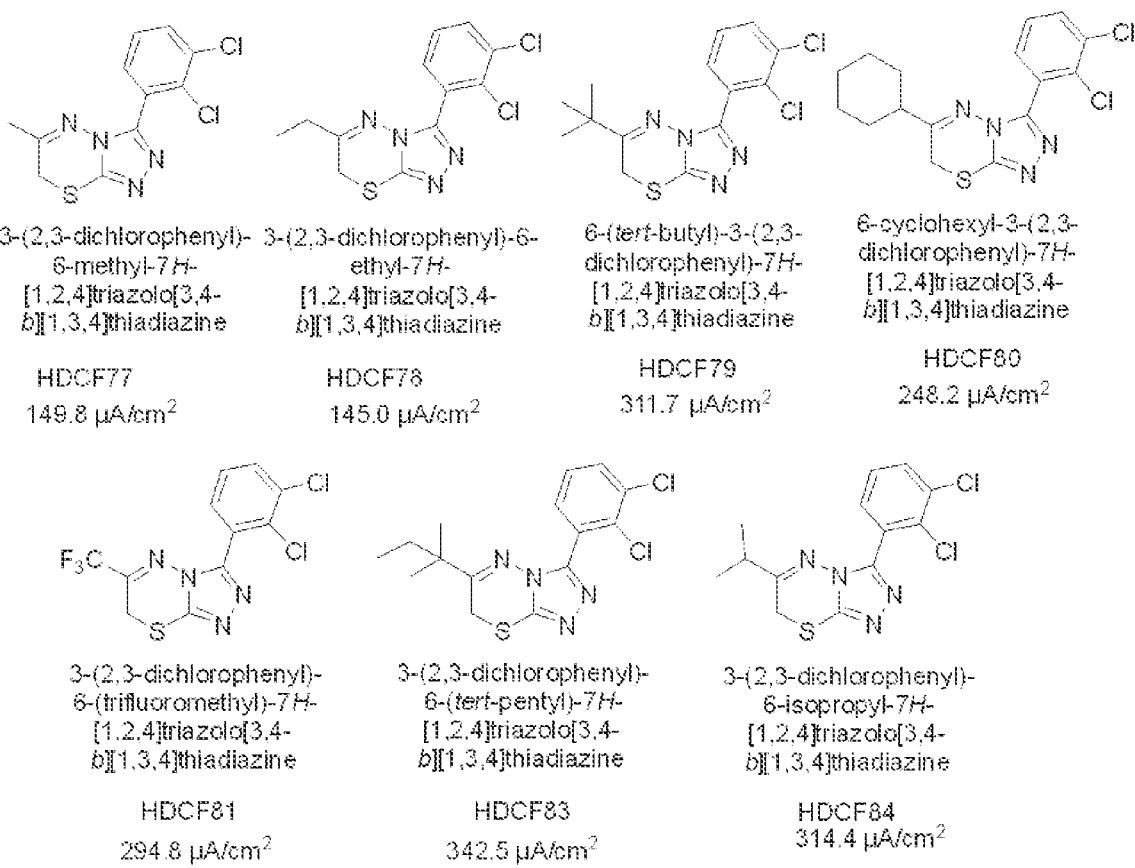
Figure 6J:
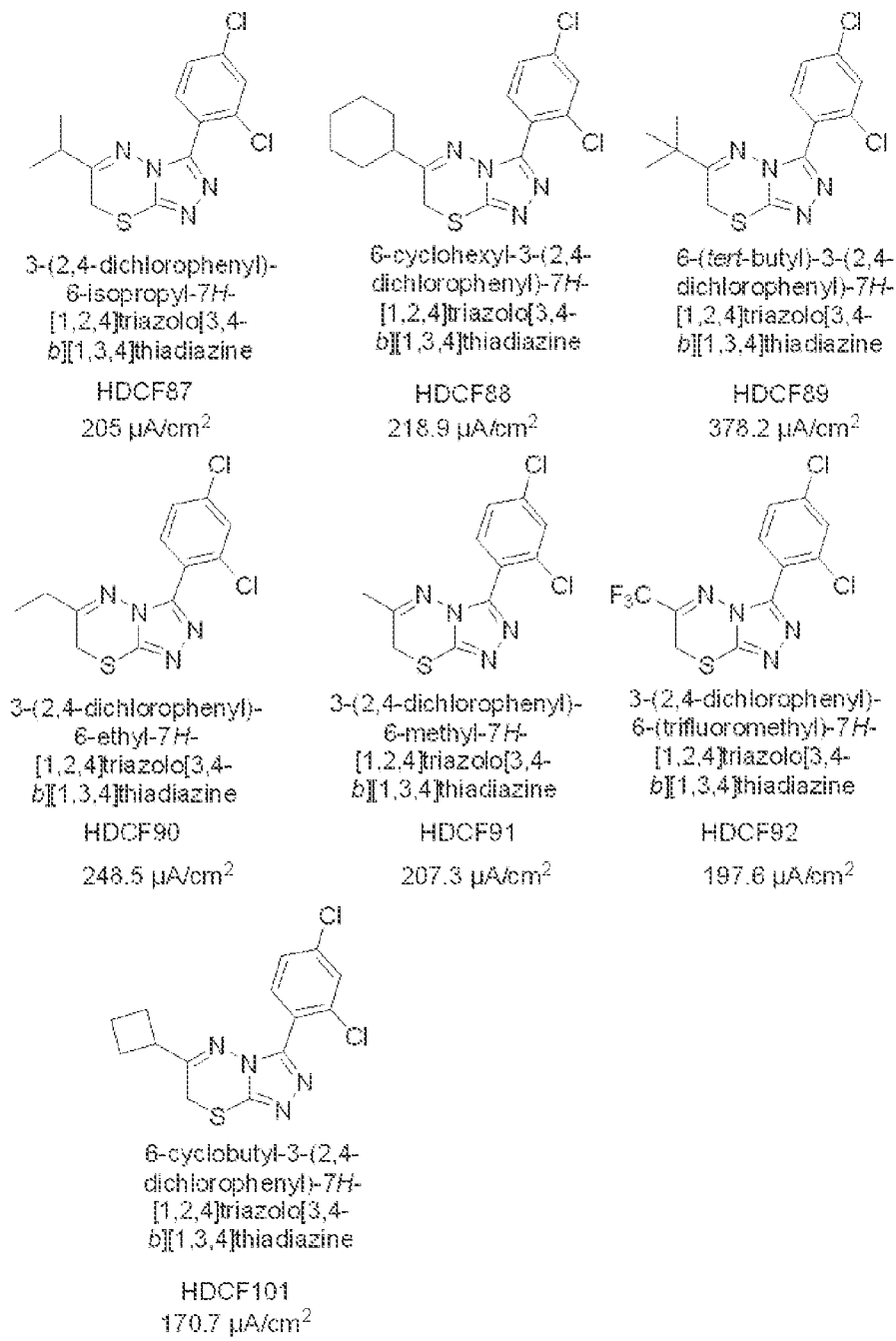
Figure 6K:
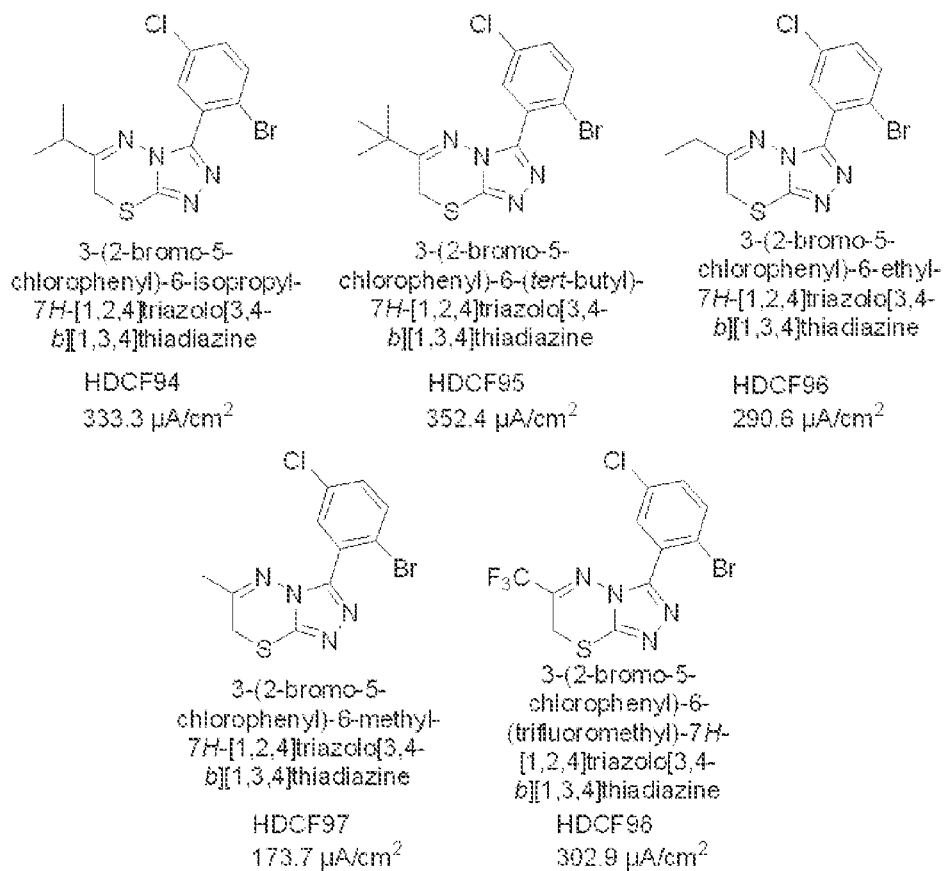
Figure 6L:
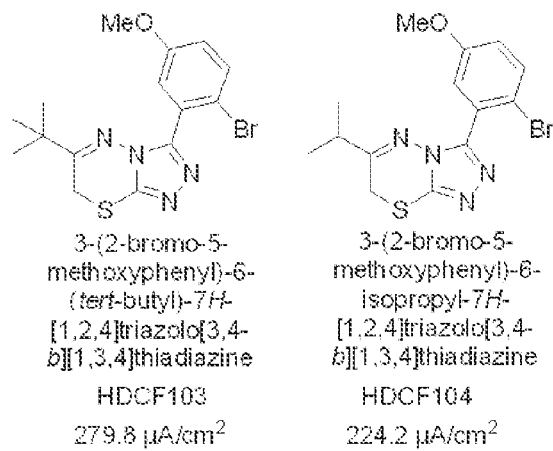

FIG. 6A illustrates compounds of this disclosure.
FIG. 6B illustrates compounds of this disclosure.
FIG. 6C illustrates compounds of this disclosure.
FIG. 6D illustrates compounds of this disclosure.
FIG. 6E illustrates compounds of this disclosure.
FIG. 6F illustrates compounds of this disclosure.
FIG. 6G illustrates compounds of this disclosure.
FIG. 6H illustrates compounds of this disclosure.
FIG. 6I illustrates compounds of this disclosure.
FIG. 6J illustrates compounds of this disclosure.
FIG. 6K illustrates compounds of this disclosure.
FIG. 6L illustrates compounds of this disclosure.

Figure 7:
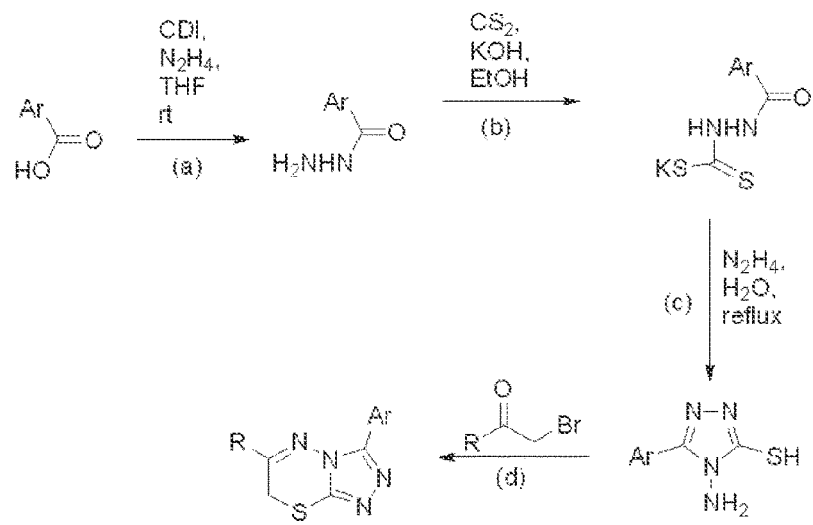

FIG. 7 shows a general synthetic protocol to prepare 7H-[1,2,4]triazolo[3,4-b][1,3,4]thiadiazine derivatives. Reagents and conditions: a) CDI, hydrazine hydrate, THF, rt for O/N, 66-95%; b) $CS_2$, KOH, EtOH, rt for O/N; c) hydrazine hydrate, water, reflux for 8 h, for 2 steps; d) different α-halogen ketone reflux in EtOH for O/N.

Figure 8A:
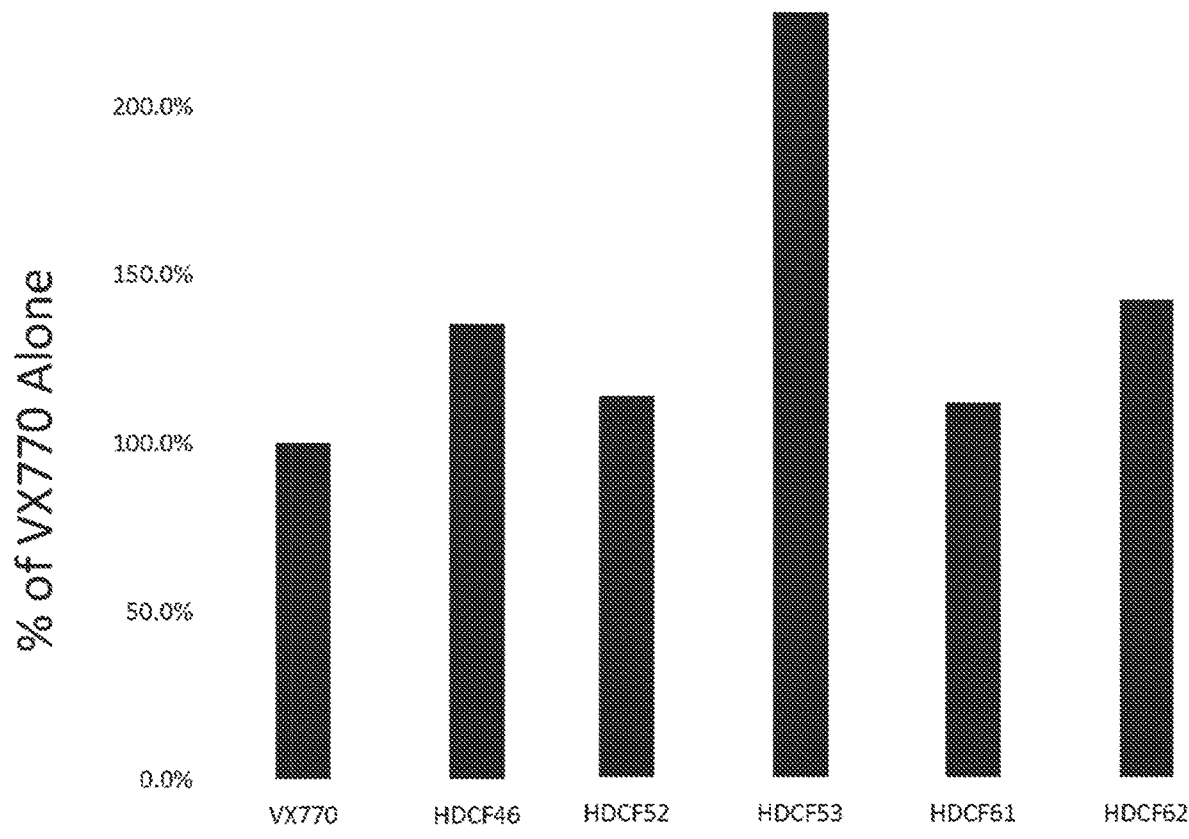

FIG. 8A shows activity data comparing compounds of this disclosure and VX770 to co-potentiate G551D CFTR.

Figure 8B:
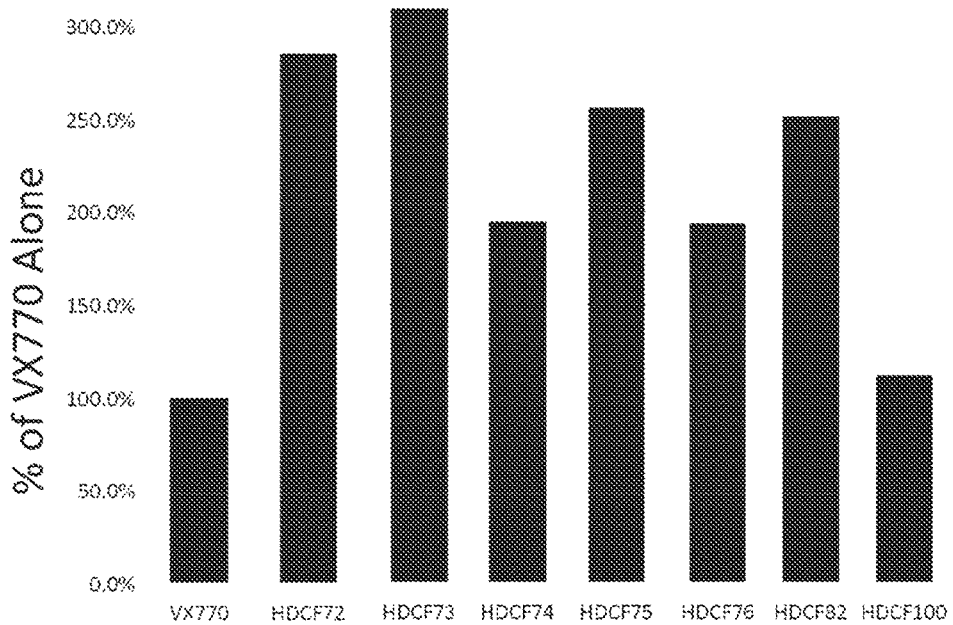

FIG. 8B shows activity data comparing compounds of this disclosure and VX770 to co-potentiate G551D CFTR.

Figure 8C:
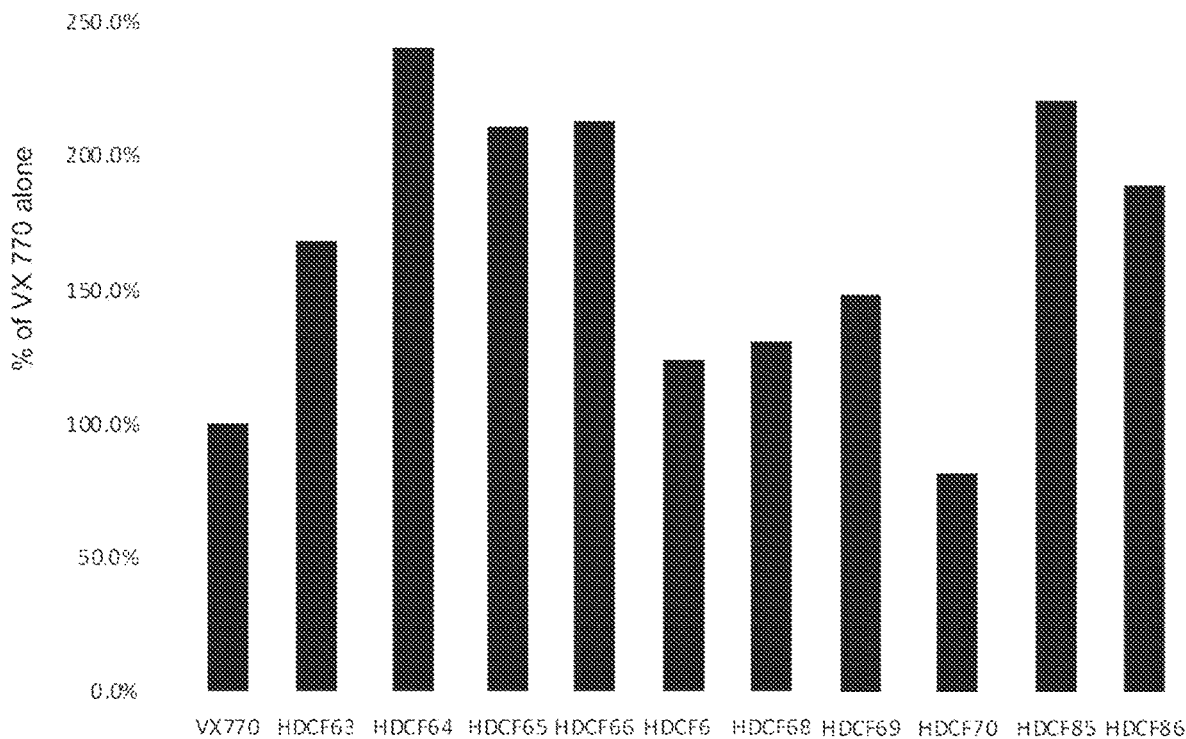

FIG. 8C shows activity data comparing compounds of this disclosure and VX770 to co-potentiate G551D CFTR.

Figure 8D:
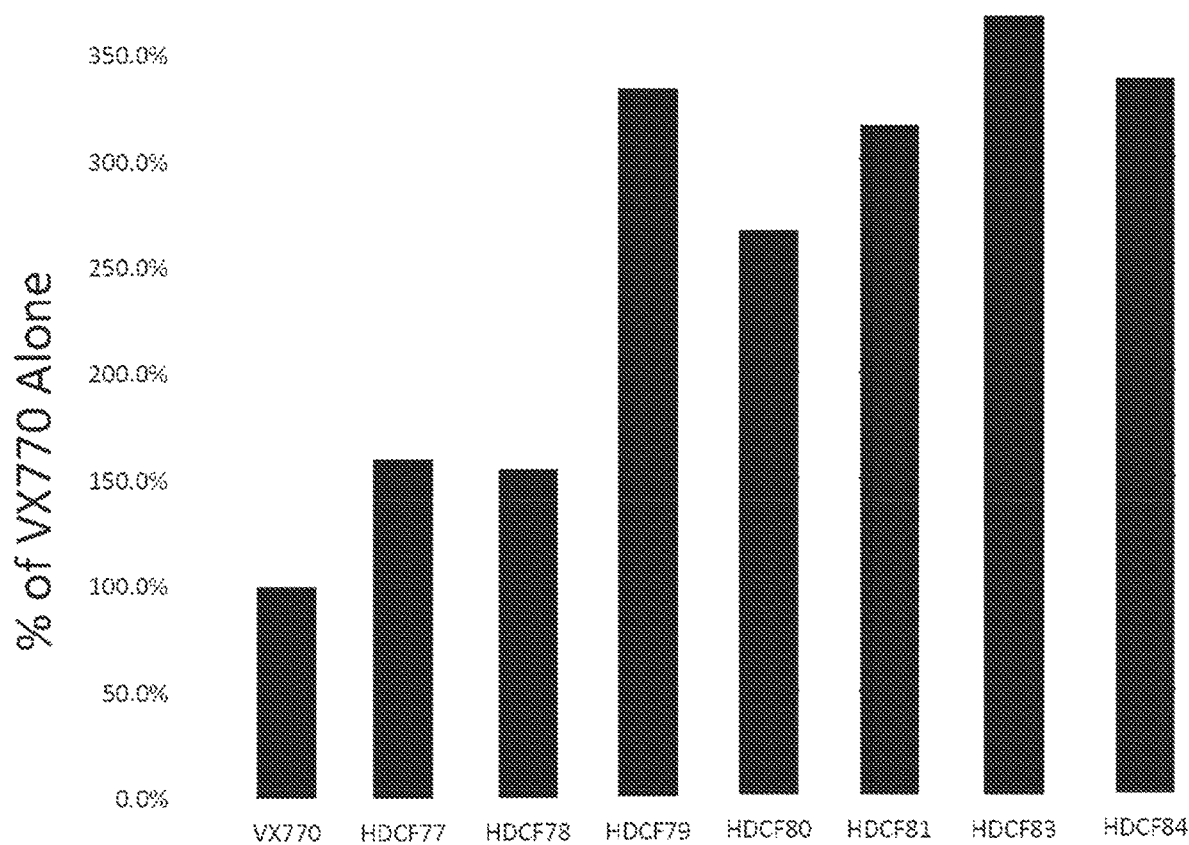

FIG. 8D shows activity data comparing compounds of this disclosure and VX770 to co-potentiate G551D CFTR.

Figure 8E:
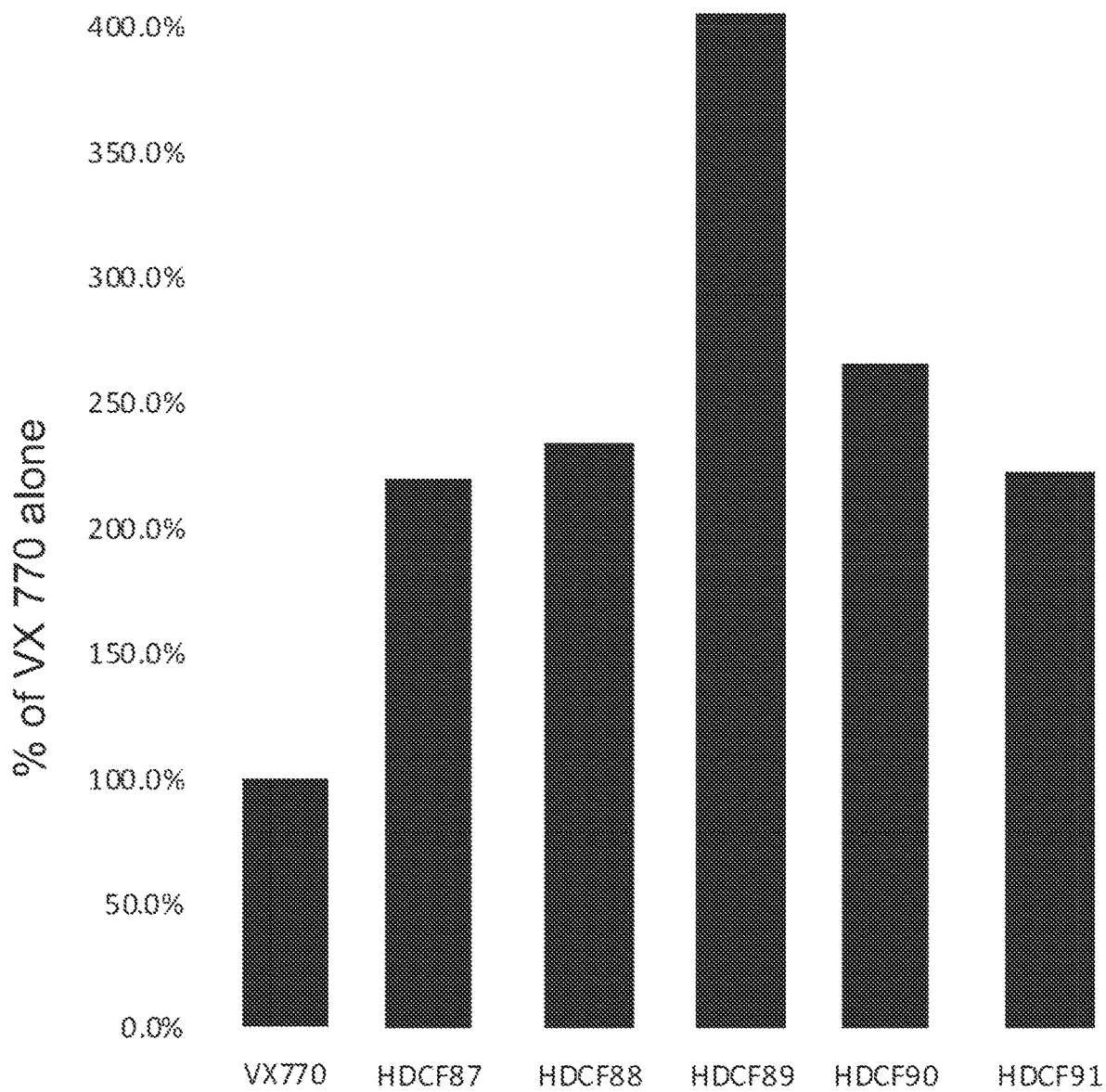

FIG. 8E shows activity data comparing compounds of this disclosure and VX770 to co-potentiate G551D CFTR.

Figure 8F:
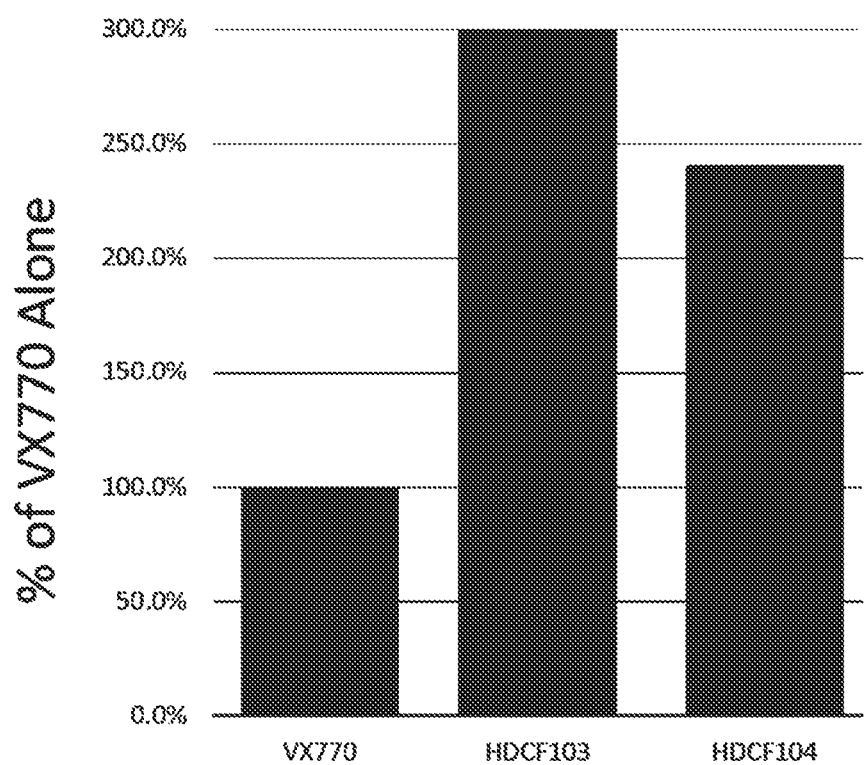

FIG. 8F shows activity data comparing compounds of this disclosure and VX770 to co-potentiate G551D CFTR.

DETAILED DESCRIPTION

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of medicine, organic chemistry, biochemistry, molecular biology, pharmacology, and the like, which are within the skill of the art. Such techniques are explained fully in the literature.

It must be noted that, as used in the specification and the appended claims, the singular forms "a," "an," and "the" include plural referents unless the context clearly dictates otherwise. In this specification and in the claims that follow, reference will be made to a number of terms that shall be defined to have the following meanings unless a contrary intention is apparent.

"Subject" refers to any animal, preferably a human patient, livestock, rodent, monkey or domestic pet.

As used herein, "alkyl" means a noncyclic straight chain or branched, unsaturated or saturated hydrocarbon such as those containing from 1 to 10 carbon atoms. Representative saturated straight chain alkyls include methyl, ethyl, n-propyl, n-butyl, n-pentyl, n-hexyl, n-septyl, n-octyl, n-nonyl, and the like; while saturated branched alkyls include isopropyl, sec-butyl, isobutyl, tert-butyl, isopentyl, and the like. Unsaturated alkyls contain at least one double or triple bond between adjacent carbon atoms (referred to as an "alkenyl" or "alkynyl", respectively). Representative straight chain and branched alkenyls include ethylenyl, propylenyl, 1-butenyl, 2-butenyl, isobutylenyl, 1-pentenyl, 2-pentenyl, 3-methyl-1-butenyl, 2-methyl-2-butenyl, 2,3-dimethyl-2-butenyl, and the like; while representative straight chain and branched alkynyls include acetylenyl, propynyl, 1-butynyl, 2-butynyl, 1-pentynyl, 2-pentynyl, 3-methyl-1-butynyl, and the like.

Non-aromatic mono or polycyclic alkyls are referred to herein as "carbocycles" or "carbocyclyl" groups. Representative saturated carbocycles include cyclopropyl, cyclobutyl, cyclopentyl, cyclohexyl, and the like; while unsaturated carbocycles include cyclopentenyl and cyclohexenyl, and the like.

"Heterocarbocycles" or heterocarbocyclyl" groups are carbocycles which contain from 1 to 4 heteroatoms independently selected from nitrogen, oxygen and sulfur which may be saturated or unsaturated (but not aromatic), monocyclic or polycyclic, and wherein the nitrogen and sulfur heteroatoms may be optionally oxidized, and the nitrogen heteroatom may be optionally quaternized. Heterocarbocycles include morpholinyl, pyrrolidinonyl, pyrrolidinyl, piperidinyl, hydantoinyl, valerolactamyl, oxiranyl, oxetanyl, tetrahydrofuranyl, tetrahydropyranyl, tetrahydropyridinyl, tetrahydropyrimidinyl, tetrahydrothiophenyl, tetrahydrothiopyranyl, tetrahydropyrimidinyl, tetrahydrothiophenyl, tetrahydrothiopyranyl, and the like.

"Aryl" means an aromatic carbocyclic monocyclic or polycyclic ring such as phenyl or naphthyl. Polycyclic ring systems may, but are not required to, contain one or more non-aromatic rings, as long as one of the rings is aromatic.

As used herein, "heterocycle" or "heterocyclyl" refers to mono- and polycyclic ring systems having 1 to 4 heteroatoms selected from nitrogen, oxygen and sulfur, and containing at least 1 carbon atom. The mono- and polycyclic ring systems may be aromatic, non-aromatic or mixtures of aromatic and non-aromatic rings. Heterocycle includes heterocarbocycles, heteroaryls, and the like.

As used herein, "heteroaryl" or "heteroaromatic" refers an aromatic heterocarbocycle having 1 to 4 heteroatoms selected from nitrogen, oxygen and sulfur, and containing at least 1 carbon atom, including both mono- and polycyclic ring systems. Polycyclic ring systems may, but are not required to, contain one or more non-aromatic rings, as long as one of the rings is aromatic. Representative heteroaryls are furyl, benzofuranyl, thiophenyl, benzothiophenyl, pyrrolyl, indolyl, isoindolyl, azaindolyl, pyridyl, quinolinyl, isoquinolinyl, oxazolyl, isoxazolyl, benzoxazolyl, pyrazolyl, imidazolyl, benzimidazolyl, thiazolyl, benzothiazolyl, isothiazolyl, pyridazinyl, pyrimidinyl, pyrazinyl, triazinyl, cinnolinyl, phthalazinyl, and quinazolinyl. It is contemplated that the use of the term "heteroaryl" includes N-alkylated derivatives such as a 1-methylimidazol-5-yl substituent.

"Alkylthio" refers to an alkyl group as defined above attached through a sulfur bridge. An example of an alkylthio is methylthio, (i.e., —S—CH$_3$).

"Alkoxy" refers to an alkyl group as defined above attached through an oxygen bridge. Examples of alkoxy include, but are not limited to, methoxy, ethoxy, n-propoxy, i-propoxy, n-butoxy, s-butoxy, t-butoxy, n- pentoxy, and s-pentoxy. Preferred alkoxy groups are methoxy, ethoxy, n-propoxy, propoxy, n-butoxy, s-butoxy, t-butoxy.

"Alkylamino" refers an alkyl group as defined above attached through an amino bridge. An example of an alkylamino is methylamino, (i.e., —NH—CH$_3$).

"Alkanoyl" refers to an alkyl as defined above attached through a carbonyl bridge (i.e., —(C=O)alkyl).

"Alkylsulfonyl" refers to an alkyl as defined above attached through a sulfonyl bridge (i.e., —S(=O)$_2$alkyl) such as mesyl and the like, and "Arylsulfonyl" refers to an aryl attached through a sulfonyl bridge (i.e., —S(=O)$_2$aryl).

"Alkylsulfinyl" refers to an alkyl as defined above with the indicated number of carbon atoms attached through a sulfinyl bridge (i.e. —S(=O)alkyl).

The terms "halogen" and "halo" refer to fluorine, chlorine, bromine, and iodine.

The term "sulfamoyl" refers to the amide of sulfonic acid (i.e., —S(=O)$_2$NRR').

As one of ordinary skill in the art will recognize, combinations of substituents envisioned by this disclosure are those combinations that result in the formation of stable or chemically feasible compounds. The term "stable", as used herein, refers to compounds that are not substantially altered when subjected to conditions to allow for their production, detection, and preferably their recovery, purification, and use for one or more of the purposes disclosed herein. In some embodiments, a stable compound or chemically feasible compound is one that is not substantially altered when kept at a temperature of 40° C. or less, in the absence of moisture or other chemically reactive conditions, for at least a week.

As used herein, the term "derivative" refers to a structurally similar compound that retains sufficient functional attributes of the identified analogue. The derivative may be structurally similar because it is lacking one or more atoms, contains an enriched atomic isotope, substituted, a salt, in different hydration/oxidation states, or because one or more atoms within the molecule are switched, such as, but not limited to, replacing an oxygen atom with a sulfur atom or replacing an amino group with a hydroxy group. A derivative may be when two alkoxy groups are bound to the same atom or adjacent atoms, the two alkoxy groups form a ring together with the atom(s) to which they are bound. The derivative may be a prodrug. Derivatives may be prepared by any variety of synthetic methods or appropriate adaptations presented in synthetic or organic chemistry textbooks, such as those provide in March's Advanced Organic Chemistry: Reactions, Mechanisms, and Structure, Wiley, 6th Edition (2007) Michael B. Smith or Domino Reactions in Organic Synthesis, Wiley (2006) Lutz F. Tietze, hereby incorporated by reference.

The term "prodrug" refers to an agent that is converted into a biologically active form in vivo. Prodrugs are often useful because, in some situations, they may be easier to administer than the parent compound. They may, for instance, be bioavailable by oral administration whereas the parent compound is not. The prodrug may also have improved solubility in pharmaceutical compositions over the parent drug. A prodrug may be converted into the parent drug by various mechanisms, including enzymatic processes and metabolic hydrolysis. Typical prodrugs are pharmaceutically acceptable esters. Prodrugs include compounds wherein a hydroxy, amino or mercapto group is bonded to any group that, when the prodrug of the active compound is administered to a subject, cleaves to form a free hydroxy, free amino or free mercapto group, respectively. Examples of prodrugs include, but are not limited to, acetate, formate, and benzoate derivatives of an alcohol or acetamide, formamide, methanesulfonate, and benzamide derivatives of an amine functional group in the active compound and the like.

The term "substituted" refers to a molecule wherein at least one hydrogen atom is replaced with a substituent. When substituted, one or more of the groups are "substituents." The molecule may be multiply substituted. In the case of an oxo substituent ("=O"), two hydrogen atoms are replaced. Example substituents within this context may include halogen, hydroxy, alkyl, alkoxy, nitro, cyano, oxo, carbocyclyl, carbocycloalkyl, heterocarbocyclyl, heterocarbocycloalkyl, aryl, arylalkyl, heteroaryl, heteroarylalkyl, —NR$_a$R$_b$, —NR$_a$C(=O)R$_b$, —NR$_a$C(=O)NR$_a$NR$_b$, —NR$_a$C(=O)OR$_b$, —NR$_a$SO$_2$R$_b$, —C(=O)R$_a$, —C(=O)OR$_a$, —C(=O)NR$_a$R$_b$, —OC(=O)NR$_a$R$_b$, —OR$_a$, —SR$_a$, —SOR$_a$, —S(=O)$_2$R$_a$, —OS(=O)$_2$R$_a$ and —S(=O)$_2$R$_a$. R$_a$ and R$_b$ in this context may be the same or different and independently hydrogen, halogen hydroxy, alkyl, alkoxy, alkyl, amino, alkylamino, dialkylamino, carbocyclyl, carbocycloalkyl, heterocarbocyclyl, heterocarbocycloalkyl, aryl, arylalkyl, heteroaryl, heteroarylalkyl.

As used herein, "mutations" can refer to mutations in the CFTR gene or the CFTR protein. A "CFTR gene mutation" refers to a mutation in the CFTR gene, and a "CFTR protein mutation" refers to a mutation in the CFTR protein. A genetic defect or mutation, or a change in the nucleotides in a gene general results in a mutation in the CFTR protein translated from that gene, a deletion of the c-terminal segment after the mutation, a frame shift, or combination of such. In a human, a mutation may occur on one or both alleles. As used herein, a patient who is "homozygous" for a particular gene mutation has the same mutation on each allele. As used herein, a patient who is "heterozygous" for a particular gene mutation has this mutation on one allele, and a wild-type sequence or different mutation on the other allele.

As used herein, the term "modulator" refers to a compound that increases the activity of a biological compound such as a protein. For example, a CFTR modulator is a compound that increases the activity of CFTR. The increase in activity resulting from a CFTR modulator includes but is not limited to compounds that correct, potentiate, stabilize and/or amplify CFTR.

As used herein, the term "CFTR corrector" refers to a compound that facilitates the processing and trafficking of CFTR to increase the amount of CFTR at the cell surface. Examples include lumacaftor, tezacaftor, elexacaftor, cavosonstat, and (FDL169) 2-(7-ethoxy-4-(3-fluorophenyl)-1-oxophthalazin-2(1H)-yl)-N-methyl-N-(2-methylbenzo[d]oxazol-6-yl)acetamide. Lumacaftor and tezacaftor are believed to work by binding to the F508del-CFTR protein.

As used herein, the term "CFTR potentiator" refers to a compound that increases the channel activity of CFTR protein located at the cell surface, resulting in enhanced ion transport. Ivacaftor is an example of a CFTR potentiator.

The terms "effective dose" and "effective amount" are used interchangeably herein and refer to that amount of a compound that produces the desired effect for which it is administered (e.g., improvement in CF or a symptom of CF, or lessening the severity of CF or a symptom of CF). The exact amount of an effective dose will depend on the purpose of the treatment and is ascertainable by one skilled in the art using known techniques.

As used herein, the terms "treat" and "treating" are not limited to the case where the subject (e.g., patient) is cured and the disease is eradicated. Rather, embodiments, of the present disclosure also contemplate treatment that merely reduces symptoms, and/or delays disease progression. "Treatment," as used in the context of a respiratory disease such as CF includes, but is not limited to, the following: increased growth of the subject, increased weight gain, reduction of mucus in the lungs, improved pancreatic and/or liver function, reduction of chest infections, and/or reductions in coughing or shortness of breath. Improvements in or lessening the severity of any of these symptoms can be readily assessed according to standard methods and techniques known in the art.

As used herein, the term "in combination with," when referring to two or more compounds, agents, or additional active pharmaceutical ingredients, means the administration of two or more compounds, agents, or active pharmaceutical ingredients to the patient prior to, concurrent with, or subsequent to each other.

CFTR Modulators

In certain embodiments, the CFTR modulators are compounds described in formulas I, II, III, or IV, derivatives, prodrugs, and salts thereof. In certain embodiments, the CFTR modulator is a compound of formula I, Formula I

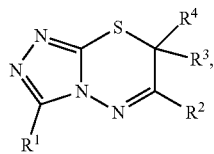

derivative or salt thereof, wherein $R^1$ is alkyl, aryl or heterocyclyl, wherein $R^1$ is optionally substituted with one or more, the same or different, $R^{10}$;

$R^2$ is hydrogen, alkyl, halogenated alkyl, halogen, hydroxy, alkoxy, amino, alkylamino, (alkyl)$_2$amino, cyano, formyl, alkanoyl, benzoyl, carboxy, carbamoyl, carbocyclyl, aryl, or heterocyclyl, wherein $R^1$ is optionally substituted with one or more, the same or different, $R^{10}$;

$R^3$ and $R^4$ are each, individually and independently, hydrogen, alkyl, halogen, hydroxy, alkoxy, amino, alkylamino, (alkyl)$_2$amino, cyano, formyl, alkanoyl, benzoyl, carboxy, carbamoyl, carbocyclyl, aryl, or heterocyclyl, wherein $R^3$ and $R^4$ are optionally substituted with one or more, the same or different, $R^{10}$;

$R^{10}$ is alkyl, halogen, nitro, cyano, hydroxy, amino, mercapto, formyl, carboxy, carbamoyl, alkoxy, alkylthio, alkylamino, (alkyl)$_2$amino, alkylsulfinyl, alkylsulfonyl, arylsulfonyl, alkanoyl, benzoyl, carbocyclyl, aryl, or heterocyclyl, wherein $R^{10}$ is optionally substituted with one or more, the same or different, $R^{11}$; and $R^{11}$ is halogen, nitro, cyano, hydroxy, trifluoromethoxy, trifluoromethyl, amino, formyl, carboxy, carbamoyl, mercapto, sulfamoyl, methyl, ethyl, propyl, tert-butyl, methoxy, ethoxy, acetyl, acetoxy, methylamino, ethylamino, dimethylamino, diethylamino, N-methyl-N -ethylamino, acetylamino, N-methylcarbamoyl, N-ethylcarbamoyl, N,N-dimethylcarbamoyl, N,N -diethylcarbamoyl, N-methyl-N-ethylcarbamoyl, methylthio, ethylthio, methylsulfinyl, ethylsulfinyl, mesyl, ethylsulfonyl, methoxycarbonyl, ethoxycarbonyl, N-methylsulfamoyl, N-ethylsulfamoyl, N,N-dimethylsulfamoyl, N,N-diethylsulfamoyl, N-methyl-N-ethylsulfamoyl, carbocyclyl, aryl, and heterocyclyl.

In certain embodiments, $R^1$ is phenyl optionally substituted with one or more, the same or different, $R^{10}$.

In certain embodiments, $R^2$ is alkyl optionally substituted with one or more, the same or different, $R^{10}$.

In certain embodiments, $R^2$ is a branched alkyl of six or less carbons.

In certain embodiments, $R^2$ is carbocyclyl optionally substituted with one or more, the same or different, $R^{10}$.

In certain embodiments, $R^2$ is a cyclopropyl or methylcyclopropyl.

In certain embodiments, $R^3$ and $R^4$ are hydrogen.

In certain embodiments, $R^1$ is phenyl optionally substituted with one or more, the same or different, $R^{10}$, and $R^3$ and $R^4$ are hydrogen.

In certain embodiments, $R^2$ is alkyl optionally substituted with one or more, the same or different, $R^{10}$, and $R^3$ and $R^4$ are hydrogen.

In certain embodiments, $R^2$ is a branched alkyl of six or less carbons, and $R^3$ and $R^4$ are hydrogen.

In certain embodiments, $R^2$ is carbocyclyl optionally substituted with one or more, the same or different, $R^{10}$, and $R^3$ and $R^4$ are hydrogen.

In certain embodiments, $R^2$ is a cyclopropyl or methylcyclopropyl, and $R^3$ and $R^4$ are hydrogen.

In certain embodiments, $R^1$ is phenyl optionally substituted with one or more, the same or different, $R^{10}$, $R^2$ is alkyl optionally substituted with one or more, the same or different, $R^{10}$, and $R^3$ and $R^4$ are hydrogen.

In certain embodiments, $R^1$ is phenyl optionally substituted with one or more, the same or different, $R^{10}$, $R^2$ is a branched alkyl of six or less carbons, and $R^3$ and $R^4$ are hydrogen.

In certain embodiments, $R^1$ is phenyl optionally substituted with one or more, the same or different, $R^{10}$, $R^2$ is carbocyclyl optionally substituted with one or more, the same or different, $R^{10}$, and $R^3$ and $R^4$ are hydrogen.

In certain embodiments, $R^1$ is phenyl optionally substituted with one or more, the same or different, $R^{10}$, $R^2$ is a cyclopropyl or methylcyclopropyl, and $R^3$ and $R^4$ are hydrogen.

In certain embodiments, the compound of formula I is 3-(2,3-dichlorophenyl)-6-(tert -pentyl)-7H-[1,2,4]triazolo[3,4-b][1,3,4]thiadiazine(HDCF 83), 6-(tert-butyl)-3-(2,4-dichlorophenyl)-7H-[1,2,4]triazolo[3,4-b][1,3,4]thiadiazine (HDCF 89), 3-(2-bromo-5-methoxyphenyl)-6-isopropyl-7H-[1,2,4]triazolo[3,4-b][1,3,4]thiadiazine(HDCF 104) or 3-(2-bromo-5-chlorophenyl)-6-(tert-butyl)-7H-[1,2,4]triazolo[3,4-b][1,3,4]thiadiazine (HDCF 95).

In certain embodiments, the CFTR modulator is a compound of formula IA,

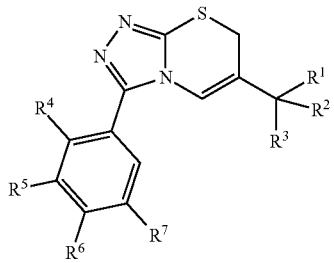

derivative or salt thereof, wherein
$R^1$ is hydrogen, halogen, or alkyl;
$R^2$ is hydrogen, halogen, or alkyl;
or $R^1$ and $R^2$ and the attached atom form a carbocyclic ring;
or $R^1$ and $R^2$ and $R^2$ and the attached atom form adamantanyl;
$R^3$ is hydrogen, halogen, or alkyl;
$R^4$ is hydrogen, halogen or alkoxy;
$R^5$ is hydrogen, halogen or alkoxy;
$R^6$ is hydrogen, halogen or alkoxy; and
$R^7$ is hydrogen, halogen or alkoxy;

In certain embodiments, the CFTR modulator is a compound of formula II,

Formula II

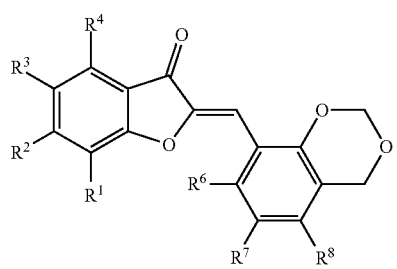

derivative or salt thereof, wherein
$R^1$, $R^2$, $R^3$, $R^4$, $R^5$, $R^6$, $R^7$, and $R^8$ are each, individually and independently, hydrogen, alkyl, halogen, hydroxy, alkoxy, amino, alkylamino, (alkyl)$_2$amino, cyano, formyl, alkanoyl, benzoyl, carboxy, carbamoyl, carbocyclyl, aryl, or heterocyclyl, wherein $R^1$, $R^2$, $R^3$, $R^4$, $R^5$, $R^6$, $R^7$, and $R^8$ are optionally substituted with one or more, the same or different, $R^{10}$;

$R^{10}$ is alkyl, halogen, nitro, cyano, hydroxy, amino, mercapto, formyl, carboxy, carbamoyl, alkoxy, alkylthio, alkylamino, (alkyl)$_2$amino, alkylsulfinyl, alkylsulfonyl, arylsulfonyl, alkanoyl, benzoyl, carbocyclyl, aryl, or heterocyclyl, wherein $R^{10}$ is optionally substituted with one or more, the same or different, $R_{11}$; and $R^{11}$ is halogen, nitro, cyano, hydroxy, trifluoromethoxy, trifluoromethyl, amino, formyl, carboxy, carbamoyl, mercapto, sulfamoyl, methyl, ethyl, propyl, tert-butyl, methoxy, ethoxy, acetyl, acetoxy, methylamino, ethylamino, dimethylamino, diethylamino, N-methyl-N -ethylamino, acetylamino, N-methylcarbamoyl, N-ethylcarbamoyl, N,N-dimethylcarbamoyl, N,N -diethylcarbamoyl, N-methyl-N-ethylcarbamoyl, methylthio, ethylthio, methylsulfinyl, ethylsulfinyl, mesyl, ethylsulfonyl, methoxycarbonyl, ethoxycarbonyl, N-methylsulfamoyl, N-ethylsulfamoyl, N,N-dimethylsulfamoyl, N,N-diethylsulfamoyl, N-methyl-N-ethylsulfamoyl, carbocyclyl, aryl, and heterocyclyl.

In certain embodiments, $R^2$ is alkoxy.

In certain embodiments, $R^7$ is halogen.

In certain embodiments, the compound of formula II is 2-((6-bromo-4H -benzo[d][1,3]dioxin-8-yl)methylene)-6-methoxybenzofuran-3 (2H)-one (Nluc uHTS_52).

In certain embodiments, the CFTR modulator is a compound of formula III,

Formula III

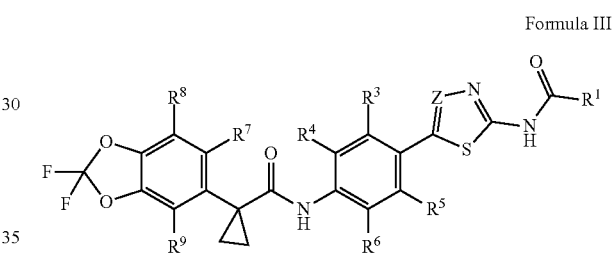

derivative or salt thereof, wherein
Z is $CR^2$ or N;
$R^1$, $R^2$, $R^3$, $R^4$, $R^5$, $R^6$, $R^7$, $R^8$ and $R^9$ are each, individually and independently, hydrogen, alkyl, halogen, hydroxy, alkoxy, amino, alkylamino, (alkyl)$_2$amino, cyano, formyl, alkanoyl, benzoyl, carboxy, carbamoyl, carbocyclyl, aryl, or heterocyclyl, wherein $R^1$, $R^2$, $R^3$, $R^4$, $R^5$, $R^6$, $R^7$, $R^8$ and $R^9$ are optionally substituted with one or more, the same or different, $R^{10}$;

$R^{10}$ is alkyl, halogen, nitro, cyano, hydroxy, amino, mercapto, formyl, carboxy, carbamoyl, alkoxy, alkylthio, alkylamino, (alkyl)$_2$amino, alkylsulfinyl, alkylsulfonyl, arylsulfonyl, alkanoyl, benzoyl, carbocyclyl, aryl, or heterocyclyl, wherein $R^{10}$ is optionally substituted with one or more, the same or different, $R^{11}$; and $R^{11}$ is halogen, nitro, cyano, hydroxy, trifluoromethoxy, trifluoromethyl, amino, formyl, carboxy, carbamoyl, mercapto, sulfamoyl, methyl, ethyl, propyl, tert-butyl, methoxy, ethoxy, acetyl, acetoxy, methylamino, ethylamino, dimethylamino, diethylamino, N-methyl-N -ethylamino, acetylamino, N-methylcarbamoyl, N-ethylcarbamoyl, N,N-dimethylcarbamoyl, N,N -diethylcarbamoyl, N-methyl-N-ethylcarbamoyl, methylthio, ethylthio, methylsulfinyl, ethylsulfinyl, mesyl, ethylsulfonyl, methoxycarbonyl, ethoxycarbonyl, N-methylsulfamoyl, N -ethylsulfamoyl, N,N-dimethylsulfamoyl, N,N-diethylsulfamoyl, N-methyl-N-ethylsulfamoyl, carbocyclyl, aryl, and heterocyclyl.

In certain embodiments, $R^1$ is a carbocyclyl.

In certain embodiments, Z is CH.

In certain embodiments, Z is N.

In certain embodiments, the compound of formula III is N-(4-(4-(1-(2,2-difluorobenzo[d][1,3]dioxol-5-yl)cyclopropane-1-carboxamido)phenyl)thiazol-2-yl)cyclopentanecarboxamide (HDCF159).

In certain embodiments, the compound of formula III is N-(3-(4-(1-(2,2-difluorobenzo[d][1,3]dioxol-5-yl)cyclopropane-1-carboxamido)phenyl)-1,2,4-thiadiazol-5-yl)cyclopentanecarboxamide (HDCF166).

In certain embodiments, the CFTR modulator is a compound of formula IV,

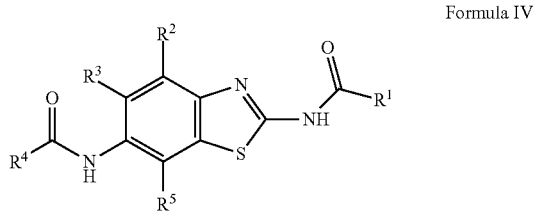

Formula IV derivative or salt thereof, wherein $R^1$, $R^2$, $R^3$, $R^4$, and $R^5$ are each, individually and independently, hydrogen, alkyl, halogen, hydroxy, alkoxy, amino, alkylamino, (alkyl)$_2$amino, cyano, formyl, alkanoyl, benzoyl, carboxy, carbamoyl, carbocyclyl, aryl, or heterocyclyl, wherein $R^1$, $R^2$, $R^3$, $R^4$, and $R^5$ are optionally substituted with one or more, the same or different, $R^{10}$;

$R^{10}$ is alkyl, halogen, nitro, cyano, hydroxy, amino, mercapto, formyl, carboxy, carbamoyl, alkoxy, alkylthio, alkylamino, (alkyl)$_2$amino, alkylsulfinyl, alkylsulfonyl, arylsulfonyl, alkanoyl, benzoyl, carbocyclyl, aryl, or heterocyclyl, wherein $R^{10}$ is optionally substituted with one or more, the same or different, $R^{11}$; and $R^{11}$ is halogen, nitro, cyano, hydroxy, trifluoromethoxy, trifluoromethyl, amino, formyl, carboxy, carbamoyl, mercapto, sulfamoyl, methyl, ethyl, propyl, tert-butyl, methoxy, ethoxy, acetyl, acetoxy, methylamino, ethylamino, dimethylamino, diethylamino, N-methyl-N-ethylamino, acetylamino, N-methylcarbamoyl, N-ethylcarbamoyl, N,N-dimethylcarbamoyl, N,N-diethylcarbamoyl, N-methyl-N-ethylcarbamoyl, methylthio, ethylthio, methylsulfinyl, ethylsulfinyl, mesyl, ethylsulfonyl, methoxycarbonyl, ethoxycarbonyl, N-methylsulfamoyl, N-ethylsulfamoyl, N,N-dimethylsulfamoyl, N,N-diethylsulfamoyl, N-methyl-N-ethylsulfamoyl, carbocyclyl, aryl, and heterocyclyl.

In certain embodiments, $R^1$ is a carbocyclyl.

In certain embodiments, $R^4$ is a pyrazolyl.

In certain embodiments, the compound of formula IV is N-(2-(cyclobutanecarboxamido)benzo[d]thiazol-6-yl)-1,3-dimethyl-1H-pyrazole-4-carboxamide (HDCF 107).

Methods of Use

In certain embodiments, this disclosure relates to methods of treating or preventing respiratory distress comprising administering to a subject in need thereof an effective amount of a compound disclosed herein.

In certain embodiments, the subject is diagnosed with a CFTR mutation. In some embodiments, the subject is human and diagnosed with a CFTR mutation selected from W1282X, N1303K, F508del, G551D, G542X, R117H, and R553X. In certain embodiments, the CFTR mutation is a genetic mutation on at least one allele.

In certain embodiments, the subject is diagnosed with cystic fibrosis, chronic obstructive pulmonary disease, bronchitis, asthma, atelectasis, pneumonia, lung fluid, lung mucus, acute respiratory distress syndrome, ventilator induced lung injury, bronchopulmonary dysplasia, airways hyperresponsiveness, allergic rhinitis; bronchitis, or emphysema.

In certain embodiments, treatment methods disclosed herein are contemplated to be done in combination with administering other agents, such as other respiratory agents or other CFTR modulators. In certain embodiments, the other CFTR modulator is ivacaftor, lumacaftor, tezacaftor, elexacaftor, or combinations thereof.

Cystic fibrosis (CF) is a recessive genetic disease. In patients with CF, mutations in Cystic Fibrosis Transmembrane Conductance Regulator (CFTR) endogenously expressed in respirator epithelia lead to reduced apical anion secretion causing an imbalance in ion and fluid transport. The resulting decrease in anion transport contributes to enhanced mucus accumulation in the lung and accompanying microbial infections that ultimately cause death in CF patients. In addition to respiratory disease, CF patients typically suffer from gastrointestinal problems and pancreatic insufficiency that, if left untreated, result in death.

Sequence analysis of the CFTR gene has revealed a variety of disease-causing mutations. Greater than 2000 mutations in the CF gene have been identified. The most prevalent disease-causing mutation is a deletion of phenylalanine at position 508 of the CFTR amino acid sequence commonly referred to as the F508del mutation. This mutation is associated with severe disease.

The deletion of residue 508 in CFTR prevents the nascent protein from folding correctly. This results in the inability of the mutant protein to exit the endoplasmic reticulum (ER) and traffic to the plasma membrane. As a result, the number of CFTR channels for anion transport present in the membrane is far less than observed in cells expressing wild-type CFTR. In addition to impaired trafficking, the mutation results in defective channel gating. Together, the reduced number of channels in the membrane and the defective gating lead to reduced anion and fluid transport across epithelia.

CFTR is expressed in a variety of cell types, including absorptive and secretory epithelia cells, where it regulates anion flux across the membrane, as well as the activity of other ion channels and proteins. In epithelial cells, normal functioning of CFTR is critical for the maintenance of electrolyte transport throughout the body, including respiratory and digestive tissue. CFTR is composed of approximately 1480 amino acids.

In some embodiments, the compounds disclosed herein are useful for treating, lessening the severity of, or symptomatically treating CF in patients who exhibit residual CFTR activity in the apical membrane of respiratory and non-respiratory epithelia. The presence of residual CFTR activity at the epithelial surface can be readily detected using methods known in the art, e.g., standard electrophysiological, biochemical, or histochemical techniques. Such methods identify CFTR activity using in vivo or ex vivo electrophysiological techniques, measurement of sweat or salivary Cl$^-$ concentrations, or ex vivo biochemical or histochemical techniques to monitor cell surface density. Using such methods, residual CFTR activity can be readily detected for patients that are heterozygous or homozygous for a variety of different mutations. In some embodiments, compositions disclosed herein are useful for treating, lessening the severity of, or symptomatically treating CF in patients who exhibit little to no residual CFTR activity. In some embodiments, compositions disclosed herein are useful for treating, lessening the severity of, or symptomatically treating CF in patients who exhibit little to no residual CFTR activity in the apical membrane of respiratory epithelia.

In some embodiments, the compounds disclosed herein are useful for treating or lessening the severity of cystic fibrosis in patients who exhibit residual CFTR activity using pharmacological methods. Such methods increase the amount of CFTR present at the cell surface, thereby inducing a hitherto absent CFTR activity in a patient or augmenting the existing level of residual CFTR activity in a patient.

In some embodiments, the compounds disclosed herein are useful for treating or lessening the severity of cystic fibrosis in patients with certain genotypes exhibiting residual CFTR activity.

In some embodiments, compounds disclosed herein are useful for treating, lessening the severity of, or symptomatically treating cystic fibrosis in patients within certain clinical phenotypes, e.g., a mild to moderate clinical phenotype that typically correlates with the amount of residual CFTR activity in the apical membrane of epithelia. Such phenotypes include patients exhibiting pancreatic sufficiency.

In some embodiments, disclosed herein is a method of treating, lessening the severity of, or symptomatically treating cystic fibrosis in a patient comprising administering an effective amount of a pharmaceutical composition of this disclosure to the patient, such as a mammal, wherein the patient possesses a CFTR genetic mutation such as W1282X and N1303K In some embodiments, the method produces an increase in chloride transport above the baseline chloride transport of the patient.

In some embodiments, disclosed herein is a method of treating, lessening the severity of, or symptomatically treating cystic fibrosis in a patient comprising administering an effective amount of at least one pharmaceutical composition of this disclosure to the patient, such as a human, wherein said patient has cystic fibrosis and is chosen from patients with F508del/minimal function (MF) genotypes, patients with F508del/F508del genotypes, patients with F508del/gating genotypes, and patients with F508del/residual function (RF) genotypes.

In some embodiments, the patient is heterozygous for F508del, and the other CFTR genetic mutation is any CF-causing mutation and is expected to be and/or is responsive to combinations of compounds disclosed herein.

Patients with an F508del/minimal function genotype are defined as patients that are heterozygous F058de1G-CTFR with a second CFTR allele containing a mutation that is predicted to result in a CFTR protein with minimal function. These CFTR mutations may be defined using multiple sources: biological plausibility for the mutation to respond (i.e., mutation class) evidence of clinical severity on a population basis average sweat chloride >86 mmol/L, and prevalence of pancreatic insufficiency (PI) >50% in vitro testing. Mutations resulting in baseline chloride transport <10% of wild-type CFTR may be considered minimal function.

In some embodiments, disclosed herein is a method of treating, lessening the severity of, or symptomatically treating cystic fibrosis in a patient comprising administering an effective amount of a pharmaceutical composition of this disclosure to the patient, such as a human, wherein the patient possesses a CFTR genetic mutation W1282X. The W1282X mutation is an example of a premature truncation variant, wherein a mutation in the genetic code causes a premature "stop" codon, resulting in an incompletely translated protein.

In some embodiments, the patient is homozygous for the genetic mutation. In some embodiments, the patient is heterozygous for the W1282X genetic mutation. In some embodiments, the patient is heterozygous for the W1282X genetic mutation, having the W1282X mutation on one allele and any other CF-causing mutation on the other allele. In some embodiments, the patient is heterozygous for the W1282X genetic mutation on one allele and the other CF-causing genetic mutation on the other allele is any one of G551D, F508del, G542X, N1303K, R117H, R553X.

In some embodiments, disclosed herein is a method of treating, lessening the severity of, or symptomatically treating cystic fibrosis in a patient comprising administering an effective amount of a pharmaceutical composition of this disclosure to the patient, such as a human, wherein the patient possesses a CFTR genetic mutation N1303K. In some embodiments, the patient is homozygous for the genetic mutation. In some embodiments, the patient is heterozygous for the N1303K genetic mutation. In some embodiments, the patient is heterozygous for the N1303K genetic mutation, having the N1303K mutation on one allele and any other CF-causing mutation on the other allele. In some embodiments, the patient is heterozygous for the N1303K genetic mutation on one allele and the other CF-causing genetic mutation on the other allele is any one of G551D, F508del, G542X, W1282X, R117H, and R553X.

In some embodiments, disclosed herein is a method of treating, lessening the severity of, or symptomatically treating cystic fibrosis in a patient comprising administering an effective amount of a pharmaceutical composition of this disclosure to the patient, such as a human, wherein the patient possesses a CFTR genetic mutation G551D. In some embodiments, the patient is homozygous for the genetic mutation. In some embodiments, the patient is heterozygous for the G551D genetic mutation. In some embodiments, the patient is heterozygous for the G551D genetic mutation, having the G551D mutation on one allele and any other CF-causing mutation on the other allele. In some embodiments, the patient is heterozygous for the G551D genetic mutation on one allele and the other CF-causing genetic mutation on the other allele is any one of F508del, G542X, N1303K, W1282X, R117H, R553X.

In some embodiments, disclosed herein is a method of treating, lessening the severity of, or symptomatically treating cystic fibrosis in a patient comprising administering an effective amount of a pharmaceutical composition of this disclosure to the patient, such as a mammal, wherein the patient possesses a CFTR genetic mutation F508del. In some embodiments, the patient is homozygous for the F508del genetic mutation. In some embodiments, the patient is heterozygous for the F508del genetic mutation wherein the patient has the F508del genetic mutation on one allele and any CF-causing genetic mutation on the other allele. In some embodiments, the patient is heterozygous for F508del, and the other CFTR genetic mutation is any CF-causing mutation, including, but not limited to G551D, G542X, N1303K, W1282X, R1117H, R553X.

In some embodiments, the compositions disclosed herein are useful for treating, lessening the severity of, or symptomatically treating patients diagnosed with pancreatic sufficiency, idiopathic pancreatitis and congenital bilateral absence of the vas deferens, or mild lung disease wherein the patient exhibits residual CFTR activity.

In addition to CF, modulation of CFTR activity may be beneficial for other diseases not directly caused by mutations in CFTR, such as secretory diseases and other protein folding diseases mediated by CFTR. These include, but are not limited to, chronic obstructive pulmonary disease (COPD), dry eye disease, and Sjogren's Syndrome. COPD is characterized by airflow limitation that is progressive and not fully reversible. The airflow limitation is due to mucus hypersecretion, emphysema, and bronchiolitis. Activators of mutant or wild-type CFTR offer a potential treatment of mucus hypersecretion and impaired mucociliary clearance that is common in COPD. Specifically, increasing anion secretion across CFTR may facilitate fluid transport into the airway surface liquid to hydrate the mucus and optimized periciliary fluid viscosity. This would lead to enhanced mucociliary clearance and a reduction in the symptoms associated with COPD.

Dry eye disease is characterized by a decrease in tear aqueous production and abnormal tear film lipid, protein and mucin profiles. There are many causes of dry eye, some of which include age, LASIK eye surgery, arthritis, medications, chemical/thermal burns, allergies, and diseases, such as CF and Sjogren's syndrome. Increasing anion secretion via CFTR would enhance fluid transport from the corneal endothelial cells and secretory glands surrounding the eye to increase corneal hydration. This would help to alleviate the symptoms associated with dry eye disease. Sjogren's syndrome is an autoimmune disease in which the immune system attacks moisture-producing glands throughout the body, including the eye, mouth, skin, respiratory tissue, liver, vagina, and gut. Symptoms include, dry eye, mouth, and vagina, as well as lung disease. The disease is also associated with rheumatoid arthritis, systemic lupus, systemic sclerosis, and dermatomyositis. Defective protein trafficking is believed to cause the disease, for which treatment options are limited. Augmenters or inducers of CFTR activity may hydrate the various organs afflicted by the disease and help to elevate the associated symptoms. In some embodiments, this disclosure relates to methods of using compounds of using compounds disclosed herein to prevent or treat any of the disease or conditions reported herein.

In certain embodiments, this disclosure relates to methods of treating, lessening the severity of, or symptomatically treating a disease in a patient, the method comprising administering an effective amount of a compound disclosed herein to the patient, preferably a human, wherein the disease is selected from cystic fibrosis, asthma, COPD, smoke induced COPD, chronic bronchitis, rhinosinusitis, constipation, pancreatitis, pancreatic insufficiency, male infertility caused by congenital bilateral absence of the vas deferens (CBAVD), mild pulmonary disease, idiopathic pancreatitis, allergic bronchopulmonary aspergillosis (ABPA), liver disease, hereditary emphysema, hereditary hemochromatosis, coagulation-fibrinolysis deficiencies, such as protein C deficiency and Type 1 hereditary angioedema, lipid processing deficiencies (such as familial hypercholesterolemia, Type 1 chylomicronemia, and abetalipoproteinemia), lysosomal storage diseases (such as I-cell disease/pseudo-Hurler), mucopolysaccharidoses, Tay-Sachs, hyperinsulinemia, Diabetes mellitus, Laron dwarfism, myeloperoxidase deficiency, primary hypoparathyroidism, congenital hyperthyroidism, osteogenesis imperfecta, hereditary hypofibrinogenemia, ACT deficiency, diabetes insipidus (DI), nephrogenic DI, Charcot-Marie Tooth syndrome, neurodegenerative diseases (such as Alzheimer's disease, Parkinson's disease, amyotrophic lateral sclerosis, progressive supranuclear palsy, and Pick's disease), several polyglutamine neurological disorders (such as Huntington's, spinocerebellar ataxia type 1, spinal and bulbar muscular atrophy, and myotonic dystrophy), spongiform encephalopathies (such as hereditary Creutzfeldt-Jakob disease (due to prion protein processing defect)), Fabry disease, dry-eye disease, or Sjogren's disease, osteoporosis, osteopenia, bone healing and bone growth (including bone repair, bone regeneration, reducing bone resorption and increasing bone deposition), Gorham's Syndrome, chloride channelopathies such as myotonia congenita, Bartter's syndrome type III, Dent's disease, epilepsy, lysosomal storage disease, Angelman syndrome, and Primary Ciliary Dyskinesia (PCD).

In certain embodiments, compounds disclosed herein working as CFTR modulators may be beneficial for the treatment of respiratory distress induced from infectious agents and secretory diarrheas. In certain embodiments, a subject is diagnosed with, exhibiting symptoms of or at risk of a viral infection. Viral infections can affect the upper or lower respiratory tract potentially resulting in bronchiolitis, croup, pneumonia, and severe acute respiratory syndrome. Examples include influenza, rhinovirus, respiratory syncytial virus [RSV] and coronavirus.

Diarrheal due to excessive chloride transport can result in dehydration, acidosis, impaired growth and death. Secretory diarrheas are also a dangerous condition in patients of acquired immunodeficiency syndrome (AIDS) and chronic inflammatory bowel disease (IBD). A common diarrhea causing bacteria is enterotoxigenic E-coli (ETEC) having the K99 pilus antigen. Common viral causes of diarrhea include rotavirus and coronavirus. Other infectious agents include cryptosporidium, giardia lamblia, and salmonella.

In some embodiments, this disclosure relates to a method of augmenting or inducing anion channel activity in vitro or in vivo, comprising contacting the channel with a composition disclosed herein. In some embodiments, the anion channel is a chloride channel or a bicarbonate channel. In some embodiments, the anion channel is a chloride channel.

In certain embodiments, methods disclosed herein are contemplated to be done in combination with other agents, such as other respiratory agents or other CFTR modulators. In certain embodiments, the other CFTR modulator is ivacaftor, lumacaftor, tezacaftor, elexacaftor, or combinations thereof.

In certain embodiments, this disclosure relates to methods of treating respiratory distress comprising administering an effective amount of a compound that is a CFTR modulator as disclosed herein in combination with ivacaftor to a subject in need thereof.

In certain embodiments, this disclosure relates to methods of treating respiratory distress comprising administering an effective amount of a compound that is a CFTR modulator as disclosed herein in combination with lumacaftor and ivacaftor to a subject in need thereof.

In certain embodiments, this disclosure relates to methods of treating respiratory distress comprising administering an effective amount of a compound that is a CFTR modulator as disclosed herein in combination with tezacaftor and ivacaftor to a subject in need thereof.

In certain embodiments, this disclosure relates to methods of treating respiratory distress comprising administering an effective amount of a compound that is a CFTR modulator as disclosed herein in combination with elexacaftor to a subject in need thereof.

In certain embodiments, this disclosure relates to methods of treating respiratory distress comprising administering an effective amount of a compound that is a CFTR modulator as disclosed herein in combination with elexacaftor and tezacaftor to a subject in need thereof.

In certain embodiments, this disclosure relates to methods of treating respiratory distress comprising administering an effective amount of a compound that is a CFTR modulator as disclosed herein in combination with elexacaftor and ivacaftor to a subject in need thereof.

In certain embodiments, this disclosure relates to methods of treating respiratory distress comprising administering an effective amount of a CFTR modulator which is PDE4 inhibitor of formula I as disclosed herein, such as 3-(2,3-dichlorophenyl)-6-(tert-pentyl)-7H -[1,2,4]triazolo[3,4-b][1,3,4]thiadiazine (HDCF 83), 6-(tert-butyl)-3-(2,4-dichlorophenyl)-7H -[1,2,4]triazolo[3,4-b][1,3,4]thiadiazine (HDCF 89), 3-(2-bromo-5-methoxyphenyl)-6-isopropyl -7H-[1,2,4]triazolo[3,4-b][1,3,4]thiadiazine (HDCF 104), or 3-(2-bromo-5-chlorophenyl)-6-(tert -butyl)-7H-[1,2,4]triazolo[3,4-b][1,3,4]thiadiazine (HDCF 95) wherein at least part of the capacity of this drug to activate CFTR is due to effects on the phosphodiesterase PDE4. In certain embodiments, it is contemplated that compounds disclosed herein have anti-inflammatory and bronchodilatory effects in lung diseases such as CF, COPD, and are useful in treating subjects with or diagnosed with a virus or bacterial infection that causes respiratory distress such as severe acute respiratory syndrome associated with coronavirus (SARS-CoV-1) and SARS-CoV-2 (also referred to as COVID-19).

In certain embodiments, this disclosure relates to methods of treating respiratory distress comprising administering an effective amount of a CFTR modulator of formula I as disclosed herein, such as 3-(2,3-dichlorophenyl)-6-(tert-pentyl)-7H-[1,2,4]triazolo[3,4-b][1,3,4]thiadiazine (HDCF 83), 6-(tert-butyl)-3-(2,4-dichlorophenyl)-7H-[1,2,4]triazolo[3,4-b][1,3,4]thiadiazine (HDCF 89), 3-(2-bromo-5-methoxyphenyl)-6-isopropyl-7H-[1,2,4]triazolo[3,4-b][1,3,4]thiadiazine (HDCF 104) or 3-(2-bromo-5-chlorophenyl)-6-(tert-butyl)-7H -[1,2,4]triazolo[3,4-b][1,3,4]thiadiazine (HDCF 95), in combination with ivacaftor to a subject in need thereof.

In certain embodiments, this disclosure relates to methods of treating respiratory distress comprising administering an effective amount of a CFTR modulator of formula I as disclosed herein, such as 3-(2,3-dichlorophenyl)-6-(tert-pentyl)-7H-[1,2,4]triazolo[3,4-b][1,3,4]thiadiazine (HDCF 83), 6-(tert-butyl)-3-(2,4-dichlorophenyl)-7H-[1,2,4]tri-azolo[3,4-b][1,3,4]thiadiazine (HDCF 89), 3-(2-bromo-5-methoxyphenyl)-6-isopropyl-7H-[1,2,4]triazolo[3,4-b][1,3,4]thiadiazine (HDCF104), or 3-(2-bromo-5-chlorophenyl)-6-(tert-butyl)-7H -[1,2,4]triazolo[3,4-b][1,3,4]thiadiazine (HDCF 95), in combination with ivacaftor to a subject in need thereof.

In certain embodiments, this disclosure relates to methods of treating respiratory distress comprising administering an effective amount of a CFTR modulator of formula I as disclosed herein, such as 3-(2,3-dichlorophenyl)-6-(tert-pentyl)-7H-[1,2,4]triazolo[3,4-b][1,3,4]thiadiazine (HDCF 83), 6-(tert-butyl)-3-(2,4-dichlorophenyl)-7H-[1,2,4]tri-azolo[3,4-b][1,3,4]thiadiazine (HDCF 89), 3-(2-bromo-5-methoxyphenyl)-6-isopropyl-7H-[1,2,4]triazolo[3,4-b][1,3,4]thiadiazine (HDCF104) or 3-(2-bromo-5-chlorophenyl)-6-(tert-butyl)-7H -[1,2,4]triazolo[3,4-b][1,3,4]thiadiazine (HDCF 95), in combination with lumacaftor and ivacaftor to a subject in need thereof.

In certain embodiments, this disclosure relates to methods of treating respiratory distress comprising administering an effective amount of a CFTR modulator of formula I as disclosed herein in combination, such as 3-(2,3-dichlorophenyl)-6-(tert-pentyl)-7H-[1,2,4]triazolo[3,4-b][1,3,4]thiadiazine (HDCF 83), 6-(tert-butyl)-3-(2,4-dichlorophenyl)-7H-[1,2,4]triazolo[3,4-b][1,3,4]thiadiazine (HDCF 89), 3-(2-bromo-5-methoxyphenyl)-6-isopropyl-7H -[1,2,4]tri-azolo[3,4-b][1,3,4]thiadiazine (HDCF104) or 3-(2-bromo-5-chlorophenyl)-6-(tert -butyl)-7H-[1,2,4]triazolo[3,4-b][1,3,4]thiadiazine (HDCF 95), with tezacaftor and ivacaftor to a subject in need thereof.

In certain embodiments, this disclosure relates to methods of treating respiratory distress comprising administering an effective amount of a CFTR modulator of formula I as disclosed herein, such as 3-(2,3-dichlorophenyl)-6-(tert-pentyl)-7H-[1,2,4]triazolo[3,4-b][1,3,4]thiadiazine (HDCF 83), 6-(tert-butyl)-3-(2,4-dichlorophenyl)-7H-[1,2,4]tri-azolo[3,4-b][1,3,4]thiadiazine (HDCF 89), 3-(2-bromo-5-methoxyphenyl)-6-isopropyl-7H-[1,2,4]triazolo[3,4-b][1,3,4]thiadiazine (HDCF104) or 3-(2-bromo-5-chlorophenyl)-6-(tert-butyl)-7H -[1,2,4]triazolo[3,4-b][1,3,4]thiadiazine (HDCF 95), in combination with elexacaftor to a subject in need thereof.

In certain embodiments, this disclosure relates to methods of treating respiratory distress comprising administering an effective amount of a CFTR modulator of formula I as disclosed herein, such as 3-(2,3-dichlorophenyl)-6-(tert-pentyl)-7H-[1,2,4]triazolo[3,4-b][1,3,4]thiadiazine (HDCF 83), 6-(tert-butyl)-3-(2,4-dichlorophenyl)-7H-[1,2,4]tri-azolo[3,4-b][1,3,4]thiadiazine (HDCF 89), 3-(2-bromo-5-methoxyphenyl)-6-isopropyl-7H-[1,2,4]triazolo[3,4-b][1,3,4]thiadiazine (HDCF104) or 3-(2-bromo-5-chlorophenyl)-6-(tert-butyl)-7H -[1,2,4]triazolo[3,4-b][1,3,4]thiadiazine (HDCF 95), in combination with elexacaftor and tezacaftor to a subject in need thereof.

In certain embodiments, this disclosure relates to methods of treating respiratory distress comprising administering an effective amount of a CFTR modulator of formula I as disclosed herein, such as 3-(2,3-dichlorophenyl)-6-(tert-pentyl)-7H-[1,2,4]triazolo[3,4-b][1,3,4]thiadiazine (HDCF 83), 6-(tert-butyl)-3-(2,4-dichlorophenyl)-7H-[1,2,4]tri-azolo[3,4-b][1,3,4]thiadiazine (HDCF 89), 3-(2-bromo-5-methoxyphenyl)-6-isopropyl-7H-[1,2,4]triazolo[3,4-b][1,3,4]thiadiazine (HDCF 104) or 3-(2-bromo-5-chlorophenyl)-6-(tert-butyl)-7H -[1,2,4]triazolo[3,4-b][1,3,4]thiadiazine (HDCF 95), in combination with elexacaftor and ivacaftor to a subject in need thereof.

In certain embodiments, this disclosure relates to methods of treating respiratory distress comprising administering an effective amount of a CFTR modulator of formula II as disclosed herein, such as 2-((6-bromo-4H-benzo[d][1,3]di-oxin-8-yl)methylene)-6-methoxybenzofuran -3(2H)-one (Nluc uHTS_52), in combination with ivacaftor to a subject in need thereof.

In certain embodiments, this disclosure relates to methods of treating respiratory distress comprising administering an effective amount of a CFTR modulator of formula II, such as 2-((6-bromo-4H-benzo[d][1,3]dioxin-8-yl)methylene)-6-methoxybenzofuran-3 (2H)-one (Nluc uHTS_52), as disclosed herein in combination with ivacaftor to a subject in need thereof.

In certain embodiments, this disclosure relates to methods of treating respiratory distress comprising administering an effective amount of a CFTR modulator of formula II as disclosed herein, such as 2-((6-bromo-4H-benzo[d][1,3]di-oxin-8-yl)methylene)-6-methoxybenzofuran -3(2H)-one (Nluc uHTS_52), in combination with lumacaftor and ivacaftor to a subject in need thereof.

In certain embodiments, this disclosure relates to methods of treating respiratory distress comprising administering an effective amount of a CFTR modulator of formula II as disclosed herein, such as 2-((6-bromo-4H-benzo[d][1,3]di-oxin-8-yl)methylene)-6-methoxybenzofuran -3(2H)-one (Nluc uHTS_52), in combination with tezacaftor and ivacaftor to a subject in need thereof.

In certain embodiments, this disclosure relates to methods of treating respiratory distress comprising administering an effective amount of a CFTR modulator of formula II as disclosed herein, such as 2-((6-bromo-4H-benzo[d][1,3]dioxin-8-yl)methylene)-6-methoxybenzofuran -3(2H)-one (Nluc uHTS_52), in combination with elexacaftor to a subject in need thereof.

In certain embodiments, this disclosure relates to methods of treating respiratory distress comprising administering an effective amount of a CFTR modulator of formula II as disclosed herein, such as 2-((6-bromo-4H-benzo[d][1,3]dioxin-8-yl)methylene)-6-methoxybenzofuran -3(2H)-one (Nluc uHTS_52), in combination with elexacaftor and tezacaftor to a subject in need thereof.

In certain embodiments, this disclosure relates to methods of treating respiratory distress comprising administering an effective amount of a CFTR modulator of formula II as disclosed herein, such as 2-((6-bromo-4H-benzo[d][1,3]dioxin-8-yl)methylene)-6-methoxybenzofuran -3(2H)-one (Nluc uHTS_52), in combination with elexacaftor and ivacaftor to a subject in need thereof.

In certain embodiments, this disclosure relates to methods of treating respiratory distress comprising administering an effective amount of a CFTR modulator of formula III as disclosed herein, such as N-(4-(4-(1-(2,2-difluorobenzo[d][1,3]dioxol-5-yl)cyclopropane-1-carboxamido)phenyl)thiazol-2-yl)cyclopentanecarboxamide (HDCF159), in combination with ivacaftor to a subject in need thereof.

In certain embodiments, this disclosure relates to methods of treating respiratory distress comprising administering an effective amount of a CFTR modulator of formula III as disclosed herein, such as N-(4-(4-(1-(2,2-difluorobenzo[d][1,3]dioxol-5-yl)cyclopropane-1-carboxamido)phenyl)thiazol-2-yl)cyclopentanecarboxamide (HDCF159), in combination with ivacaftor to a subject in need thereof.

In certain embodiments, this disclosure relates to methods of treating respiratory distress comprising administering an effective amount of a CFTR modulator of formula III as disclosed herein, such as N-(4-(4-(1-(2,2-difluorobenzo[d][1,3]dioxol-5-yl)cyclopropane-1-carboxamido)phenyl)thiazol-2-yl)cyclopentanecarboxamide (HDCF159), in combination with lumacaftor and ivacaftor to a subject in need thereof.

In certain embodiments, this disclosure relates to methods of treating respiratory distress comprising administering an effective amount of a CFTR modulator of formula III as disclosed herein, such as N-(4-(4-(1-(2,2-difluorobenzo[d][1,3]dioxol-5-yl)cyclopropane-1-carboxamido)phenyl)thiazol-2-yl)cyclopentanecarboxamide (HDCF159), in combination with tezacaftor and ivacaftor to a subject in need thereof.

In certain embodiments, this disclosure relates to methods of treating respiratory distress comprising administering an effective amount of a CFTR modulator of formula III as disclosed herein, such as N-(4-(4-(1-(2,2-difluorobenzo[d][1,3]dioxol-5-yl)cyclopropane-1-carboxamido)phenyl)thiazol-2-yl)cyclopentanecarboxamide (HDCF159), in combination with elexacaftor to a subject in need thereof.

In certain embodiments, this disclosure relates to methods of treating respiratory distress comprising administering an effective amount of a CFTR modulator of formula III as disclosed herein, such as N-(4-(4-(1-(2,2-difluorobenzo[d][1,3]dioxol-5-yl)cyclopropane-1-carboxamido)phenyl)thiazol-2-yl)cyclopentanecarboxamide (HDCF159), in combination with elexacaftor and tezacaftor to a subject in need thereof.

In certain embodiments, this disclosure relates to methods of treating respiratory distress comprising administering an effective amount of a CFTR modulator of formula III as disclosed herein in, such as N-(4-(4-(1-(2,2-difluorobenzo[d][1,3]dioxol-5-yl)cyclopropane-1-carboxamido)phenyl)thiazol-2-yl)cyclopentanecarboxamide (HDCF159), combination with elexacaftor and ivacaftor to a subject in need thereof.

In certain embodiments, this disclosure relates to methods of treating respiratory distress comprising administering an effective amount of a CFTR modulator of formula IV as disclosed herein, such as N-(2-(cyclobutanecarboxamido)benzo[d]thiazol-6-yl)-1,3-dimethyl-1H-pyrazole -4-carboxamide (HDCF107), in combination with ivacaftor to a subject in need thereof.

In certain embodiments, this disclosure relates to methods of treating respiratory distress comprising administering an effective amount of a CFTR modulator of formula IV as disclosed herein, such as N-(2-(cyclobutanecarboxamido)benzo[d]thiazol-6-yl)-1,3-dimethyl-1H-pyrazole -4-carboxamide (HDCF107), in combination with ivacaftor to a subject in need thereof.

In certain embodiments, this disclosure relates to methods of treating respiratory distress comprising administering an effective amount of a CFTR modulator of formula IV as disclosed herein, such as N-(2-(cyclobutanecarboxamido)benzo[d]thiazol-6-yl)-1,3-dimethyl-1H-pyrazole -4-carboxamide (HDCF107), in combination with lumacaftor and ivacaftor to a subject in need thereof.

In certain embodiments, this disclosure relates to methods of treating respiratory distress comprising administering an effective amount of a CFTR modulator of formula IV as disclosed herein, such as N-(2-(cyclobutanecarboxamido)benzo[d]thiazol-6-yl)-1,3-dimethyl-1H-pyrazole -4-carboxamide (HDCF107), in combination with tezacaftor and ivacaftor to a subject in need thereof.

In certain embodiments, this disclosure relates to methods of treating respiratory distress comprising administering an effective amount of a CFTR modulator of formula IV as disclosed herein, such as N-(2-(cyclobutanecarboxamido)benzo[d]thiazol-6-yl)-1,3-dimethyl-1H-pyrazole -4-carboxamide (HDCF107), in combination with elexacaftor to a subject in need thereof.

In certain embodiments, this disclosure relates to methods of treating respiratory distress comprising administering an effective amount of a CFTR modulator of formula IV as disclosed herein, such as N-(2-(cyclobutanecarboxamido)benzo[d]thiazol-6-yl)-1,3-dimethyl-1H-pyrazole -4-carboxamide (HDCF107), in combination with elexacaftor and tezacaftor to a subject in need thereof.

In certain embodiments, this disclosure relates to methods of treating respiratory distress comprising administering an effective amount of a CFTR modulator of formula IV as disclosed herein, such as N-(2-(cyclobutanecarboxamido)benzo[d]thiazol-6-yl)-1,3-dimethyl-1H-pyrazole -4-carboxamide (HDCF107), in combination with elexacaftor and ivacaftor to a subject in need thereof.

The exact amount of a compound or combination of compound required will vary from subject to subject, depending on the species, age, and general condition of the subject, the severity of the disease, the particular agent, its mode of administration, and the like. The compounds of this disclosure may be formulated in dosage unit form for ease of administration and uniformity of dosage. The expression "dosage unit form" as used herein refers to a physically discrete unit of agent appropriate for the patient to be treated. It will be understood, however, that the total daily usage of the compounds and compositions of this disclosure will be decided by the attending physician within the scope of sound medical judgment. The specific effective dose level for any particular patient or organism will depend upon a variety of factors including the disorder being treated and the severity of the disorder; the activity of the specific compound employed; the specific composition employed; the age, body weight, general health, sex and diet of the patient; the time of administration, route of administration, and rate of excretion of the specific compound employed; the duration of the treatment; drugs used in combination or coincidental with the specific compound employed, and like factors well known in the medical arts.

Pharmaceutical Compositions

In certain embodiments, this disclosure relates to pharmaceutical compositions comprising a compound as disclosed herein or salt thereof and a pharmaceutically acceptable excipient. In certain embodiments, the pharmaceutical composition is in the form of a tablet, pill, capsule, gel, gel capsule, or cream. In certain embodiments, the pharmaceutical composition is in the form of a sterilized pH buffered aqueous salt solution or a saline phosphate buffer between a pH of 6 to 8, optionally comprising a saccharide or polysaccharide.

In certain embodiments, the pharmaceutical composition comprises a compound disclosed herein and a propellant. In certain embodiments, an aerosolizing propellant is compressed air, ethanol, nitrogen, carbon dioxide, nitrous oxide, hydrofluoroalkanes or combinations thereof.

In certain embodiments, the disclosure contemplates a pressurized or unpressurized container comprising a compound herein. In certain embodiments, the container is a manual pump spray, inhaler, meter-dosed inhaler, dry powder inhaler, nebulizer, vibrating mesh nebulizer, jet nebulizer, or ultrasonic wave nebulizer.

In certain embodiments, the pharmaceutical composition is in solid form surrounded by an enteric coating. In certain embodiments, the enteric coatings comprises a component such as methyl acrylate-methacrylic acid copolymers, cellulose acetate phthalate (CAP), cellulose acetate succinate, hypromellose (hydroxypropyl methylcellulose), hypromellose phthalate (hydroxypropyl methyl cellulose phthalate), hypromellose acetate succinate (hydroxypropyl methyl cellulose acetate succinate), diethyl phthalate, polyvinyl acetate phthalate (PVAP), methyl methacrylate-methacrylic acid copolymers, or combinations thereof.

In certain embodiments, the pharmaceutically acceptable excipient is selected from lactose, sucrose, mannitol, triethyl citrate, dextrose, cellulose, microcrystalline cellulose, methyl cellulose, ethyl cellulose, hydroxyl propyl cellulose, hydroxypropyl methylcellulose, carboxymethylcellulose, croscarmellose sodium, polyvinyl N-pyrrolidone (crospovidone), ethyl cellulose, povidone, methyl and ethyl acrylate copolymer, polyethylene glycol, fatty acid esters of sorbitol, lauryl sulfate, gelatin, glycerin, glyceryl monooleate, silicon dioxide, titanium dioxide, talc, corn starch, carnauba wax, stearic acid, sorbic acid, magnesium stearate, calcium stearate, castor oil, mineral oil, calcium phosphate, starch, carboxymethyl ether of starch, iron oxide, triacetin, acacia gum, esters, or salts thereof.

In certain embodiments, the pharmaceutical composition is in the form of a saline, citrate buffer or phosphate buffer, optionally comprising a saccharide or polysaccharide.

In certain embodiments, this disclosure relates to pharmaceutical compositions comprising a compound disclosed herein or pharmaceutically acceptable salt, and a pharmaceutically acceptable vehicle, adjuvant, or carrier.

In certain embodiments, the pharmaceutical compositions may additionally comprise a pharmaceutically acceptable carrier, adjuvant, or vehicle, which, as used herein, includes any and all solvents, diluents, or other liquid vehicle, dispersion or suspension aids, surface active agents, isotonic agents, thickening or emulsifying agents, preservatives, solid binders, lubricants and the like, as suited to the particular dosage form desired.

Some examples of materials which can serve as pharmaceutically acceptable carriers include, but are not limited to, ion exchangers, alumina, aluminum stearate, lecithin, serum proteins, such as human serum albumin, buffer substances such as phosphates, glycine, sorbic acid, or potassium sorbate, partial glyceride mixtures of saturated vegetable fatty acids, water, salts or electrolytes, such as protamine sulfate, disodium hydrogen phosphate, potassium hydrogen phosphate, sodium chloride, zinc salts, colloidal silica, magnesium trisilicate, polyvinyl pyrrolidone, polyacrylates, waxes, polyethylene-polyoxypropylene-block polymers, wool fat, sugars such as lactose, glucose and sucrose; starches such as corn starch and potato starch; cellulose and its derivatives such as sodium carboxymethyl cellulose, ethyl cellulose and cellulose acetate; powdered tragacanth; malt; gelatin; talc; excipients such as cocoa butter and suppository waxes; oils such as peanut oil, cottonseed oil; safflower oil; sesame oil; olive oil; corn oil and soybean oil; glycols; such a propylene glycol or polyethylene glycol; esters such as ethyl oleate and ethyl laurate; agar; buffering agents such as magnesium hydroxide and aluminum hydroxide; alginic acid; pyrogen-free water; isotonic saline; Ringer's solution; ethyl alcohol, and phosphate buffer solutions, as well as other non-toxic compatible lubricants such as sodium lauryl sulfate and magnesium stearate, as well as coloring agents, releasing agents, coating agents, sweetening, flavoring and perfuming agents, preservatives and antioxidants.

The pharmaceutical compositions containing compounds reported herein may further comprise one or more additional therapeutic agent(s). In one embodiment, the additional therapeutic agent is a CFTR modulator. In one embodiment, the additional therapeutic agent is a CFTR corrector. In one embodiment, the additional therapeutic agent is a CFTR potentiator.

As used herein, the term "CFTR modulator" refers to a compound that increases the activity of a biological compound such as a protein. For example, a CFTR modulator is a compound that increases the activity of CFTR. The increase in activity resulting from a CFTR modulator includes but is not limited to compounds that correct, potentiate, stabilize and/or amplify CFTR.

As used herein, the term "CFTR corrector" refers to a compound that facilitates the processing and trafficking of CFTR to increase the amount of CFTR at the cell surface. Lumacaftor, tezacaftor, elexacaftor, cavosonstat, (N-(2-(5-chloro-2-methoxy-phenylamino)-4'-methyl-[4,5']bithiazolyl-2'-yl)-benzamide (corr-4a), and (FDL169) 2-(7-ethoxy-4-(3-fluorophenyl)-1-oxophthalazin-2(1H)-yl)-N-methyl-N-(2-methylbenzo[d]oxazol-6-yl)acetamide. Lumacaftor and tezacaftor are believed to work by binding to the F508del-CFTR protein.

As used herein, the term "CFTR potentiator" refers to a compound that increases the channel activity of CFTR protein located at the cell surface, resulting in enhanced ion transport. Ivacaftor is an example of a CFTR potentiator.

In another embodiment, the additional therapeutic agent is selected from: 3-(6-(1-(2,2-difluorobenzo[d][1,3]dioxol-5- yl)cyclopropanecarboxamido)-3-methylpyridin-2-yl)benzoic acid (lumacaftor), or pharmaceutically acceptable salt thereof;

(R)-1-(2,2-difluorobenzo[d][1,3]dioxol-5-yl)-N-(1-(2,3-dihydroxypropyl)-6-fluoro-2-(1-hydroxy-2-methylpropan-2-yl)-1H-indolyl)cyclopropanecarboxamide (tezacaftor), or a pharmaceutically acceptable salt thereof; or 4-(3-(1-(2,2-difluorobenzo[d][1,3]dioxol-5-yl)cyclopropanecarboxamido)isoquinolin-1-yl)benzoic acid (ivacaftor), or pharmaceutically acceptable salt thereof.

In one embodiment, the additional therapeutic agent is selected from a mucolytic agent, bronchodilator, an antibiotic, an anti-infective agent, a CFTR modulator, or an anti-inflammatory agent.

In certain embodiments, any of the therapeutic agents, which predominantly treat the symptoms a CFTR mediated disease, such as cystic fibrosis, rather than its underlying cause, can be used alone with a compounds disclosed herein, or in combination with any of the above described pharmaceutical compositions, or as a component in any of the above described pharmaceutical compositions.

In certain embodiments, the additional therapeutic agent is an antibiotic. Exemplary antibiotics useful herein include tobramycin, including tobramycin inhaled powder (TIP), azithromycin, aztreonam, including the aerosolized form of aztreonam, amikacin, including liposomal formulations thereof, ciprofloxacin, including formulations thereof suitable for administration by inhalation, levofloxacin, including aerosolized formulations thereof, and combinations of two antibiotics, e.g., fosfomycin and tobramycin.

In another embodiment, the additional therapeutic agent is a bromhexine.

In another embodiment, the additional therapeutic agent is a bronchodilator. Exemplary bronchodilators include albuterol, metaproterenol sulfate, pirbuterol acetate, or salmeterol.

In another embodiment, the additional therapeutic agent is effective in restoring lung airway surface liquid. Such agents improve the movement of salt in and out of cells, allowing mucus in the lung airway to be more hydrated and, therefore, cleared more easily. Exemplary such agents include hypertonic saline, denufosol tetrasodium, or bronchitol (inhaled formulation of mannitol).

In another embodiment, the additional therapeutic agent is an anti-inflammatory agent, i.e., an agent that can reduce the inflammation in the lungs. Exemplary such agents useful herein include ibuprofen, docosahexaenoic acid (DHA), sildenafil, inhaled glutathione, pioglitazone, hydroxychloroquine, or simvastatin.

In another embodiment, the additional therapeutic agent is a compound that augments or induces CFTR activity other than a compound of formula I. Exemplary such agents include ataluren (3-[5-(2-fluorophenyl)-1,2,4-oxadiazol-3-yl]benzoic acid), sinapultide, lancovutide, depelestat (a human recombinant neutrophil elastase inhibitor), and cobiprostone (7-{(2R, 4aR, 5R, 7aR)-2-[(3S)-1,1-difluoro-3-methylpentyl]-2-hydroxy-6-oxooctahydrocyclopenta[b]pyran-5-yl}heptanoic acid).

In another embodiment, the additional therapeutic agent is a compound selected from gentamicin, curcumin, cyclophosphamide, 4-phenylbutyrate, miglustat, felodipine, nimodipine, Apigenin, cAMP/cGMP augmenters or inducers such as rolipram, sildenafil, milrinone, tadalafil, amrinone, isoproterenol, albuterol, and proteasome inhibitors such as epoxomicin and lactacystin.

In another embodiment, the pharmaceutical compositions can be administered to a patient once daily or about every twenty-four hours. Alternatively, the pharmaceutical compositions can be administered to a patient twice daily. Alternatively, the pharmaceutical composition of the invention can be administered about every twelve hours. These pharmaceutical compositions are administered as oral formulations containing about 25 mg, 50 mg, 100 mg, 125 mg, 150 mg, 200 mg, 250 mg, 300 mg, or 400 mg of a compound disclosed herein. In this aspect, the pharmaceutical compositions further comprise a filler; a disintegrant; a surfactant; a binder; or a lubricant, or combinations thereof.

Kits

In certain embodiments, this disclosure relates to features a kit comprising a compound and/or pharmaceutical composition as disclosed herein and instructions for use thereof In certain embodiments, the kits further comprise one or more additional therapeutic agent(s). In certain embodiments, the additional therapeutic agent is selected from a mucolytic agent, bronchodilator, an antibiotic, an anti-infective agent, a CFTR modulator, a CFTR corrector, or an anti-inflammatory agent. In certain embodiments, the additional therapeutic agent is a CFTR modulator.

In certain embodiments, the kits of are drawn to kits wherein the compounds or the pharmaceutical compositions as disclosed herein and the one or more additional therapeutic agent(s) are in separate containers.

In certain embodiments, the kits are drawn to kits wherein the compounds or the pharmaceutical compositions as disclosed herein and the one or more additional therapeutic agent(s) are in the same container.

In another embodiment, the container is a bottle, vial, or blister pack, or combination thereof.

CFTR transepithelial chloride transport and use in combination with co-potentiators Impairment of CFTR function manifest as a multiorgan disease that mainly affect the gastrointestinal, respiratory and reproductive system. With the development of gastrointestinal adjuvant therapy (i.e. enzyme replacement), the decline in lung function became the most detrimental effect on health with the pathology of blockage in lower airways with thick and viscous mucous, chronic infection of *P. aeruginosa* and pulmonary inflammation, lung fibrosis and bronchiectasis, similarly inflammation and fibrosis are present in other organs such as pancreas and liver.

FRT cell lines expressing diverse CFTR mutation are utilized in high throughput screening to identify small molecule candidates to improve trafficking or function of mutant protein as well as in SAR studies to optimize hit compounds. Data disclosed herein indicated that certain compounds disclosed herein improve CFTR transepithelial chloride transport in combination with Ivacaftor in gating mutants, as a co-potentiator.

A high throughput screening led to the identification of compounds that enriched N1303K variant protein on the cell surface and functionally improved its chloride transport. Data indicates that 7H-[1,2,4]triazolo[3,4-b][1,3,4]thiadiazine analogue uHTS-159 (FIG. 6A) rescues the chloride channel function toward the cystic fibrosis G551D mutation in FRT cells and primary bronchial epithelial cell culture. Extensive structure—activity relationship (SAR) studies were performed to optimize the efficiency of this pharmacophore and additional analogs were identified. Some of these compounds, such as HDCF 95 (FIG. 6L), in combination with VX-770 can rescue the function of chloride channel function in FRT cells carrying G551D variants nearly to—wild type CFTR levels. A series of 7H-[1,2,4]

triazolo[3,4-b][1,3,4]thiadiazine analogues (FIGS. 6A-6K) were prepared and their biological activities were tested (FIG. 8A-8F).

The general synthetic protocol for preparing 7H-[1,2,4]triazolo[3,4-b][1,3,4]thiadiazine derivatives are illustrated in FIG. 7. The synthesis of the analogues started with the preparation of hydrazide, which can be achieved by treating corresponding carboxylic acid with 1,1'-carbonyldiimidazole (CDI), hydrazine hydrate using THF as solvent. The crude hydrazide was typically purified by recrystallization. The hydrazide was then added to a KOH ethanol solution, followed by treating with neat $CS_2$ and stirred overnight. The yellow solids precipitated out and collected by vacuum filtration, then the crude solids were typically used directly in the next step without further purification. The yellow solids were added to hydrazine hydrate and heated to reflux in water. Under these conditions the solid dissolved and the released $H_2S$ gas released was trapped by a base bath solution. After 8 hours, the reaction mixture was cooled to rt and then neutralized at 0° C. using 3M HCl aq to generate the 1,2,4- triazoles, which were typically purified by recrystallization. The final analogues were typically prepared by a condensation reaction between the 1,2,4-triazoles with α-haloketones in refluxing ethanol.

Optimization Studies

The functional tests were carried out on FRT G551D clonal cells by combination of one of the analogues and VX-770. CFTR dependent chloride transport was compared between VX-770 alone and in combination with analog. Several of these compounds had comparable bioactivity to uHTS-159, and it was discovered that a phenyl group could be incorporated into the 5-position, and the 3-(p-methoxyphenyl) derivative uHTS-159-10 which was slightly more potent. The primary screening indicated that dimethoxy- and dichloro-substituted aromatics among the uHTS_159 series could provide substantial bioactivities (FIGS. 6A and 6B).

Having established that a para-methoxyphenyl group at the 3 position causes a slight enhancement in the activity, a series of 3-aryl analogues were examined with various methoxy substituents on the aryl ring (FIGS. 6C, 6D). Since the two lead compounds contain dimethoxy and dichloroaromatic, the initial SAR study first started from 3,4-dimethoxy substituted aromatic analogues. The tests were conducted by sequential addition of forskolin, 5 μM VX-770, followed by addition of 10 μM uHTS_159 series compounds. The recorded WT CFTR dependent short circuit currents were between 550 and 570 ($\mu A/cm^2$). The compound, uHTS_159-1, could rescue the mutant CFTR channel function near to the level of compound uHTS_159, 208% vs 222% of VX-770 alone. Further studies were carried out to explore dimethoxy-containing analogues. But the test results turned out that dimethoxy-aromatic analogues could not provide ideal biological activities. After incorporating methyl group (HDCF 38), phenyl group (HDCF39), cyclopropyl group (HDCF40), amide (HDCF41), trifluoro methyl group (HDCF42), ethyl group (HDCF43), adamantly group (HDCF45), ester group (HDCF50), none of the choices provided ideal biological activity or satisfactory improvement of CFTR function. Neither removing (HDCF 35 and HDCF 36) or incorporating (HDCF 37 and HDCF 56) one methoxy group into the analogue could further improve the potency.

Some of the more active compound in the initial evaluation had halogenated aromatics and so, studies were performed to determine whether the 3-chloro-4-methoxyphenyl series would be a more promising series as illustrated for HDCF 57, HDCF 58, HDCF 59 and HDCF 60 (FIG. 6F). This substitution led to diminished potency of this group of compounds compared to previous set of analogues.

In order to continue to explore the aromatic substitution pattern 3,4-dichlorophenyl analogues were prepared (FIG. 6E). The majority of these compounds were less potent than uHTS_159 but the series did results in the identification of an interesting effect of the C6 alkyl substituent. The installation of the cyclopropyl group (HDCF 53) promoted the co-potentiation and matched the potency with the lead compound (uHTS_159). The studies also indicated that the methylene group adjacent to the sulfur (C7) benefited from being unsubstituted, while an alkyl chain at C6 was better than an aromatic ring. Furthermore, a cyclopropyl group at C6 (HDCF 53) was more potent than either a methylcyclopropyl (HDCF 62) or an ethyl (HDCF 46) group indicating that the type of the alkyl chain may be an important factor for activity.

On the basis of the promising activity of HDCF 53 a variety of alkyl groups were installed at C-6 in order to further investigate the optimal —R groups for best co-potentiation (FIG. 6G). None of the compounds with cyclic aliphatic substituents as —R groups (HDCF 72, HDCF 74, HDCF 76, HDCF 100) yielded more potent compound relative to the previous study. However, the installation of the isopropyl group (HDCF 75), which processes a similar size as the cyclopropyl group, successfully stimulated the co-potentiation capability (256% of VX-770 alone).

The role of chloro-substitution pattern was further investigated. Different mono-chlorophenyl containing regioisomers were prepared in order to test the effectiveness of co-potentiation. Series of meta- (HDCF 63, HDCF 64, HDCF 65, HDCF 66, HDCF 85 and HDCF 86) and para- (HDCF 67, HDCF 68, HDCF 69 and HDCF 70) substituted analogues were prepared (FIG. 6H) using cyclopropyl, cyclohexyl, isopropyl, methyl and trifluoromethyl as the C6 substituents. The meta-chloro series were generally more potent than the para-chloro series. The most potent member was HDCF 64, a meta choro derivatives, with a C6 isopropyl functionality.

The 2,3-dichloro-substituted aromatics were investigated (FIG. 6I). In this case, the tert-butyl (HDCF 79), isobutyl (HDCF 83) and isopropyl group (HDCF 84) as R group dramatically enhanced the CFTR dependent chloride transport and the co-potentiation was in the range of 300-350% higher compared to VX-770 potentiation by itself. Dihalo compounds with 2,4-dichloroaryl derivatives (FIG. 6J) were examined. Activity was sensitive to the nature of the C6-alkyl substituent and the tert-butyl derivative (HDCF 89) proved to be particularly potent compound with a 405% increase in potentiation compared to VX-770 by itself. This new combination treatment reached approximately 70% of WT CFTR chloride transport in the FRT model system. Having seen a considerable benefit of having a 2-chloro substitutions, 2-bromo-5-chloro derivatives (FIG. 6K) were examined. These compounds HDCF 94 (357% of VX-770 alone) and HDCF 95 (377% of VX-770 alone) also reached similar level of co-potentiation as HDCF 89.

The class of compounds of 2-bromo-5-methoxy substituted regioisomers were further investigated toward improving co-potentiation therapy strategy (FIG. 6L). These compounds resulted in about a 300% increase when compared to VX-770 alone.

Synthesis of the HDCF Compounds

A scheme for preparing compounds and intermediates of this disclosure are illustrated in FIG. 7.

2-Bromo-5-chlorobenzohydrazide

To a flame-dry round bottom flask, equipped with magnetic stir bar, 2-bromo-5-chlorobenzoic acid (14.13 g), 1,1'-carbonyldiimidazole (12.6 g) and 80 mL THF were added at rt under argon. The reaction was allowed to stir for 3 h, and a mixture of hydrazine hydrate (50~60%, 11.5 g) in 50 mL THF was added dropwise via additional funnel. The reaction was allowed to stir for overnight. The reaction was then concentrated under vacuum to provide crude product. The crude product was purified by recrystallization. The crude product and 280 mL EtOH were placed in a 500 mL flask and heated to boil until solids dissolved. The reaction was then allowed to cool to rt for 5 h. The white solid precipitated was collected by vacuum filtration, and the filter cake was rinsed by 100 mL cold $Et_2O$, dried, and used without further purification to afford 9.77 g (66%) as a white solid (mp 169-171° C.): IR (film) 2945, 2832, 1608 $cm^{-1}$; $^1H$ NMR (600 MHz, DMSO-$d_6$) δ 9.63 (s, 1H), 7.69-7.67 (m, 1H), 7.45-7.42 (m, 2H), 4.49 (s, 1H); $^{13}C$ NMR (151 MHz, DMSO-$d_6$) δ 165.11, 139.36, 134.47, 132.19, 130.80, 128.80, 117.99; HRMS (+APCI) m/z [M+H+] calcd for $C_7H_7BrClN_2O$ 248.9425, found 248.9425.

4-Amino-5-(2-bromo-5-chlorophenyl)-4H-1,2,4-triazole-3-thiol

To 80 mL EtOH solution of KOH (3.3 g), 2-bromo-5-chlorobenzohydrazide (9.77 g) was added at rt. Once the solids dissolved, neat $CS_2$ (4.5 g) was added dropwise, and the reaction was stirred at rt for overnight. The yellow solid was collected by vacuum filtration, then rinsed by 50 mL $Et_2O$, dried, and used directly in the next step without further purification.

The crude solid from previous step, hydrazine hydrate (50~60%, 6.3 g), and 5 mL water were added to a 250 mL round bottom flask with magnetic stir bar. The reaction was heated to reflux and stirred for 8 h. The $H_2S$ gas was absorbed by a KOH solution. The reaction was allowed to cool to rt for overnight and neutralized by 3N HCl. The white solids that precipitated out were collected by vacuum filtration, then rinsed with iced water (30 mL), dried, and purified by recrystallization. The crude product was placed in a 250 mL round bottom flask, and 100 mL EtOH was added. The mixture was heated to boil for 10 min, thereafter the mixture was cooled on ice for 1 h. The white solid was collected by vacuum filtration, rinsed with 50 mL cold $Et_2O$, dried and used without further purification to afford 7.48 g (62%) as a white solid (mp 212-213° C.): IR (film) 3296, 3127, 2957 $cm^{-1}$; $^1H$ NMR (600 MHz, DMSO-$d_6$) δ 14.02 (s, 1H), 7.83 (d, J=8.6 Hz, 2H), 7.75 (d, J=2.6 Hz, 1H), 7.60 (dd, J=8.6, 2.6 Hz, 1H), 5.50 (s, 2H); $^{13}C$ NMR (151 MHz, DMSO-$d_6$) δ 166.75, 148.79, 134.43, 132.38, 132.25, 132.22, 128.92, 121.71. HRMS (+APCI) m/z [M+H+] calcd for $C_8H_7BrClN_4S$ 304.9258, found 304.9264.

4-Amino-5-(3,4-dichlorobenzyl)-4H-1,2,4-triazole-3-thiol

To 20 mL EtOH solution of KOH (1.1 g), 2-(3,4-dichlorophenyl)acetohydrazide (2.86 g) was added at rt. Once the solids dissolved, neat $CS_2$ (1.5 g) was added dropwise and the reaction was stirred at rt for overnight. The yellow solid was collected by vacuum filtration, rinsed by 50 mL $Et_2O$, dried, and used directly for next step without further purification.

The crude solid from previous step, hydrazine hydrate (50~60%, 2.5 g) and 5 mL water were added to a 250 mL round bottom flask with magnetic stir bar. The reaction was heated to reflux and stirred for 8 h. The $H_2S$ gas was absorbed by KOH solution. The reaction was allowed to cool to rt for overnight and neutralized by 3N HCl. The white solids precipitated were collected by vacuum filtration, rinsed with iced water (30 mL), dried, and purified by recrystallization. The crude product was placed in a 250 mL round bottom flask, and 20 mL EtOH was added. The mixture was heated to boil for 10 min, then the mixture was cooled on ice for 1 h. The white solid was collected by vacuum filtration, then rinsed with 50 mL cold $Et_2O$, dried and used without further purification to afford 2.2 g (61%) as a white solid (mp 169-170° C.): IR (film) 3286, 3114, 3026, 2928 $cm^{-1}$; $^1H$ NMR (600 MHz, DMSO-$d_6$) δ 13.57 (s, 1H), 7.59-7.56 (m, 2H), 7.27 (dd, J=8.3, 2.0 Hz, 1H), 5.56 (s, 2H), 4.06 (s, 2H); $^{13}C$ NMR (151 MHz, DMSO-$d_6$) δ 166.20, 150.68, 136.54, 130.96, 130.90, 130.53, 129.54, 129.40, 29.23. HRMS (+APCI) m/z [M+H+] calcd for $C_9H_9Cl_2N_4S$ 274.9919, found 274.9922.

4-Amino-5-(3-chloro-4-methoxyphenyl)-4H-1,2,4-triazole-3-thiol

To 50 mL EtOH solution of KOH (1.9 g), 3-chloro-4-methoxybenzohydrazide (4.45 g) was added at rt. Once the solids dissolved, neat $CS_2$ (2.55 g) was added dropwise and the reaction was stirred at rt for overnight. The yellow solid was collected by vacuum filtration, then rinsed by 100 mL $Et_2O$, dried, and used directly for next step without further purification.

The crude solid from previous step, hydrazine hydrate (50~60%, 3.6 g), and 5 mL water were added to a 250 mL round bottom flask with magnetic stir bar. The reaction was heated to reflux and stirred for 8 h. The $H_2S$ gas was absorbed by KOH solution. The reaction was allowed to cool to rt for overnight and neutralized by 3N HCl. The white solids that precipitated were collected by vacuum filtration, rinsed with iced water (100 mL), dried, and purified by recrystallization. The crude product was placed in a 250 mL round bottom flask, then 60 mL EtOH was added. The mixture was heated to a boil for 10 min, and the mixture was cooled on ice for 1 h. The white solid was collected by vacuum filtration, rinsed with 50 mL cold $Et_2O$, dried, and used without further purification to afford 1.9g (33%) as a white solid (mp 188-189° C.): IR (film) 3277, 3180, 2969 $cm^{-1}$; $^1H$ NMR (600 MHz, DMSO-$d_6$) δ 13.90 (s, 1H), 8.15 (d, J=2.1 Hz, 1H), 7.98 (dd, J=8.7, 2.2 Hz, 1H), 7.31 (d, J=8.8 Hz, 3H), 5.77 (s, 2H), 3.93 (s, 3H); $^{13}C$ NMR (151 MHz, DMSO-$d_6$) δ 166.89, 156.02, 148.10, 129.13, 128.28, 120.96, 118.90, 112.82, 56.40. HRMS (+APCI) m/z [M+H+] calcd for $C_9H_{10}ClN_4OS$ 257.0258, found 257.0260.

4-Amino-5-(4-methoxybenzyl)-4H-1,2,4-triazole-3-thiol

To 30 mL EtOH solution of KOH (2.52 g), 2-(4-methoxyphenyl)acetohydrazide (5.4 g) was added at rt. Once the solids dissolved, neat $CS_2$ (3.42 g) was added dropwise and the reaction was stirred at rt for overnight. A yellow solid was collected by vacuum filtration, rinsed by 100 mL $Et_2O$, dried, and used directly for next step.

The crude solid from previous step, hydrazine hydrate (50~60%, 3.1 g), and 5 mL water were added to a 250 mL round bottom flask with magnetic stir bar. The reaction was heated to reflux and stirred for 8 h. The $H_2S$ gas was absorbed by KOH solution. The reaction was allowed to cool to rt for overnight and neutralized by 3N HCl. The white solids that precipitated were collected by vacuum filtration, rinsed with iced water (100 mL), dried, and purified by recrystallization. The crude product was placed in a 250 mL round bottom flask, and 70 mL EtOH was added. The mixture was heated to boil for 10 min, and the mixture was cooled on ice for 1 h. The white solid was collected by vacuum filtration, rinsed with 100 mL cold Et$_2$O, dried and used without further purification providing 4.2 g (60%) as a white solid (mp 172-173° C.): IR (film) 3294, 3203, 3142, 3035, 2935, 2836 cm$^{-1}$; $^1$H NMR (600 MHz, DMSO-d$_6$) δ 13.90 (s, 1H), 8.15 (d, J=2.1 Hz, 1H), 7.98 (dd, J=8.7, 2.2 Hz, 1H), 7.31 (d, J=8.8 Hz, 3H), 5.77 (s, 2H), 3.93 (s, 3H); $^{13}$C NMR (151 MHz, DMSO-d$_6$) δ 166.89, 156.02, 148.10, 129.13, 128.28, 120.96, 118.90, 112.82, 56.40. HRMS (+APCI) m/z [M+H+] calcd for C$_{10}$H$_{13}$N$_4$OS 237.0805, found 237.0805.

4-Amino-5-(2,3-dichlorophenyl)-4H-1,2,4-triazole-3-thiol

To 70 mL EtOH solution of KOH (2.94 g), 2,3-dichlorobenzohydrazide (7.12 g) was added at rt. Once the solids dissolved, neat CS$_2$ (2.94 g) was added dropwise, and the reaction was stirred at rt for overnight. A yellow solid was collected by vacuum filtration, rinsed by 100 mL Et$_2$O, dried, and used directly for next step without further purification.

The crude solid from previous step, hydrazine hydrate (50~60%, 3.6 g), and 5 mL water were added to a 250 mL round bottom flask with magnetic stir bar. The reaction was heated to reflux and stirred for 8 h. The H$_2$S gas was absorbed by KOH solution. The reaction was allowed to cool to rt for overnight and neutralized by 3N HCl. The white solids that precipitated were collected by vacuum filtration, rinsed with iced water (100 mL), dried, and purified by recrystallization. The crude product was placed in a 250 mL round bottom flask, and 60 mL EtOH was added. The mixture was heated to boil for 10 min, and the mixture was cooled on ice for 1 h. The white solid was collected by vacuum filtration, rinsed with 50 mL cold Et$_2$O, dried and used without further purification affording 6.3 g (69%) as a white solid (mp 221-222° C.): IR (film) 3305, 3083, 2942, 2777 cm$^{-1}$; $^1$H NMR (600 MHz, DMSO-d$_6$) δ 14.04 (s, 1H), 7.88 (dd, J=8.1, 1.6 Hz, 1H), 7.60 (dd, J=7.7, 1.6 Hz, 1H), 7.54 (t, J=7.9 Hz, 1H), 5.54 (s, 2H); $^{13}$C NMR (151 MHz, DMSO-d$_6$) δ 166.95, 148.61, 132.75, 132.21, 131.75, 131.30, 128.39, 127.50. HRMS (+APCI) m/z [M+H+] calcd for C$_8$H$_7$Cl$_2$N$_4$S 260.9763, found 260.9764.

2-Bromo-5-methoxybenzohydrazide

To a flame-dry round bottom flask, equipped with magnetic stir bar, 2-bromo-5-methoxybenzoic acid (13.86 g), 1,1'-carbonyldiimidazole (12.6 g) and 80 mL were added at rt under argon. The reaction was allowed to stir for 3h, and a mixture of hydrazine hydrate (50~60%, 11.5 g) in 60 mL THF was added dropwise via additional funnel. The reaction was allowed to stir for overnight. The reaction was then concentrated under vacuum to provide crude product. The crude product was purified by recrystallization. The crude product and 120 mL EtOH were placed in a 250 mL round bottom flask and heated to boil until solids dissolved. The reaction was then cooled on ice bath for 1 h and cooled in −20° C. freezer for 4 h. The white solid that precipitated was collected by vacuum filtration, and the filter cake was rinsed by 100 mL cold Et$_2$O, dried, and used without further purification affording 13.87 g (95%) as a white solid (mp 129-131° C.) $^1$H NMR (600 MHz, DMSO-d6) δ 9.52 (s, 1H), 7.52 (d, J=8.8 Hz, 1H), 6.94 (dd, J=8.8, 3.1 Hz, 1H), 6.91 (d, J=3.1 Hz, 1H), 4.45 (s, 1H), 3.77 (s, 3H). $^{13}$C NMR (151 MHz, DMSO) δ 166.19, 158.23, 138.42, 133.58, 116.82, 114.65, 109.62, 55.58.

4-Amino-5-(2-bromo-5-methoxyphenyl)-4H-1,2,4-triazole-3-thiol

To 120 mL EtOH solution of KOH (4.76 g), 2-bromo-5-methoxybenzohydrazide (13.8 g) was added at rt. Once the solids dissolved, neat CS$_2$ (6.46 g) was added dropwise and the reaction was stirred at rt for overnight. The yellow solid was collected by vacuum filtration, rinsed by 50 mL Et$_2$O, dried, and used directly for next step without further purification.

The crude solid from previous step, hydrazine hydrate (50~60%, 9.0 g) and 10 mL water were added to a 250 mL round bottom flask with magnetic stir bar. The reaction was heated to reflux and stirred for 8 h. The H$_2$S gas was absorbed by KOH solution. The reaction was allowed to cool to rt for overnight and neutralized by 3N HCl. The white solids that precipitated were collected by vacuum filtration, rinsed with iced water (30 mL), dried, and purified by recrystallization. The crude product was placed in a 250 mL round bottom flask, and 60 mL EtOH was added. The mixture was heated to boil for 10 min, cooled to rt, placed on ice bath for 1 h, and stored in −20° C. freezer for 2 h. The white solid was collected by vacuum filtration, rinsed with 20 mL cold Et$_2$O, t 20 mL cold hexane, dried, and used without further purification affording 11.01 g (65%) as a white solid (mp 200-201° C.): IR (film) 3166, 2941 cm$^{-1}$; $^1$H NMR (600 MHz, DMSO-d6) δ 13.96 (s, 1H), 7.67 (d, J=8.9 Hz, 2H), 7.20 (d, J=3.1 Hz, 1H), 7.10 (dd, J=8.9, 3.1 Hz, 1H), 5.48 (s, 2H), 3.79 (s, 3H). $^{13}$C NMR (151 MHz, DMSO) δ 166.48, 158.25, 149.72, 133.49, 127.97, 118.28, 118.27, 113.19, 55.75. HRMS (+APCI) m/z [M+H+] calcd for C$_9$H$_{10}$BrN$_4$OS 300.9753, found 300.9748.

General Condensation Procedure for the Synthesis of HDCF Analogues

The corresponding triazole (1.0 equiv.), α-halogen ketone (1.0 to 1.2 equiv.), and anhydrous ethanol were added to a flame-dry round bottom flask equipped with magnetic stir bar. The reaction mixture was heated to reflux and stirred for 8 h.

Ethyl 2-(3-(3,4-dimethoxyphenyl)-7H-[1,2,4]triazolo[3,4-b][1,3,4]thiadiazin-6-yl)acetate (HDCF 50)

This compound was prepared by the general procedure using 4-amino-5-(3,4-dimethoxyphenyl)-4H-1,2,4-triazole-3-thiol (504 mg, 2.0 mmol) and ethyl 4-chloroacetoacetate (363 mg, 2.2 mmol) in 10 mL EtOH. After refluxing for 8 hours, the reaction was then concentrated under vacuum and purified by magnesium-silicate column (MeOH/DCM 0:100 to 5:95), affording 354 mg (49%) of HDCF 50 as a white solid (mp 91-92° C.): IR (film) 2979, 2939, 2837, 1733 cm$^{-1}$; $^1$H NMR (600 MHz, DMSO-d$_6$) δ 7.57-7.52 (m, 2H), 7.10 (d, J=8.4 Hz, 1H), 4.15 (q, J=7.1 Hz, 1H), 3.95 (s, 2H), 3.85 (s, 2H), 3.83 (s, 3H), 3.82 (s, 3H), 1.21 (t, J=7.1 Hz, 3H); $^{13}$C NMR (151 MHz, DMSO-d$_6$) δ 167.85, 155.90, 150.86, 150.45, 148.54, 141.57, 120.84, 118.18, 111.54, 110.87, 61.06, 55.59, 55.50, 42.31, 24.57, 13.93.; HRMS (+APCI) m/z [M+H+] calcd for C$_{16}$H$_{19}$N$_4$O$_4$S 363.1122, found 363.1117.

6-Cyclopropyl-3-(3,4-dichlorophenyl)-7H-[1,2,4]triazolo[3,4-b][1,3,4]thiadiazine (HDCF 53)

This compound was prepared by the general procedure using 4-amino-5-(3,4-dichlorophenyl)-4H-1,2,4-triazole-3-thiol (260 mg, 1.0 mmol) and 2-bromo-1-cyclopropylethan-1-one (179 mg, 1.1 mmol) in 10 mL EtOH. After refluxing for 8 hours, the reaction was then concentrated under vacuum and purified by magnesium-silicate column (MeOH/DCM 0:100 to 5:95), affording 243 mg (38%) of HDCF 53 as a white solid (mp 132-133° C.): IR (film) 3094, 2981, 2908 cm$^{-1}$; $^1$H NMR (600 MHz, DMSO-d$_6$) δ 8.19 (d, J=2.0 Hz, 1H), 7.96 (dd, J=8.5, 2.0 Hz, 1H), 7.85 (d, J=8.5 Hz, 1H), 3.73 (s, 2H), 2.05 (tt, J=8.0, 4.9 Hz, 1H), 1.13-1.06 (m, 4H); $^{13}$C NMR (151 MHz, DMSO-d$_6$) δ 164.75, 148.65, 143.40, 132.81, 131.53, 131.23, 129.07, 127.60, 126.53, 22.32, 16.63, 8.16; HRMS (+APCI) m/z [M+H+] calcd for C$_{13}$H$_{11}$Cl$_2$N$_4$S 325.0076, found 325.0074.

Ethyl 2-(3-(3-chloro-4-methoxyphenyl)-7H-[1,2,4]triazolo[3,4-b][1,3,4]thiadiazin-6-yl) acetate (HDCF 57)

This compound was prepared by the general procedure using 4-amino-5-(3-chloro-4-methoxyphenyl)-4H-1,2,4-triazole-3-thiol (256 mg, 1.0 mmol) and ethyl 4-chloroacetoacetate (182 mg, 1.1 mmol) in 10 mL EtOH. After refluxing for 8 hours, the reaction was then concentrated under vacuum and purified by magnesium-silicate column (MeOH/DCM 0:100 to 5:95), affording 365 mg, of HDCF 57 as a white solid (mp 86-87° C.): IR (film) 2981, 2939, 2842, 1733 cm−1; 1H NMR (600 MHz, DMSO-d6) δ 7.98 (d, J=2.1 Hz, 1H), 7.94 (dd, J=8.7, 2.2 Hz, 1H), 7.31 (d, J=8.8 Hz, 1H), 4.16 (q, J=7.1 Hz, 2H), 3.96 (s, 2H), 3.94 (s, 3H), 3.85 (s, 2H), 1.22 (t, J=7.1 Hz, 3H); $^{13}$C NMR (151 MHz, DMSO-d6) δ 167.74, 156.33, 155.89, 149.68, 141.89, 128.74, 127.95, 121.24, 119.04, 112.94, 61.08, 56.39, 42.29, 24.61, 13.94; HRMS (+APCI) m/z [M+H+] calcd for C15H16ClN4O3S 367.0626, found 367.0624.

3-(3,4-Dichlorophenyl)-6-octyl-7H-[1,2,4]triazolo[3,4-b][1,3,4]thiadiazine (HDCF 61)

This compound was prepared by the general procedure using 4-amino-5-(3,4-dichlorophenyl)-4H-1,2,4-triazole-3-thiol (130 mg, 0.5 mmol) and 1-chlorodecan-2-one (105 mg, 0.55 mmol) in 10 mL EtOH. After refluxing for 8 hours, the reaction was then concentrated under vacuum and purified by magnesium-silicate column (MeOH/DCM 0:100 to 5:95), afforded 189 mg (95%) HDCF 61 as a white solid (mp 57-58° C.): IR (film) 2954, 2926, 2855 cm$^{-1}$; $^1$H NMR (600 MHz, DMSO-d$_6$) δ 8.01 (d, J=2.1 Hz, 1H), 7.97 (dd, J=8.7, 2.1 Hz, 1H), 7.36 (d, J=8.8 Hz, 1H), 5.40 (s, 1H), 3.94 (s, 3H), 3.12 (s, 3H), 2.83 (s, 3H), 2.32 (s, 3H); $^{13}$C NMR (151 MHz, DMSO-d$_6$) δ 164.22, 157.81, 155.95, 149.06, 139.35, 128.73, 128.07, 121.25, 119.11, 113.13, 56.46, 37.90, 37.60, 35.79, 23.39; HRMS (+APCI) m/z [M+H+] calcd for C$_{18}$H$_{23}$Cl$_2$N$_4$S 397.1015, found 397.1017.

3-(3,4-dichlorophenyl)-6-(1-methylcyclopropyl)-7H-[1,2,4]triazolo[3,4-b][1,3,4]thiadiazine (HDCF 62)

This compound was prepared by the general procedure using 4-amino-5-(3,4-dichlorophenyl)-4H-1,2,4-triazole-3-thiol (130 mg, 0.5 mmol) and 1-(1-methylcyclopropyl)-2-bromoethane-1-one (97 mg, 0.55 mmol) in 10 mL EtOH. After refluxing for 8 hours, the reaction was then concentrated under vacuum and purified by magnesium-silicate column (MeOH/DCM 0:100 to 5:95), affording 167 mg (99%) of HDCF 62 as a white solid (mp 190-191° C.): IR (film) 2989, 2970 cm$^{-1}$; $^1$H NMR (600 MHz, DMSO-d$_6$) δ 8.31 (d, J=2.0 Hz, 1H), 8.04 (dd, J=8.5, 2.0 Hz, 1H), 7.85 (d, J=8.5 Hz, 1H), 3.58 (s, 2H), 1.39 (s, 3H), 1.30-1.28 (m, 2H), 1.01-0.98 (m, 2H); $^{13}$C NMR (151 MHz, DMSO-d$_6$) δ 165.84, 148.57, 143.42, 132.66, 131.44, 131.15, 128.92, 127.35, 126.53, 40.06, 21.27, 20.68, 20.27, 14.56; HRMS (+APCI) m/z [M+H+] calcd for C$_{14}$H$_{13}$Cl$_2$N$_4$S 339.0232, found 339.0234.

3-(3-Chlorophenyl)-6-cyclopropyl-7H-[1,2,4]triazolo[3,4-b][1,3,4]thiadiazine (HDCF 64)

This compound was prepared by the general procedure using 4-amino-5-(3-chlorophenyl)-4H-1,2,4-triazole-3-thiol (113 mg, 0.5 mmol) and 2-bromo-1-cyclopropylethan-1-one (90 mg, 0.55 mmol) in 10 mL EtOH. After refluxing for 8 hours, the reaction was then concentrated under vacuum and purified by magnesium-silicate column (MeOH/DCM 0:100 to 5:95), affording 54 mg (37%) of HDCF 64 as a white solid (mp 131-132° C.): IR (film) 3098, 2990, 2911, 1608 cm$^{-1}$; $^1$H NMR (600 MHz, DMSO-d$_6$) δ 8.01-7.99 (m, 1H), 7.96-7.93 (m, 1H), 7.62-7.57 (m, 2H), 3.74 (s, 2H), 2.05 (ddd, J=8.1, 5.5, 3.0 Hz, 1H), 1.12-1.05 (m, 4H); $^{13}$C NMR (151 MHz, DMSO-d$_6$) δ 164.39, 149.35, 143.05, 133.26, 130.70, 129.84, 127.97, 127.10, 126.15, 22.35, 16.51, 8.02; HRMS (+APCI) m/z [M+H+] calcd for C$_{13}$H$_{12}$ClN$_4$S 291.0466, found 291.0467.

6-(Tert-butyl)-3-(3,4-dichlorophenyl)-7H-[1,2,4]triazolo[3,4-b][1,3,4]thiadiazine (HDCF 73)

This compound was prepared by the general procedure using 4-amino-5-(3,4-dichlorophenyl)-4H-1,2,4-triazole-3-thiol (130 mg, 0.5 mmol) and 1-chloro-3,3-dimethyl-butan-2-one (74 mg, 0.55 mmol) in 10 mL EtOH. After refluxing for 8 hours, the reaction was then concentrated under vacuum and purified by magnesium-silicate column (MeOH/DCM 0:100 to 5:95), affording 160 mg (92%) of HDCF 73 as a white solid (mp 153-154° C.): IR (film) 3103, 2967, 2935, 2907, 2871 cm$^{-1}$; $^1$H NMR (600 MHz, DMSO-d$_6$) δ 8.28 (d, J=2.0 Hz, 1H), 8.02 (dd, J=8.5, 2.0 Hz, 1H), 7.86 (d, J=8.5 Hz, 1H), 4.01 (s, 2H), 1.28 (s, 9H); $^{13}$C NMR (151 MHz, DMSO-d$_6$) δ 168.50, 149.09, 143.55, 132.84, 131.54, 131.25, 129.09, 127.48, 126.43, 26.59, 21.57; HRMS (+APCI) m/z [M+H+] calcd for C$_{14}$H$_{15}$Cl$_2$N$_4$S 341.0389, found 341.0389.

6-(tert-butyl)-3-(2,3-dichlorophenyl)-7H-[1,2,4]triazolo[3,4-b][1,3,4]thiadiazine (HDCF 79)

This compound was prepared by the general procedure using 4-amino-5-(2,3-dichlorophenyl)-4H-1,2,4-triazole-3-thiol (130 mg, 0.5 mmol) and 1-chloro-3,3-dimethyl-butan-2-one (81 mg, 0.6 mmol) in 10 mL EtOH. After refluxing for 8 hours, the reaction was then concentrated under vacuum and purified by magnesium-silicate column (MeOH/DCM 0:100 to 5:95), affording 152 mg (89%) of HDCF 79 as a white solid (mp 177-178° C.): IR (film) 2970, 2934, 2908, 2872 cm$^{-1}$; $^1$H NMR (600 MHz, DMSO-d$_6$) δ 7.86 (dd, J=8.1, 1.6 Hz, 1H), 7.62 (dd, J=7.7, 1.6 Hz, 1H), 7.54 (t, J=7.9 Hz, 1H), 4.02 (s, 2H), 1.16 (s, 9H); $^{13}$C NMR (151 MHz, DMSO-d$_6$) δ 167.71, 150.01, 142.52, 132.49, 132.45, 131.33, 131.15, 128.35, 127.71, 26.47, 21.97; HRMS (+APCI) m/z [M+H+] calcd for C$_{14}$H$_{15}$Cl$_2$N$_4$S 341.0389, found 341.0388.

3-(2,3-dichlorophenyl)-6-(trifluoromethyl)-7H-[1,2,4]triazolo[3,4-b][1,3,4]thiadiazine (HDCF 81)

This compound was prepared by the general procedure using 4-amino-5-(2,3-dichlorophenyl)-4H-1,2,4-triazole-3-thiol (130 mg, 0.5 mmol) and 3-bromo-1,1,1-trifluoroacetone (115 mg, 0.6 mmol) in 10 mL EtOH. After refluxing for 8 hours, the reaction was then concentrated under vacuum and purified by magnesium-silicate column (MeOH/DCM 0:100 to 5:95), affording 160 mg (91%) of HDCF 81 as a white solid (mp 141-142° C.): IR (film) 3070, 2993, 2906 cm$^{-1}$; $^1$H NMR (600 MHz, DMSO-d$_6$) δ 7.92 (dd, J=8.0, 1.7 Hz, 1H), 7.63 (dd, J=7.7, 1.7 Hz, 1H), 7.59 (t, J=7.9 Hz, 1H), 4.40 (s, 2H); $^{13}$C NMR (151 MHz, DMSO-d$_6$) δ150.32, 145.56 (q, J=36.0 Hz), 141.86, 133.16, 132.61, 131.46, 131.36, 128.63, 126.52, 119.13 (q, J=275.9 Hz), 20.60; $^{19}$F NMR (282 MHz, DMSO-d$_6$) δ-74.24. HRMS (+APCI) m/z [M+H+] calcd for C$_{11}$H$_6$Cl$_2$F$_3$N$_4$S 352.9637, found 352.9635.

3-(2,3-Dichlorophenyl)-6-(tert-pentyl)-7H-[1,2,4]triazolo[3,4-b][1,3,4]thiadiazine (HDCF 83)

This compound was prepared by the general procedure using 4-amino-5-(2,3-dichlorophenyl)-4H-1,2,4-triazole-3-thiol (130 mg, 0.5 mmol) and 1-bromo-3,3-dimethyl-2-pentanone (115 mg, 0.6 mmol) in 10 mL EtOH. After refluxing for 8 hours, the reaction was then concentrated under vacuum and purified by magnesium-silicate column (MeOH/DCM 0:100 to 5:95), affording 164 mg (93%) of HDCF 83 as a white solid (mp 132-133° C.): IR (film) 2968, 2933, 2878 cm$^{-1}$; $^1$H NMR (600 MHz, DMSO-d$_6$) δ 7.87 (dd, J=8.1, 1.6 Hz, 1H), 7.62 (dd, J=7.7, 1.6 Hz, 1H), 7.55

(t, J=6.0 Hz, 1H), 4.00 (s, 2H), 1.58 (q, J=7.5 Hz, 2H), 1.09 (s, 6H), 0.75 (t, J=7.5 Hz, 3H); $^{13}$C NMR (151 MHz, DMSO-d$_6$) δ 166.93, 150.04, 142.65, 132.50, 132.43, 131.34, 131.12, 128.38, 127.76, 42.57, 31.72, 24.25, 21.95, 8.96; HRMS (+APCI) m/z [M+H+] calcd for C$_{15}$H$_{17}$Cl$_2$N$_4$S 355.0545, found 355.0544.

3-(2,3-dichlorophenyl)-6-isopropyl-7H-[1,2,4]triazolo[3,4-b][1,3,4]thiadiazine (HDCF 84)

This compound was prepared by the general procedure using 4-amino-5-(2,3-dichlorophenyl)-4H-1,2,4-triazole-3-thiol (130 mg, 0.5 mmol) and 1-bromo-3-methylbutan-2-one (98 mg, 0.6 mmol) in 10 mL EtOH. After refluxing for 8 hours, the reaction was then concentrated under vacuum and purified by magnesium-silicate column (MeOH/DCM 0:100 to 5:95), affording 141 mg (87%) of HDCF 84 as a white solid (mp 113-114° C.): IR (film) 2972, 2934, 2875 cm$^{-1}$; $^1$H NMR (600 MHz, DMSO-d$_6$) δ 7.87 (dd, J=8.0, 1.5 Hz, 1H), 7.61 (dd, J=7.7, 1.5 Hz, 1H), 7.54 (t, J=7.9 Hz, 1H), 3.95 (s, 2H), 2.79 (p, J=6.8 Hz, 1H), 1.12 (d, J=6.8 Hz, 6H); $^{13}$C NMR (151 MHz, DMSO-d$_6$) δ 166.11, 149.83, 142.28, 132.54, 132.43, 131.41, 131.18, 128.41, 127.80, 35.44, 23.20, 18.90; HRMS (+APCI) m/z [M+H+] calcd for C$_{13}$H$_{13}$Cl$_2$N$_4$S 327.0232, found 327.0231.

6-(Tert-butyl)-3-(2,4-dichlorophenyl)-7H-[1,2,4]triazolo[3,4-b][1,3,4]thiadiazine (HDCF 89)

This compound was prepared by the general procedure using 4-amino-5-(2,4-dichlorophenyl)-4H-1,2,4-triazole-3-thiol (130 mg, 0.5 mmol) and 1-chloro-3,3-dimethyl-butan-2-one (81 mg, 0.6 mmol) in 10 mL EtOH. After refluxing for 8 hours, the reaction was then concentrated under vacuum and purified by magnesium-silicate column (MeOH/DCM 0:100 to 5:95), affording 155 mg (91%) of HDCF 89 as a white solid (mp 132-133° C.): IR (film) 2970, 2933 cm$^{-1}$; $^1$H NMR (600 MHz, DMSO-d$_6$) δ 7.86 (d, J=2.0 Hz, 1H), 7.67 (d, J=8.3 Hz, 1H), 7.63 (dd, J=8.3, 2.1 Hz, 1H), 4.00 (s, 2H), 1.17 (s, 9H); $^{13}$C NMR (151 MHz, DMSO-d$_6$) δ 167.66, 149.55, 142.61, 136.00, 134.12, 133.61, 129.55, 127.54, 124.41, 38.97, 26.50, 21.94; HRMS (+APCI) m/z [M+H+] calcd for C$_{14}$H$_{15}$Cl$_2$N$_4$S 341.0389, found 341.0388.

3-(3,4-Dichlorobenzyl)-6-isopropyl-7H-[1,2,4]triazolo[3,4-b][1,3,4]thiadiazine (HDCF 93)

This compound was prepared by the general procedure using 4-amino-5-(3,4-dichlorobenzyl)-4H-1,2,4-triazole-3-thiol (137 mg, 0.5 mmol) and 1-bromo-3-methylbutan-2-one (98 mg, 0.6 mmol) in 10 mL EtOH. After refluxing for 8 hours, the reaction was then concentrated under vacuum and purified by magnesium-silicate column (MeOH/DCM 0:100 to 5:95), affording 157 mg (92%) of HDCF 93 as a white solid (mp 117-118° C.): IR (film) 2971, 2931, 2874 cm$^{-1}$; $^1$H NMR (600 MHz, DMSO-d$_6$) δ 7.59 (d, J=2.0 Hz, 1H), 7.57 (d, J=8.3 Hz, 1H), 7.27 (dd, J=8.3, 2.1 Hz, 1H), 4.21 (s, 2H), 3.87 (s, 2H), 2.82 (p, J=6.8 Hz, 1H), 1.18 (d, J=6.8 Hz, 6H); $^{13}$C NMR (151 MHz, DMSO-d$_6$) δ 165.23, 151.24, 140.64, 137.08, 131.09, 130.82, 130.54, 129.44, 129.38, 35.52, 29.11, 23.27, 18.99; HRMS (+APCI) m/z [M+H+] calcd for C$_{14}$H$_{15}$Cl$_2$N$_4$S 341.0389, found 341.0388.

3-(2-Bromo-5-chlorophenyl)-6-isopropyl-7H-[1,2,4]triazolo[3,4-b][1,3,4]thiadiazine (HDCF 94)

This compound was prepared by the general procedure using 4-amino-5-(2-bromo-5-chlorophenyl)-4H-1,2,4-triazole-3-thiol (152 mg, 0.5 mmol) and 1-bromo-3-methylbutan-2-one (98 mg, 0.6 mmol) in 10 mL EtOH. After refluxing for 8 hours, the reaction was then concentrated under vacuum and purified by magnesium-silicate column (MeOH/DCM 0:100 to 5:95), affording 160 mg (86%) of HDCF 94 as a white solid (mp 122-123° C.): IR (film) 2970, 2931, 2874 cm$^{-1}$; $^1$H NMR (600 MHz, DMSO-d$_6$) δ 7.85 (d, J=8.6 Hz, 1H), 7.72 (d, J=2.6 Hz, 1H), 7.61 (dd, J=8.6, 2.7 Hz, 1H), 3.93 (s, 2H), 2.81 (hept, J=6.7 Hz, 1H), 1.13 (d, J=6.8 Hz, 6H); $^{13}$C NMR (151 MHz, DMSO-d$_6$) δ 166.37, 150.18, 142.32, 134.77, 132.39, 132.22, 132.07, 129.27, 121.51, 35.53, 23.42, 18.96; HRMS (+APCI) m/z [M+H+] calcd for C$_{13}$H$_{13}$BrClN$_4$S 370.9727, found 372.9708.

3-(2-Bromo-5-chlorophenyl)-6-(tert-butyl)-7H-[1,2,4]triazolo[3,4-b][1,3,4]thiadiazine (HDCF 95)

This compound was prepared by the general procedure using 4-amino-5-(2-bromo-5-chlorophenyl)-4H-1,2,4-triazole-3-thiol (152 mg, 0.5 mmol) and 1-chloro-3,3-dimethylbutan--2-one (81 mg, 0.6 mmol) 10 mL EtOH. After refluxing for 8 hours, the reaction was then concentrated under vacuum and purified by magnesium-silicate column (MeOH/DCM 0:100 to 5:95), affording 178 mg (93%) of HDCF 95 as a white solid (mp 155-156° C.): IR (film) 2970, 2934, 2908, 2872 cm1; 1HNMR (600 MHz, DMSO-d$_6$) δ 7.84 (d, J=8.6 Hz, 1H), 7.72 (d, J=2.6 Hz, 1H), 7.59 (dd, J=8.6, 2.6 Hz, 1H), 3.98 (s, 2H), 1.17 (s, 9H); $^{13}$C NMR (151 MHz, DMSO-d$_6$) δ 167.86, 150.24, 142.46, 134.73, 132.28, 132.12, 131.91, 129.11, 121.30, 26.47, 22.08; HRMS (+APCI) m/z [M+H+] calcd for C$_{14}$H$_{15}$BrClN$_4$S 384.9884, found 384.9890.

3-(2-Bromo-5-chlorophenyl)-6-(trifluoromethyl)-7H-[1,2,4]triazolo[3,4-b][1,3,4]thiadiazine (HDCF 98)

This compound was prepared by the general procedure using 4-amino-5-(2-bromo-5-chlorophenyl)-4H-1,2,4-triazole-3-thiol (152 mg, 0.5 mmol) and 3-bromo-1,1,1-trifluoroacetone (115 mg, 0.6 mmol) in 10 mL EtOH. After refluxing for 8 hours, the reaction was then concentrated under vacuum and purified by magnesium-silicate column (MeOH/DCM 0:100 to 5:95), affording 179 mg (90%) of HDCF 98 as a white solid (mp 156-157° C.): IR (film) 2085, 2994, 2906 cm$^{-1}$; $^1$H NMR (600 MHz, DMSO-d$_6$) δ 7.88 (d, J=8.6 Hz, 1H), 7.73 (d, J=2.6 Hz, 1H), 7.64 (dd, J=8.6, 2.6 Hz, 1H), 4.37 (s, 2H); $^{13}$C NMR (151 MHz, DMSO-d$_6$) δ 150.66, 145.66 (q, J=36.1 Hz), 141.75, 134.85, 132.60, 132.50, 132.35, 128.02, 121.34, 119.14 (q, J=275.9 Hz), 20.66; 19F NMR (282 MHz, DMSO-d$_6$) 6-74.26. HRMS (+APCI) m/z [M+H+] calcd for C$_{11}$H$_6$BrClF$_3$N$_4$S 396.9132, found 396.9144.

3-(2-Bromo-5-methoxyphenyl)-6-(tert-butyl)-7H-[1,2,4]triazolo[3,4-b][1,3,4]thiadiazine (HDCF 103)

This compound was prepared by the general procedure using 4-amino-5-(2-bromo-5-methoxyphenyl)-4H-1,2,4-triazole-3-thiol (150 mg, 0.5 mmol) and 1-chloro-3,3-dimethylbutan -2-one (81 mg, 0.6 mmol) in 10 mL EtOH. After refluxing for 8 hours, the reaction was then concentrated under vacuum and purified by magnesium-silicate column (MeOH/DCM 0:100 to 5:95), affording 142 mg (75%) of HDCF 103 as a white solid (mp 102-103° C.): IR (film) 2969, 2936, 1719 cm$^{-1}$; $^1$H NMR (600 MHz, DMSO-d6) δ 7.67 (d, J=8.9 Hz, 1H), 7.18 (d, J=3.1 Hz, 1H), 7.09 (dd, J=8.9, 3.1 Hz, 1H), 3.97 (s, 2H), 3.80 (s, 3H), 1.17 (s, 9H); $^{13}$C NMR (151 MHz, DMSO-d6) δ 167.53, 158.24, 151.31, 142.22, 133.82, 128.26, 118.19, 117.73, 113.04, 55.69, 38.96, 26.52, 22.07. HRMS (+APCI) m/z [M+H+] calcd for C$_{15}$H$_{18}$BrN$_4$OS 381.0379, found 381.0369.

3-(2-Bromo-5-methoxyphenyl)-6-isopropyl-7H-[1,2,4]triazolo[3,4-b][1,3,4]thiadiazine (HDCF 104)

This compound was prepared by the general procedure using 4-amino-5-(2-bromo-5-methoxyphenyl)-4H-1,2,4-triazole-3-thiol (150 mg, 0.5 mmol) and 1-bromo-3-methylbutan-2-one (98 mg, 0.6 mmol) in 10 mL EtOH. After refluxing for 8 hours, the reaction was then concentrated under vacuum and purified by magnesium-silicate column (MeOH/DCM 0:100 to 5:95), affording 151 mg (82%) of HDCF 104 as a white solid (mp 111-112° C.): IR (film) 2969, 2934, 1718 cm$^{-1}$; $^1$H NMR (600 MHz, DMSO-d6) δ 7.67 (d, J=8.9 Hz, 1H), 7.16 (d, J=3.1 Hz, 1H), 7.09 (dd, J=8.9, 3.1 Hz, 1H), 3.91 (s, 2H), 3.80 (s, 3H), 2.80 (h, J=6.8 Hz, 1H), 1.13 (d, J=6.8 Hz, 6H); $^{13}$C NMR (151 MHz, DMSO-d6) δ 165.88, 158.28, 151.17, 141.92, 133.77, 128.35, 118.18, 117.83, 113.14, 55.71, 35.47, 23.29, 18.93. HRMS (+APCI) m/z [M+H+] calcd for $C_{14}H_{16}BrN_4OS$ 367.0223, found 367.0220.

What is claimed is:

1. A compound that is 3-(2-bromo-5-methoxyphenyl)-6-isopropyl-7H-[1,2,4]triazolo[3,4-b][1,3,4]thiadiazine or a salt thereof.

2. A method of treating cystic fibrosis or rhinosinusitis comprising administering to a subject in need thereof an effective amount of a compound of claim 1.

3. The method of claim 2, further comprising administering ivacaftor, lumacaftor, tezacaftor, elexacaftor, or combinations thereof.

4. A composition comprising the compound of claim 1 and a pharmaceutically acceptable carrier, adjuvant, and/or excipient.

5. The composition of claim 4, further comprising ivacaftor, lumacaftor, tezacaftor, elexacaftor, or combinations thereof.

6. The method of claim 2, wherein the method comprises treating cystic fibrosis.

7. The method of claim 2, wherein the method comprises treating rhinosinusitis.

* * * * *